United States Patent [19]
Lubowtiz et al.

[11] Patent Number: 5,610,317
[45] Date of Patent: Mar. 11, 1997

[54] MULTIPLE CHEMICALLY FUNCTIONAL END CAP MONOMERS

[75] Inventors: Hyman R. Lubowtiz, Rolling Hills Estates, Calif.; Clyde H. Sheppard, Post Falls, Id.

[73] Assignee: The Boeing Company, Seattle, Wash.

[21] Appl. No.: 461,803

[22] Filed: Jun. 5, 1995

Related U.S. Application Data

[60] Division of Ser. No. 327,942, Oct. 21, 1994, which is a continuation-in-part of Ser. No. 773,381, Sep. 5, 1985, Ser. No. 137,493, Dec. 23, 1987, Ser. No. 167,656, Mar. 14, 1988, Ser. No. 168,289, Mar. 15, 1988, Ser. No. 176,518, Apr. 1, 1988, Ser. No. 212,404, Jun. 27, 1988, Ser. No. 241,997, Sep. 6, 1988, Pat. No. 5,530,089, Ser. No. 460,396, Jan. 3, 1990, Pat. No. 5,446,120, Ser. No. 619,677, Nov. 29, 1990, Ser. No. 639,051, Jan. 9, 1991, Ser. No. 43,824, Apr. 6, 1993, Pat. No. 5,367,083, Ser. No. 79,999, Jun. 21, 1993, Pat. No. 5,403,666, Ser. No. 159,823, Nov. 30, 1993, Pat. No. 5,455,115, Ser. No. 161,164, Dec. 3, 1993, abandoned, Ser. No. 232,682, Apr. 25, 1994, Pat. No. 5,516,876, Ser. No. 269,297, Jun. 30, 1994, Pat. No. 5,550,204, and Ser. No. 280,866, Jul. 26, 1994, Pat. No. 5,512,676.

[51] Int. Cl.⁶ .................. C07D 207/456; C07D 209/48; C07D 209/72

[52] U.S. Cl. .................. 548/431; 548/435; 548/461; 548/462; 548/465; 548/518; 548/523

[58] Field of Search .................. 548/431, 435, 548/461, 462, 465, 518, 523

[56] References Cited

U.S. PATENT DOCUMENTS

| | | |
|---|---|---|
| H183 | 1/1987 | Karasz et al. |
| Re. 29,316 | 7/1977 | Bargain et al. |
| Re. 30,922 | 5/1982 | Heilman et al. |

(List continued on next page.)

FOREIGN PATENT DOCUMENTS

| | | |
|---|---|---|
| 1269576 | 5/1990 | Canada. |
| 0152372 | 1/1985 | European Pat. Off. |
| 0175484 | 3/1986 | European Pat. Off. |

(List continued on next page.)

OTHER PUBLICATIONS

Additives Lower Pickup of Moisture by Polyimides NASA Tech Briefs, 80–81 Apr., 1989.

(List continued on next page.)

Primary Examiner—Richard L. Raymond
Attorney, Agent, or Firm—John C. Hammar

[57] ABSTRACT

Thermomechanical and thermo-oxidative stabilities in resin composites across the range of aerospace "engineering thermoplastic" resins are improved by forming four crosslinks at each addition polymerization site in the backbone of the resin using crosslinking functionalities of the general formula:

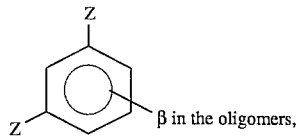

β in the oligomers,

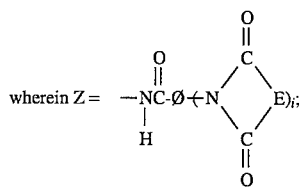

β=the residue an organic radical selected from the group consisting of:

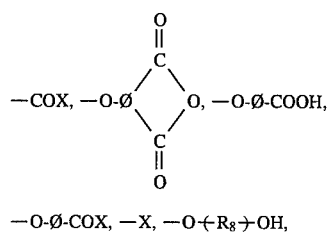

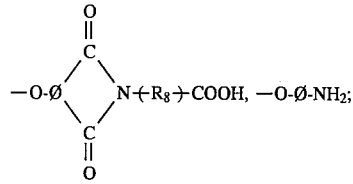

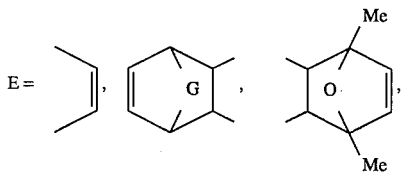

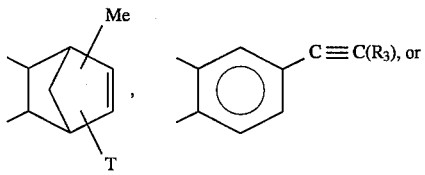

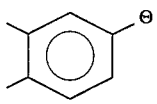

$R_8$=a divalent organic radical;
X=halogen;
Me=methyl
T=allyl or methallyl.
G=—$CH_2$—, —S—, —CO—, —SO—, —O—, —$CHR_3$—, or —$C(R_3)_2$—;
i=1 or 2;
$R_3$=hydrogen, lower alkyl, lower alkoxy, aryl, or aryloxy; and

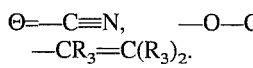, —O—C≡N,  —S—C≡N,  or —CR$_3$=C(R$_3$)$_2$.

13 Claims, No Drawings

U.S. PATENT DOCUMENTS

| | | |
|---|---|---|
| 3,105,839 | 10/1963 | Renner . |
| 3,236,705 | 2/1966 | Gilman et al. . |
| 3,236,808 | 2/1966 | Goldberg et al. . |
| 3,262,914 | 7/1966 | Goldberg et al. . |
| 3,265,708 | 8/1966 | Stiteler . |
| 3,267,081 | 8/1966 | Rudner et al. . |
| 3,313,783 | 4/1967 | Iwakura et al. . |
| 3,354,129 | 11/1967 | Edmonds et al. . |
| 3,355,272 | 11/1967 | D'Alessandro . |
| 3,386,969 | 6/1968 | Levine . |
| 3,408,349 | 10/1968 | Matsunaga . |
| 3,431,235 | 3/1969 | Lubowitz . |
| 3,435,003 | 3/1969 | Craven . |
| 3,449,442 | 6/1969 | Williams et al. . |
| 3,450,711 | 6/1969 | Megna et al. . |
| 3,453,236 | 7/1969 | Culbertson . |
| 3,454,673 | 7/1969 | Schmidt . |
| 3,458,486 | 7/1969 | Ray et al. . |
| 3,461,461 | 8/1969 | Anthony et al. . |
| 3,528,950 | 9/1970 | Lubowitz . |
| 3,530,087 | 9/1970 | Hayes et al. . |
| 3,536,670 | 10/1970 | Aciony et al. . |
| 3,562,223 | 2/1971 | Bargain et al. . |
| 3,563,951 | 2/1971 | Dormagen et al. . |
| 3,565,549 | 2/1971 | Lubowitz et al. . |
| 3,592,841 | 7/1971 | Broadhead . |
| 3,598,768 | 8/1971 | Bach . |
| 3,609,181 | 9/1971 | Lubowitz et al. . |
| 3,616,193 | 10/1971 | Lubowitz et al. . |
| 3,624,042 | 11/1971 | Lubowitz et al. . |
| 3,631,222 | 12/1971 | Vogel . |
| 3,632,428 | 1/1972 | Lubowitz et al. . |
| 3,635,891 | 1/1972 | Lubowitz et al. . |
| 3,641,207 | 2/1972 | Lauchlan . |
| 3,647,529 | 3/1972 | Lubowitz et al. . |
| 3,652,710 | 3/1972 | Holub . |
| 3,658,764 | 4/1972 | Bargain et al. . |
| 3,658,938 | 4/1972 | Kwiatkowski et al. . |
| 3,663,507 | 5/1972 | Vogel . |
| 3,689,464 | 9/1972 | Holub et al. . |
| 3,697,308 | 10/1972 | Lubowitz et al. . |
| 3,697,345 | 10/1972 | Lubowitz et al. . |
| 3,699,074 | 10/1972 | Lubowitz et al. . |
| 3,699,075 | 10/1972 | Lubowitz . |
| 3,708,370 | 1/1973 | Lubowitz et al. . |
| 3,708,439 | 1/1973 | Sayigh et al. . |
| 3,708,459 | 1/1973 | Lubowitz . |
| 3,729,446 | 4/1973 | Holub et al. . |
| 3,745,149 | 7/1973 | Serafini et al. . |
| 3,748,311 | 7/1973 | Burns et al. . |
| 3,748,312 | 7/1973 | Burns et al. . |
| 3,749,735 | 7/1973 | Loria . |
| 3,757,088 | 9/1973 | Osborn . |
| 3,759,777 | 9/1973 | Lubowitz et al. . |
| 3,761,441 | 9/1973 | D'Alessandro et al. . |
| 3,763,101 | 10/1973 | Jones et al. . |
| 3,770,697 | 11/1973 | Holub et al. . |
| 3,772,250 | 11/1973 | Economy et al. . |
| 3,773,718 | 11/1973 | Klebe et al. . |
| 3,781,240 | 12/1973 | Lubowitz et al. . |
| 3,781,249 | 12/1973 | Lubowitz . |
| 3,787,363 | 1/1974 | Stanland et al. . |
| 3,803,081 | 4/1974 | Lubowitz . |
| 3,812,159 | 5/1974 | Lubowitz . |
| 3,827,927 | 8/1974 | Lubowitz et al. . |
| 3,839,287 | 10/1974 | Kwiatkowski et al. . |
| 3,843,593 | 10/1974 | Shell et al. . |
| 3,847,867 | 11/1974 | Heath et al. . |
| 3,847,869 | 11/1974 | Williams, III . |
| 3,853,815 | 12/1974 | Lubowitz . |
| 3,859,252 | 1/1975 | Cho . |
| 3,879,349 | 4/1975 | Bilow et al. . |
| 3,879,393 | 4/1975 | Havera . |
| 3,879,428 | 4/1975 | Heath et al. . |
| 3,887,582 | 6/1975 | Holub et al. . |
| 3,890,272 | 6/1975 | D'Alelio . |
| 3,895,064 | 7/1975 | Brode et al. . |
| 3,896,147 | 7/1975 | Stephen . |
| 3,897,393 | 7/1975 | Lu . |
| 3,897,395 | 7/1975 | D'Alelio . |
| 3,909,507 | 9/1975 | Betts et al. . |
| 3,914,334 | 10/1975 | Lubowitz et al. . |
| 3,919,177 | 11/1975 | Campbell . |
| 3,920,768 | 11/1975 | Kwiatkowski . |
| 3,925,324 | 12/1975 | Gerard . |
| 3,933,862 | 1/1976 | Williams, III . |
| 3,935,167 | 1/1976 | Marvel et al. . |
| 3,935,320 | 1/1976 | Chiu et al. . |
| 3,941,746 | 3/1976 | Stephen . |
| 3,941,883 | 3/1976 | Gschwend et al. . |
| 3,956,320 | 5/1976 | Heath et al. . |
| 3,957,732 | 5/1976 | Hirooka et al. . |
| 3,957,862 | 5/1976 | Heath et al. . |
| 3,966,678 | 6/1976 | Gruffaz et al. . |
| 3,966,726 | 6/1976 | Toth et al. . |
| 3,966,987 | 6/1976 | Suzuki et al. . |
| 3,970,714 | 7/1976 | Bargain . |
| 3,972,902 | 8/1976 | Heath et al. . |
| 3,988,374 | 10/1976 | Brode et al. . |
| 3,993,630 | 11/1976 | Darmory et al. . |
| 3,998,786 | 12/1976 | D'Alelio . |
| 4,000,146 | 12/1976 | Gerber . |
| 4,005,134 | 1/1977 | Markezich . |
| 4,013,600 | 3/1977 | Cassat . |
| 4,020,069 | 4/1977 | Johnson et al. . |
| 4,026,871 | 5/1977 | D'Alelio . |
| 4,038,261 | 7/1977 | Crouch et al. . |
| 4,051,177 | 9/1977 | Braden et al. . |
| 4,055,543 | 10/1977 | D'Alelio . |
| 4,058,505 | 11/1977 | D'Alelio . |
| 4,060,515 | 11/1977 | D'Alelio . |
| 4,064,289 | 12/1977 | Yokoyama et al. . |
| 4,075,171 | 2/1978 | D'Alelio . |
| 4,097,456 | 6/1978 | Barie . |
| 4,100,137 | 7/1978 | Lemieux et al. . |
| 4,100,138 | 7/1978 | Bilow et al. . |
| 4,101,488 | 7/1978 | Ishizuka et al. . |
| 4,107,125 | 8/1978 | Lovejoy . |
| 4,107,147 | 8/1978 | Williams, III et al. . |
| 4,107,153 | 8/1978 | Akijama et al. . |
| 4,107,174 | 8/1978 | Baumann et al. . |
| 4,108,837 | 8/1978 | Johnson et al. . |
| 4,108,926 | 8/1978 | Arnold et al. . |
| 4,110,188 | 8/1978 | Darms et al. . |
| 4,111,879 | 9/1978 | Mori et al. . |
| 4,115,231 | 9/1978 | Darms et al. . |
| 4,115,362 | 9/1978 | Inata et al. . |
| 4,116,937 | 9/1978 | Jones et al. . |
| 4,124,593 | 11/1978 | Gschwend et al. . |
| 4,126,619 | 11/1978 | Darms et al. . |
| 4,128,574 | 12/1978 | Markezich et al. . |
| 4,132,715 | 1/1979 | Roth . |
| 4,132,716 | 1/1979 | Kvita et al. . |
| 4,134,895 | 1/1979 | Roth et al. . |
| 4,142,870 | 3/1979 | Lovejoy . |
| 4,158,731 | 6/1979 | Baumann et al. . |
| 4,166,168 | 8/1979 | D'Alelio . |

| | | |
|---|---|---|
| 4,167,663 | 9/1979 | Granzow et al. . |
| 4,168,366 | 9/1979 | D'Alelio . |
| 4,172,836 | 10/1979 | Baumann et al. . |
| 4,174,326 | 11/1979 | Baumann et al. . |
| 4,175,175 | 11/1979 | Johnson et al. . |
| 4,176,223 | 11/1979 | Irwin . |
| 4,179,551 | 12/1979 | Jones et al. . |
| 4,183,839 | 1/1980 | Gagliani . |
| 4,187,364 | 2/1980 | Darms et al. . |
| 4,189,560 | 2/1980 | Roth et al. . |
| 4,193,927 | 3/1980 | Baumann et al. . |
| 4,197,397 | 4/1980 | D'Alelio . |
| 4,200,731 | 4/1980 | Massey et al. . |
| 4,206,106 | 6/1980 | Heilman et al. . |
| 4,218,555 | 8/1980 | Antonoplos et al. . |
| 4,221,895 | 9/1980 | Woo . |
| 4,225,497 | 9/1980 | Baudouin et al. . |
| 4,225,498 | 9/1980 | Baudouin et al. . |
| 4,231,934 | 11/1980 | Oba et al. . |
| 4,234,712 | 11/1980 | Keller et al. . |
| 4,237,262 | 12/1980 | Jones . |
| 4,239,883 | 12/1980 | Stenzenberger . |
| 4,244,853 | 1/1981 | Serafini et al. . |
| 4,250,096 | 2/1981 | Kvita et al. . |
| 4,251,417 | 2/1981 | Chow et al. . |
| 4,251,418 | 2/1981 | Chow et al. . |
| 4,251,419 | 2/1981 | Heilman et al. . |
| 4,251,420 | 2/1981 | Antonoplos et al. . |
| 4,255,313 | 3/1981 | Antonoplos et al. . |
| 4,266,047 | 5/1981 | Jablonski et al. . |
| 4,269,961 | 5/1981 | Jones et al. . |
| 4,271,079 | 6/1981 | Maeda et al. . |
| 4,273,916 | 6/1981 | Jones et al. . |
| 4,276,407 | 6/1981 | Bilow et al. . |
| 4,288,583 | 9/1981 | Zahir et al. . |
| 4,288,607 | 9/1981 | Bier et al. . |
| 4,289,699 | 9/1981 | Oba et al. . |
| 4,293,670 | 10/1981 | Robeson et al. . |
| 4,297,472 | 10/1981 | Heiss . |
| 4,297,474 | 10/1981 | Williams, III et al. . |
| 4,298,720 | 11/1981 | Yamazaki et al. . |
| 4,299,750 | 11/1981 | Antonoplos et al. . |
| 4,299,946 | 11/1981 | Balme et al. . |
| 4,302,575 | 11/1981 | Takekoshi . |
| 4,309,528 | 1/1982 | Keske et al. . |
| 4,323,662 | 4/1982 | Oba et al. . |
| 4,338,222 | 7/1982 | Limburg et al. . |
| 4,338,225 | 7/1982 | Sheppard . |
| 4,344,869 | 8/1982 | Blinne et al. . |
| 4,344,870 | 8/1982 | Blinne et al. . |
| 4,351,932 | 9/1982 | Street et al. . |
| 4,358,561 | 11/1982 | Keske et al. . |
| 4,360,644 | 11/1982 | Naarmann et al. . |
| 4,365,068 | 12/1982 | Darms et al. . |
| 4,375,427 | 3/1983 | Miller et al. . |
| 4,376,710 | 3/1983 | Gardos et al. . |
| 4,381,363 | 4/1983 | Reinhart, Jr. . |
| 4,389,504 | 6/1983 | St. Clair et al. . |
| 4,393,188 | 7/1983 | Takahashi et al. . |
| 4,395,497 | 7/1983 | Naarmann et al. . |
| 4,400,613 | 8/1983 | Popelish . |
| 4,405,770 | 9/1983 | Schoenberg et al. . |
| 4,407,739 | 10/1983 | Naarmann et al. . |
| 4,409,382 | 10/1983 | Keller . |
| 4,410,686 | 10/1983 | Hefner, Jr. et al. . |
| 4,414,269 | 11/1983 | Lubowitz et al. . |
| 4,417,039 | 11/1983 | Reinhardt et al. . |
| 4,417,044 | 11/1983 | Parekh . |
| 4,418,181 | 11/1983 | Monacelli . |
| 4,423,202 | 12/1983 | Choe . |
| 4,429,108 | 1/1984 | Stephens . |
| 4,438,273 | 3/1984 | Landis . |
| 4,438,280 | 3/1984 | Monacelli . |
| 4,446,191 | 5/1984 | Miyadera et al. . |
| 4,448,925 | 5/1984 | Hanson . |
| 4,460,783 | 7/1984 | Nishikawa et al. . |
| 4,465,809 | 8/1984 | Smith . |
| 4,467,011 | 8/1984 | Brooks et al. . |
| 4,476,184 | 10/1984 | Lubowitz et al. . |
| 4,476,295 | 10/1984 | Stephens . |
| 4,482,683 | 11/1984 | Quella et al. . |
| 4,485,140 | 11/1984 | Gannett et al. . |
| 4,485,231 | 11/1984 | Landis . |
| 4,489,027 | 12/1984 | St. Clair et al. . |
| 4,504,632 | 3/1985 | Holub et al. . |
| 4,507,466 | 3/1985 | Tomalia et al. . |
| 4,510,272 | 4/1985 | Loszewski . |
| 4,515,962 | 5/1985 | Renner . |
| 4,519,926 | 5/1985 | Basalay et al. . |
| 4,520,198 | 5/1985 | D'Alelio et al. . |
| 4,526,838 | 7/1985 | Fujioka et al. . |
| 4,533,692 | 8/1985 | Wolfe et al. . |
| 4,533,693 | 8/1985 | Wolfe et al. . |
| 4,533,724 | 8/1985 | Wolfe et al. . |
| 4,535,117 | 8/1985 | Mathis et al. . |
| 4,536,559 | 8/1985 | Lubowitz et al. . |
| 4,547,553 | 10/1985 | Lubowitz et al. . |
| 4,555,563 | 11/1985 | Hefner, Jr. et al. . |
| 4,556,697 | 12/1985 | Curatolo et al. . |
| 4,556,705 | 12/1985 | McCready . |
| 4,558,120 | 12/1985 | Tomalia et al. . |
| 4,562,231 | 12/1985 | Dean . |
| 4,562,232 | 12/1985 | Smith . |
| 4,563,498 | 1/1986 | Lucas . |
| 4,563,514 | 1/1986 | Liu et al. . |
| 4,564,553 | 1/1986 | Pellegrini et al. . |
| 4,567,216 | 1/1986 | Qureshi et al. . |
| 4,567,240 | 1/1986 | Hergenrother et al. . |
| 4,568,737 | 2/1986 | Tomalia et al. . |
| 4,574,144 | 3/1986 | Yates, III et al. . |
| 4,574,148 | 3/1986 | Wicker, Jr. et al. . |
| 4,574,154 | 3/1986 | Okamoto et al. . |
| 4,576,857 | 3/1986 | Gannett et al. . |
| 4,577,034 | 3/1986 | Durvasula . |
| 4,578,470 | 3/1986 | Webb . |
| 4,579,957 | 4/1986 | Kanayama et al. . |
| 4,584,364 | 4/1986 | Lubowitz et al. . |
| 4,587,329 | 5/1986 | Tomalia et al. . |
| 4,590,363 | 5/1986 | Bernard . |
| 4,599,383 | 7/1986 | Satoji . |
| 4,600,769 | 7/1986 | Kumar et al. . |
| 4,604,437 | 8/1986 | Renner . |
| 4,611,022 | 9/1986 | Hefner, Jr. . |
| 4,611,048 | 9/1986 | Peters . |
| 4,614,767 | 9/1986 | Dean . |
| 4,615,832 | 10/1986 | Kress et al. . |
| 4,616,070 | 10/1986 | Zeiner et al. . |
| 4,616,071 | 10/1986 | Holubka . |
| 4,617,390 | 10/1986 | Hoppe et al. . |
| 4,624,888 | 11/1986 | St. Clair et al. . |
| 4,628,067 | 12/1986 | Chen, Sr. et al. . |
| 4,628,079 | 12/1986 | Zecher et al. . |
| 4,629,777 | 12/1986 | Pfeifer . |
| 4,631,337 | 12/1986 | Tomalia et al. . |
| 4,638,027 | 1/1987 | Mark et al. . |
| 4,640,944 | 2/1987 | Brooks . |
| 4,649,080 | 3/1987 | Fischer et al. . |
| 4,654,410 | 3/1987 | Kashiwame et al. . |
| 4,657,973 | 4/1987 | Endo et al. . |
| 4,657,977 | 4/1987 | Peters . |
| 4,657,987 | 4/1987 | Rock et al. . |
| 4,657,990 | 4/1987 | Daoust et al. . |
| 4,660,057 | 4/1987 | Watanabe et al. . |
| 4,661,604 | 4/1987 | Lubowitz et al. . |

| | | |
|---|---|---|
| 4,663,378 | 5/1987 | Allen . |
| 4,663,399 | 5/1987 | Peters . |
| 4,663,423 | 5/1987 | Yamada et al. . |
| 4,663,424 | 5/1987 | Stix et al. . |
| 4,663,425 | 5/1987 | Evers et al. . |
| 4,675,414 | 6/1987 | DeFusco et al. . |
| 4,680,326 | 7/1987 | Leland et al. . |
| 4,680,377 | 7/1987 | Matsumura et al. . |
| 4,684,714 | 8/1987 | Lubowitz et al. . |
| 4,690,972 | 9/1987 | Johnson et al. . |
| 4,691,025 | 9/1987 | Domeier et al. . |
| 4,694,064 | 9/1987 | Tomalia et al. . |
| 4,695,610 | 9/1987 | Egli et al. . |
| 4,699,975 | 10/1987 | Katto et al. . |
| 4,703,081 | 10/1987 | Blackwell et al. . |
| 4,708,983 | 11/1987 | Liang . |
| 4,709,004 | 11/1987 | Dai . |
| 4,714,768 | 12/1987 | Hemkielm et al. . |
| 4,716,212 | 12/1987 | Gaughan . |
| 4,719,283 | 1/1988 | Bartmann . |
| 4,727,118 | 2/1988 | Egami . |
| 4,728,742 | 3/1988 | Renner . |
| 4,730,030 | 3/1988 | Hahn et al. . |
| 4,737,550 | 4/1988 | Tomalia . |
| 4,739,030 | 4/1988 | Lubowitz et al. . |
| 4,739,075 | 4/1988 | Odagiri et al. . |
| 4,742,166 | 5/1988 | Renner . |
| 4,748,227 | 5/1988 | Matzner et al. . |
| 4,755,584 | 7/1988 | Tomioka et al. . |
| 4,755,585 | 7/1988 | Hanson et al. . |
| 4,757,118 | 7/1988 | Das et al. . |
| 4,757,128 | 7/1988 | Domb et al. . |
| 4,757,150 | 7/1988 | Guggenheim et al. . |
| 4,759,986 | 7/1988 | Marikar et al. . |
| 4,760,106 | 7/1988 | Gardner et al. . |
| 4,764,427 | 8/1988 | Hara et al. . |
| 4,766,180 | 8/1988 | Wong . |
| 4,766,197 | 8/1988 | Clendinning et al. . |
| 4,769,424 | 9/1988 | Takekoshi et al. . |
| 4,769,426 | 9/1988 | Iwasaki et al. . |
| 4,769,436 | 9/1988 | Beck et al. . |
| 4,772,722 | 9/1988 | Lukacs, III . |
| 4,774,282 | 9/1988 | Qureshi . |
| 4,777,208 | 10/1988 | Hefner, Jr. . |
| 4,778,830 | 10/1988 | Streu et al. . |
| 4,778,859 | 10/1988 | Ai et al. . |
| 4,778,898 | 10/1988 | Vonlanthen et al. . |
| 4,786,669 | 11/1988 | Dewhirst . |
| 4,786,685 | 11/1988 | Takida et al. . |
| 4,786,713 | 11/1988 | Rule et al. . |
| 4,798,685 | 1/1989 | Yaniger . |
| 4,798,686 | 1/1989 | Hocker et al. . |
| 4,798,882 | 1/1989 | Petri . |
| 4,801,676 | 1/1989 | Hisgen et al. . |
| 4,801,677 | 1/1989 | Eckhardt et al. . |
| 4,804,722 | 2/1989 | Hesse et al. . |
| 4,804,724 | 2/1989 | Harris et al. . |
| 4,806,407 | 2/1989 | Skinner et al. . |
| 4,808,717 | 2/1989 | Saito et al. . |
| 4,812,518 | 3/1989 | Haubennestel et al. . |
| 4,812,534 | 3/1989 | Blakely . |
| 4,812,552 | 3/1989 | Cliffton et al. . |
| 4,812,588 | 3/1989 | Schrock . |
| 4,814,416 | 3/1989 | Poll . |
| 4,814,417 | 3/1989 | Sugimori . |
| 4,814,421 | 3/1989 | Rosenquist . |
| 4,814,472 | 3/1989 | Lau . |
| 4,816,503 | 3/1989 | Cunningham et al. . |
| 4,816,526 | 3/1989 | Bristowe et al. . |
| 4,816,527 | 3/1989 | Rock . |
| 4,816,556 | 3/1989 | Gay et al. . |
| 4,820,770 | 4/1989 | Schleifstein . |
| 4,826,927 | 5/1989 | Schmid et al. . |
| 4,826,997 | 5/1989 | Kirchhoff . |
| 4,827,000 | 5/1989 | Schwartz . |
| 4,829,138 | 5/1989 | Barthelemy . |
| 4,835,197 | 5/1989 | Mercer . |
| 4,837,256 | 6/1989 | Gardner et al. . |
| 4,839,378 | 6/1989 | Koyama et al. . |
| 4,845,150 | 7/1989 | Kovak et al. . |
| 4,845,167 | 7/1989 | Alston et al. . |
| 4,845,185 | 7/1989 | Teramoto et al. . |
| 4,845,278 | 7/1989 | Erhan . |
| 4,851,280 | 7/1989 | Gupta . |
| 4,851,287 | 7/1989 | Hartsing, Jr. . |
| 4,851,494 | 7/1989 | Eldin et al. . |
| 4,851,496 | 7/1989 | Poll et al. . |
| 4,851,505 | 7/1989 | Hayes . |
| 4,861,855 | 8/1989 | Bockrath et al. . |
| 4,861,882 | 8/1989 | Hergenrother et al. . |
| 4,861,915 | 8/1989 | Clendinning et al. . |
| 4,871,475 | 10/1989 | Lubowitz et al. . |
| 4,874,834 | 10/1989 | Higashi et al. . |
| 4,876,325 | 10/1989 | Olson et al. . |
| 4,876,330 | 10/1989 | Higashi et al. . |
| 4,891,167 | 1/1990 | Clendinning et al. . |
| 4,891,408 | 1/1990 | Newman-Evans . |
| 4,891,460 | 1/1990 | Ishii . |
| 4,895,892 | 1/1990 | Satake et al. . |
| 4,895,924 | 1/1990 | Satake et al. . |
| 4,897,527 | 1/1990 | Cripps et al. . |
| 4,902,335 | 2/1990 | Kume et al. . |
| 4,902,440 | 2/1990 | Takeyama et al. . |
| 4,902,769 | 2/1990 | Cassidy et al. . |
| 4,902,773 | 2/1990 | Bodnar et al. . |
| 4,916,210 | 4/1990 | Jackson . |
| 4,916,235 | 4/1990 | Tan et al. . |
| 4,919,992 | 4/1990 | Blundell et al. . |
| 4,923,752 | 5/1990 | Cornelia . |
| 4,927,899 | 5/1990 | Michaud et al. . |
| 4,927,900 | 5/1990 | Michaud et al. . |
| 4,931,531 | 6/1990 | Tamai et al. . |
| 4,931,540 | 6/1990 | Mueller et al. . |
| 4,973,662 | 11/1990 | Odagiri et al. . |
| 5,066,776 | 11/1991 | Russeler et al. . |
| 5,075,537 | 12/1991 | Lorenzen et al. . |
| 5,086,154 | 2/1992 | Camberlin et al. . |
| 5,111,026 | 5/1992 | Ma . |
| 5,112,936 | 5/1992 | Okamoto . |
| 5,134,421 | 7/1992 | Boyd et al. . |
| 5,230,956 | 7/1993 | Cole et al. . |
| 5,254,605 | 10/1993 | Kim et al. . |

FOREIGN PATENT DOCUMENTS

| | | |
|---|---|---|
| 0266662 | 11/1988 | European Pat. Off. . |
| 0292434 | 11/1988 | European Pat. Off. . |
| 7100975 | 1/1971 | France . |
| 1951632 | 5/1971 | Germany . |
| 2722513 | 11/1978 | Germany . |
| 47-51116 | 12/1972 | Japan . |
| 48-78299 | 10/1973 | Japan . |
| 1453625 | 12/1973 | Japan . |
| 50-22091 | 3/1975 | Japan . |
| 56-71068 | 6/1981 | Japan . |
| 58059219 | 10/1981 | Japan . |
| 57-100111 | 6/1982 | Japan . |
| 58-76425 | 5/1983 | Japan . |
| 58-215450 | 12/1983 | Japan . |
| 59-170122 | 9/1984 | Japan . |
| 60-250030 | 12/1985 | Japan . |
| 12104088A | 2/1988 | Japan . |
| 907105 | 10/1962 | United Kingdom . |
| 1069061 | 5/1967 | United Kingdom . |
| 1099096 | 1/1968 | United Kingdom . |

| 2002378 | 3/1982 | United Kingdom . |
| 81/01855 | 7/1981 | WIPO . |
| 84/04313 | 11/1984 | WIPO . |

OTHER PUBLICATIONS

Heidemann, "Oligomers" Encyclopedia of Polymer Science and Technology vol. 9 Molding to Petroleum Resins 485–506 1968.

Second–generation polyimide raises continuous–use temperatures Advanced Composites May/Jun. 1988.

Vanucci et al., 700° F. Properties of Autoclave Cured PMR–II Composites NASA Tech. Memo 100923 Sep., 1988.

Vanucci, PMR Polyimide Compositions for Improved Performance at 371° C. NTIS N87–16071 Apr., 1987.

Elsenbaumer et al., Highly Conductive Meta Derivatives of Poly(phenylene Sulfide) J. Polymer Sci: Polymer Phys. Ed., vol. 20, 1781–1787 1982.

Patel et al., Poly–Schiff Bases, I. Preparation of Poly–Schiff Bases from 4,4'–Diacetyl Diphenyl Ether (DDE) with Various Diamines J. of Polymer Sci: Polymer Chem. Ed., vol. 20, 1985–1992 1982.

Walton, A New Network Polymer as an Electrical Conductor and Thermally Stable Plastic Am. Chem, Soc. Org. Coat Plast. Chem., vol. 42, 595–599 1980.

Lubowitz et al., Novel High Temperature Matrix Materials.

Serafini et al., Thermally Stable Polyimides from Solutions of Monomeric Reactants Journal of Applied Polymer Science, vol. 16, pp. 905–915 1972.

Southcott et al., The Development of Processable, Fully Imidized, Polyimides for High–Temperature Applications High Perform. Polym. 6 1–12 1994.

Spillman et al., Copolymers of Poly(Para–Phenylene Terephthalamide) Containing a Thermally Activated Cross–Linking Agent PMSW vol. 68, Spring Meetings 1993, Denver, CO 1993.

Falcone, Recent Advances in Polyimides and other High Performance Polymers Symposium sponsored by Polymer Chemistry, Inc. American Chemical Society Jan. 22–25, 1990.

Radlmann, et al., New Synthesis of Poly(ether Ketones). (44195h) Chemical Abstracts vol. 72, 1970, p. 44187 1970.

Bryant, et al., Synthesis and Properties of Phenylethynyl––Terminated Polyimides Polymer PrePrints, vol. 34, No. 1, Mar., 1993, Denver, CO 1993.

Crivello et al., Polyimidothioether–Polysulfide Block Polymers Journal of Polymer Science, Polymer Chemistry Ed., vol. 13, pp. 1819–1842 (1975) 1975.

Frazer, High Temperature Resistant Polymers Interscience Publishers, Copyright 1968 by John Wiley & Sons, Inc., pp. 139–213 1986.

Mittal (ed), Polyimides Plenum Press, NY, vol. 1 & 2 1984.

Mittal (ed), Polyimides—Synthetic's Characteristics Plenum Press, NY, vol. 2, pp. 907–1041 1984.

Mittal (ed), Polyimides—Synthetic's Characteristics Plenum Press, NY, vol. 1, pp. 89–95 1984.

MULTIPLE CHEMICALLY FUNCTIONAL END CAP MONOMERS

REFERENCE TO RELATED APPLICATIONS

The present application is a divisional based upon U.S. patent application Ser. No. 08/327,942, filed Oct. 21, 1994 which is separately a continuation-in-part application based upon each of these seventeen, copending, United States Patent Applications:

| APPLI-CATION | TITLE | FILING DATE |
|---|---|---|
| 06/773,381 | Conductive, Thermally Stable Oligomers | September 5, 1985 |
| 07/137,493 | Polyester Oligomers and Blends | December 23, 1987 |
| 07/167,656 | Multidimensional Ether and Ester Oligomers | March 14, 1988 |
| 07/168,289 | Liquid Molding Compounds | March 15, 1988 |
| 07/176,518 | Method for Making Multi-dimensional Polyesters | April 1, 1988 |
| 07/212,404 | Conductive, Multi-dimensional Oligomers and Blends | June 27, 1988 |
| 07/241,997 | Polysulfoneimides | September 6, 1988 (now U.S. Pat. No. 5,530,089) |
| 07/460,396 | Polyethersulfone Oligomers and Blends | January 3, 1990 (now U.S. Pat. No. 5,446,120) |
| 07/619,677 | Advanced Composite Blends | November 29, 1990 |
| 07/639,051 | Reactive Polyarylene Sulfide Oligomers | January 9, 1991 |
| 08/043,824 | Extended Acid Halide Capping Monomer | April 6, 1993 (now U.S. Pat. No. 5,367,083) |
| 08/079,999 | Composites Containing Amideimide Sized Fibers | June 21, 1993 (now U.S. Pat. No. 5,403,666) |
| 08/159,823 | Polyimide Oligomers and Blends and Method of Curing | November 30, 1993 (now U.S. Pat. No. 5,455,115) |
| 08/161,164 | Multidimensional Polyesters | December 3, 1993 (now abandoned) |
| 08/232,682 | Multidimensional Polyamide Oligomers from Polyamine or Polyanhydride Hubs | April 25, 1994 (now U.S. Pat. No. 5,516,876) |
| 08/269,297 | Ester or Ether Oligomers with Multidimensional Morphology | June 30, 1994 (now U.S. Pat. No. 5,550,204) |
| 08/280,866 | Extended Amideimide Hub for Multidimensional Oligomers | July 26, 1994 (now U.S. Pat. No. 5,512,676) |

We incorporate these patent applications by reference.

TECHNICAL FIELD

The present invention relates to multiply chemically functional end cap monomers for making linear and multidimensional oligomers that include multiple chemically functional crosslinking end cap (terminal) groups, and, preferably, to oligomers that have four crosslinking functionalities at each end of its linear backbone or each multidimensional arm. We call these products "multifunctional oligomers." Composites made from these oligomers generally have improved toughness, thermomechanical stability, and thermo-oxidative stability because of the higher number of crosslinks that form upon curing. They constitute engineering thermoplastics. Blends are prepared from mixtures of the oligomers and compatible polymers, oligomers, or both.

BACKGROUND ART

The thermosetting resins that are commonly used today in fiber-reinforced composites cannot be reshaped after thermoforming. Because errors in forming cannot be corrected, these thermosetting resins are undesirable in many applications. In addition, these thermosetting resins, made from relatively low molecular weight monomers, are relatively low molecular weight, and often form brittle composites that have relatively low thermal stabilities.

Although thermoplastic resins are well knoll practical aerospace application of high performance, fiber-reinforced thermoplastic resins is relatively new. Fiber in such composites toughens and stiffens the thermoplastic resin. While the industry is exploring lower temperature thermoplastic systems, like fiber-reinforced polyolefins or PEEKs, our focus is on high performance thermoplastics suitable, for example, for primary structure in advanced high speed aircraft including the High Speed Civil Transport (HSCT). These materials should have high tensile strength, and high glass transitions. Such materials are classified as "engineering thermoplastics." At moderate or high temperatures, the low performance, fiber-reinforced thermoplastic composites (polyolefins or PEEKS, for example) lose their ability to carry loads because the resin softens. Thus, improved thermal stability is needed for advanced composites to find applications in many aerospace situations. The oligomers of the present invention produce advanced composites.

Advanced composites should be thermoplastic, solvent resistant, tough, impact resistant, easy to process, and strong. Oligomers and composites that have high thermomechanical stability and thermo-oxidative stability are particularly desirable.

While epoxy-based composites like those described in U.S. Pat. No. 5,254,605 are suitable for many applications, their brittle nature and susceptibility to degradation often force significant design concessions when these epoxies are selected for aerospace applications. The epoxies are inadequate for applications which require thermally stable, tough composites, especially when the composites are expected to survive for a long time in a hot, oxidizing environment. Recent research has focused on polyimide composites to achieve an acceptable balance between thermal stability, solvent resistance, and toughness for these high performance applications. Still the maximum temperatures for use of the polyimide composites, such as those formed from PMR-15, can only be used at temperatures below about 600°–625° F. (315°–330° C.), since they have glass transition temperatures of about 690° F. (365° C.). PMR composites are usable in long term service (50,000 hours) at about 350° F. (170° C.). They can withstand temperatures up to about 600° F. (315° C.) for up to about five hundred hours.

PMR-15 prepregs, however, suffer significant processing limitations that hinder their adoption because the prepreg has a mixture of the unreacted monomer reactants on the fiber-reinforcing fabric, making them sensitive to changes in temperature, moisture, and other storage conditions, which cause the prepregs to be at different stages of cure. The resulting composites have varying, often unpredictable properties. Aging these PMR prepregs even in controlled environments can lead to problems. The reactants on the prepreg are slowed in their reaction by keeping them cold, but the quality of the prepreg depends on its absolute age and on its prior storage and handling history. And, the quality of the composite is directly proportional to the quality of the prepregs. In addition, the PMR monomers are toxic or hazardous (especially MDA), presenting health and safety concerns for the workforce. Achieving complete formation of stable imide rings in the PMR composites remains an issue. These and other problems plague PMR-15 composites.

The commercial long chain polyimides also present significant processing problems. AVIMID-N and AVIMID-KIII (trademarks of E. I. dupont de Nemours) resins and prepregs differ from PMRs because they do not include aliphatic chain terminators which the PMRs use to control molecular weight and to retain solubility of the PMR intermediates during consolidation and cure. Lacking the chain terminators, the AVIMIDs can chain extend to appreciable molecular weights. To achieve these molecular weights, however, the AVIMIDs (and their LARC cousins) rely on the melting of crystalline powders to retain solubility or, at least, to permit processing. It has proven difficult to use the AVIMIDs in aerospace parts both because of their crystalline melt intermediate stage and the PMR plague that these AVIMID prepregs also suffer aging.

So, research continues and is now turning toward soluble systems like those we described in our earlier patents, including acetylenic-terminated AVIMID-KIII prepregs of the Hergenrother (NASA-Langley) type. For these soluble systems, many different polyimide sulfone compounds have been synthesized to provide unique properties or combinations of properties. For example, Kwiatkowski and Brode (U.S. Pat. No. 3,839,287) synthesized monofunctional, maleic-capped linear polyarylimides. Holub and Evans (U.S. Pat. No. 3,729,446) synthesized similar maleic or nadic-capped, imido-substituted polyester compositions.

For imides and many other resin backbones we have shown surprisingly high glass transition temperatures, reasonable processing parameters and constraints for the prepregs, and desirable physical properties for the composites by using soluble oligomers having difunctional caps, especially those with nadic caps. Linear oligomers of this type include two crosslinking functionalities at each end of the resin chain to promote crosslinking upon curing. Linear oligomers are "monofunctional" when they have one crosslinking functionality at each end. The preferred oligomers from our earlier research were "difunctional," because they had two functional groups at each end. Upon curing, the crosslinking functionalities provide sites for chain extension. Because the crosslinks were generally the weakest portions of the resulting composite, we improved thermooxidative stability of the composites by including two crosslinks at each junction. We built in redundancy, then, at each weak point. We maintained solubility of the reactants and resins using, primarily, phenoxyphenyl sulfone chemistries. Our work during the past fifteen years across a broad range of resin types or chemical families is described in the following, forty-nine United States Patents (all of which we incorporate by reference):

| INVENTOR | PATENT | TITLE | ISSUE DATE |
|---|---|---|---|
| Lubowitz et al. | 4,414,269 | Solvent Resistant Polysulfone and Polyethersulfone Composites | November 8, 1983 |
| Lubowitz et al. | 4,476,184 | Thermally Stable Polysulfone Compositions for Composite Structures | October 9, 1984 |
| Lubowitz et al. | 4,536,559 | Thermally Stable Polyimide Polysulfone Compositions for Composite Structures | August 20, 1985 |
| Lubowitz et al. | 4,547,553 | Polybutadiene Modified Polyester Compositions | October 15, 1985 |
| Lubowitz et al. | 4,584,364 | Phenolic-Capped Imide Sulfone Resins | April 22, 1986 |
| Lubowitz et al. | 4,661,604 | Monofunctional Cross-linking Imidophenols | April 28, 1987 |
| Lubowitz et al. | 4,684,714 | Method for Making Polyimide Oligomers | August 4, 1987 |
| Lubowitz et al. | 4,739,030 | Difunctional End-Cap Monomers | April 19, 1988 |
| Lubowitz et al. | 4,847,333 | Blended Polyamide Oligomers | July 11, 1989 |
| Lubowitz et al. | 4,851,495 | Polyetherimide Oligomers | July 25, 1989 |
| Lubowitz et al. | 4,851,501 | Polyethersulfone Prepregs, Composites, and Blends | July 25, 1989 |
| Lubowitz et al. | 4,868,270 | Heterocycle Sulfone Oligomers and Blends | September 19, 1989 |
| Lubowitz et al. | 4,871,475 | Method for Making Polysulfone and Polyethersulfone Oligomers | October 3, 1989 |
| Lubowitz et al. | 4,876,328 | Polyamide Oligomers | October 24, 1989 |
| Lubowitz et al. | 4,935,523 | Crosslinking Imidophenylamines | June 19, 1990 |
| Lubowitz et al. | 4,958,031 | Crosslinking Nitromonomers | September 18, 1990 |
| Lubowitz et al. | 4,965,336 | High Performance Heterocycle Oligomers and Blends | October 23, 1990 |
| Lubowitz et al. | 4,980,481 | Pyrimidine-Based End-Cap Monomers and Oligomers | December 25, 1990 |
| Lubowitz et al. | 4,981,922 | Blended Etherimide Oligomers | January 1, 1991 |
| Lubowitz et al. | 4,985,568 | Method of Making Crosslinking Imidophenyl-amines | January 15, 1991 |
| Lubowitz et al. | 4,990,624 | Intermediate Anhydrides Useful for Synthesizing Etherimides | February 5, 1991 |
| Lubowitz et al. | 5,011,905 | Polyimide Oligomers and Blends | April 30, 1991 |
| Lubowitz et al. | 5,066,541 | Multidimensional Heterocycle Sulfone Oligomers | November 19, 1991 |
| Lubowitz et al. | 5,071,941 | Multidimensional Ether Sulfone Oligomers | December 10, 1991 |
| Lubowitz et al. | 5,175,233 | Multidimensional Ester or Ether Oligomers with Pyrimidinyl End Caps | December 29, 1992 |
| Lubowitz et al. | 5,082,905 | Blended Heterocycles | January 21, 1992 |
| Lubowitz et al. | 5,087,701 | Phthalimide Acid Halides | February 11, 1992 |
| Lubowitz et al. | 5,104,967 | Amideimide Oligomers and Blends | April 14, 1992 |
| Lubowitz et al. | 5,109,105 | Polyamides | April 28, 1992 |
| Lubowitz et al. | 5,112,939 | Oligomers Having Pyrimidinyl End Caps | May 12, 1992 |
| Lubowitz et al. | 5,115,087 | Coreactive Imido Oligomer Blends | May 19, 1992 |
| Lubowitz et al. | 5,116,935 | High Performance Modified Cyanate Oligomers and Blends | May 26, 1992 |

| INVEN- TOR | PAT- ENT | TITLE | ISSUE DATE |
| --- | --- | --- | --- |
| Lubowitz et al. | 5,120,819 | High Performance Heterocycles | June 9, 1992 |
| Lubowitz et al. | 5,126,410 | Advanced Heterocycle Oligomers | June 30, 1992 |
| Lubowitz et al. | 5,144,000 | Method for Forming Crosslinking Oligomers | September 1, 1992 |
| Lubowitz et al. | 5,151,487 | Method of Preparing a Crosslinking Oligomer | September 29, 1992 |
| Lubowitz et al. | 5,155,206 | Amideimide Oligomers, Blends and Sizings for Carbon Fiber Composites | October 13, 1992 |
| Lubowitz et al. | 5,159,055 | Coreactive Oligomer Blends | October 27, 1992 |
| Lubowitz et al. | 5,175,234 | Lightly-Crosslinked Polyimides | December 29, 1992 |
| Lubowitz et al. | 5,175,304 | Halo- or Nitro-Intermediates Useful for Synthesizing Etherimides | December 29, 1992 |
| Lubowitz et al. | 5,198,526 | Heterocycle Oligomers with Multidimensional Morphology | March 30, 1993 |
| Lubowitz et al. | 5,210,213 | Multidimensional Crosslinkable Oligomers | May 11, 1993 |
| Lubowitz et al. | 5,216,117 | Amideimide Blends | June 1, 1993 |
| Lubowitz et al. | 5,227,461 | Extended Difunctional End-Cap Monomers | July 13, 1993 |
| Lubowitz et al. | 5,239,046 | Amideimide Sizing For Carbon Fiber | August 24, 1993 |
| Lubowitz et al. | 5,268,519 | Lightly Crosslinked Etherimide Oligomers | December 7, 1993 |
| Lubowitz et al. | 5,286,811 | Blended Polyimide Oligomers and Method of Curing Polyimides | February 15, 1994 |
| Lubowitz et al. | 5,344,894 | Polyimide Oligomers and Blends | September 6, 1994 |

The heterocycles (i.e., oxazoles, thiazoles, or imidazoles) use a processing principle more akin to the AVIMIDs than the phenoxyphenyl sulfone solubility principle of our other resins. The heterocycles have poor solubility, even with our "sulfone" chemistries, but they at least form liquid crystals or soluble crystals in strong acids. To produce non-crystalline (amorphous) composites, we capitalize on the ability of our heterocycles to melt at the same temperature range as the cure and promote crosslinking in the melt. With relatively low molecular weight, capped, heterocycle oligomers, we can autoclave process these materials. Autoclave processing is a significant achievement for these heterocycles which present to the industry, perhaps, the most challenging problems. The polybenzoxazoles we produced, in addition, are useful at temperatures up to about 750°–775° F. (400°14 413° C.), since they have glass transition temperatures of about 840° F. (450° C.). We describe multifunctional heterocycle and heterocycle sulfones in copending U.S. patent application Ser. No. 08/327,180 (now U.S. Pat. No. 5,569,739) which we incorporate by reference.

Some aerospace applications need composites which have even higher use temperatures than these polybenzoxazoles while maintaining toughness, solvent resistance, ease of processing, formability, strength, and impact resistance. Southcott et al. discuss the problems of the prior art imide systems and the advantages of our soluble monofunctional and difunctional nadic-capped imide systems in the article: Southcott et al., *"The development of processable, fully imidized, polyimides for high-temperature applications,"* 6 High Perform. Polym., 1–12 (U.K. 1994). For these extremely demanding requirements, our multidimensional oligomers (i.e., oligomers that have three or more arms extending from a central organic hub to yield three-dimensional morphology) have superior processing parameters over more conventional, linear oligomers that might produce composites having these high thermal stabilities. Our multidimensional oligomers can satisfy the thermal stability requirements and can be processed at significantly lower temperatures. Upon curing the end caps, the multidimensional oligomers crosslink so that the thermal resistance of the resulting composite is markedly increased with only a minor loss of stiffness, matrix stress transfer (impact resistance), toughness, elasticity, and other mechanical properties. We can achieve glass transition temperatures above 950° F. (510° C.) with composites cured from our difunctional multidimensional oligomers (which we call "starburst" oligomers). Of course, a full range of use temperatures are possible by selecting the hubs (which usually is an aromatic moiety), the backbone monomers used in the arms, end caps, and number of crosslinking functionalities per cap.

We now believe we can achieve even better properties in advanced composites by including an even higher number of crosslinking functionalities than the mono- or difunctional systems of the linear or multidimensional resins discussed in our earlier patents or patent applications. The higher density of crosslinks provide redundancy at those locations in the macromolecular, cured composite which are most susceptible to thermal degradation.

SUMMARY OF THE INVENTION

The present invention addresses multiple chemically functional end cap monomers useful for making oligomers that produce advanced composites with high thermomechanical stability and high thermo-oxidative stability by using four crosslinking functionalities (i.e., unsaturated hydrocarbon moieties) at each end of the oligomer. Upon curing, the crosslinking functionalities on adjacent oligomers form four parallel linkages in the composite to provide the improved stabilities. The oligomers, however, retain the preferred properties of our difunctional oligomers with respect to handling and processing. The composites we form from our multiple chemically functional oligomers have even higher thermal stabilities for comparable backbone and molecular weight and have higher compressive strengths than our composites formed using our mono- or difunctional oligomers. The preferred oligomers generally have soluble, stable, fully aromatic backbones. Sulfone (—SO$_2$—) or other electronegative linkages ("L") selected from the group consisting of —SO$_2$—, —S—, —CO—, —(CF$_3$)$_2$C—, or —(CH$_3$)$_2$C— in the backbones between aromatic groups provide improved toughness for the composites and provide the improved solubility for the oligomers that is so important to effective processing. A typical backbone usually has repeating units of the general formula:

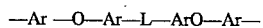

wherein Ar is an aromatic radical (and preferably phenylene) and L is an electronegative linkage as previously defined. In this description we will refer to "L" as a sulfone. Any of the identified electronegative groups can be substituted, however, for —SO$_2$—.

The four caps at each end of the backbone of a linear oligomer or at the end of each arm of a multidimensional oligomer provide areas of high stiffness in the composite product. These stiff, highly crosslinked areas are relatively lightly interspersed in a thermoplastic matrix, yielding superior composites for aerospace applications. Generally, highly crosslinked matrices yield high compressive strength but the composites are brittle. Thermoplastics are tough but have significantly lower compressive strengths. In the present invention, the multiple chemically functional end caps produce highly crosslinked micelles within the resin matrix equivalent in size roughly to colloidal particles. These micelles enhance resin interactions that are vital to achieve high compressive strengths by, we believe, adsorbing the linear polymer chains onto the micelle surfaces and linking multiple linear chains. Thus, we achieve thermoplastics with high compressive strength.

Our preferred four functional crosslinkable, thermoplastic oligomers are formed by reacting in the appropriate stoichiometry an end cap monomer with one or more reactants selected to form the predominant and characteristic backbone linkage by which we identify the nature of the resulting oligomer (i.e., ether, ester, imide, amide, amideimide, carbonate, sulfone, etc.) in a suitable solvent under an inert atmosphere. The soluble oligomers generally have a weight average molecular weight (MW) of between about 5,000 and 40,000, preferably between about 5,000–15,000, and more preferably between 10,000–15,000. We generally try to synthesize oligomers to the highest MWs we can provided that the oligomers remain soluble in conventional processing solvents. In these ranges, the oligomer will have thermoplastic characteristics.

Multidimensional oligomers include an organic hub and three or more substantially identical radiating arms, each arm terminating with a residue of a multifunctional crosslinking end cap monomer. Suitable hubs radicals are described in the patents we earlier incorporated by reference with respect to our monofunctional and difunctional oligomer research, although we prefer a 1,3,5-phenylene (i.e., benzenetriyl). For multiple chemically functional end caps, we prefer linear morphology over multidimensional morphology because linear systems are easier to prepare to have significant MW in the backbone between the caps. Such high MW better allows the micelles that form on crosslinking to provide their advantages to the compressive strength.

We can also blend our linear or multidimensional oligomers as we did with the difunctional systems. A blend might include a linear oligomer with a comparable linear polymer, a multidimensional oligomer with a multidimensional polymer, a linear oligomer with a multidimensional oligomer, or the like. By "polymer," we mean a resin that does not include the crosslinking functionalities of our oligomers. By "oligomer," we mean any molecular weight moiety that includes crosslinking functionalities at its ends to allow it to react (chain-extend) to increase the effective molecular weight when the oligomer cures to form a composite. By "crosslinking functionality," we mean a terminating, unsaturated hydrocarbon group that can be thermally or chemically activated when the resin is in the melt to covalently bond to an adjacent, corresponding moiety on another oligomer.

A blend will generally include substantially equimolar amounts of the oligomer and a polymer. The polymer will generally have the same backbone structure and MW as the oligomer (or it might have a higher MW since the oligomer will chain-extend upon curing). We prepare blends by mixing miscible solutions of the oligomers and polymers.

Prepregs and composites are the most preferred products of the oligomers and blends, although we can also prepare varnishes, films, and coatings. Some oligomers are also suitable as sizings for carbon fibers. We can also prepare PMR-analogs where reactive monomers are prepregged. By "composite," we mean the product of curing and consolidating the oligomers to produce high MW chains through crosslinking, chain extension.

BEST MODE CONTEMPLATED FOR CARRYING OUT THE INVENTION

We will first discuss elements that are relatively independent of the resin chemistries before discussing the details of the end cap monomers and, finally, the individual resin chemistries:

1. Overriding Principles and Common Features

The weight average molecular weight (MW) of the multiple chemically functional oligomers of the present invention should provide thermoplastic character to the oligomer and generally should be between 5,000 and 40,000, but preferably between about 10,000 and 35,000, and still more preferably between 15,000 and 30,000. Such weights are usually achievable by using between 1–20 molecules of each reactant in the backbone (with two caps, of course, for linear systems) and often between 1–5 molecules of each reactant, as those of ordinary skill will recognize. We seek to synthesize the highest MW that we can which will remain soluble and easy to process. We seek the highest MW that we can successfully synthesize repeatedly and reliably. Within the preferred range, the oligomers are relatively easy to process to form composites that are tough, have impact resistance, possess superior thermomechanical properties, and have superior thermo-oxidative stability. When oligomers having MW less than about 5,000 are cured by crosslinking, the thermosetting character of the material is increased so that the ability to thermoform the product may be drastically reduced or eliminated.

Solubility of the oligomers becomes an increasing problem as chain length increases. Therefore, from a solubility standpoint, we prefer shorter chains for processing, if the resulting composites retain the desired properties. That is, the chains should be long enough to yield thermoplastic characteristics to the composites but short enough to keep the oligomers soluble during the reaction sequence.

We represent the oligomers of the present invention by the formulae: $\xi$—$R_4$—$\xi$ for linear oligomers or $\partial$—$(A$—$\xi)_w$ for multidimensional oligomers wherein w=3 or 4; $\xi$ is the residue of a multiple chemically functional end cap monomer; $\partial$ is a "w" valent, multidimensional organic hub;. A is a multidimensional arm, and $R_4$ is a divalent, linear, aromatic, aliphatic, or alicyclic organic radical. Preferred backbones ($R_4$ or A) are aromatic chains to provide the highest thermal stability where the predominant backbone linkages are selected from the group consisting of:

imide
amideimide
etherimide
ether
ether sulfone
arylene sulfide (PPS)
ester
ester sulfone
amide
carbonate
cyanate ester and
esteramide.

We rise "linear" to mean generally in a line or in one plane and to distinguish readily from "multidimensional" where we produce 3-D systems. "Linear" systems are not perfectly straight, because of carbon chemistry. "Linear" systems are the conventional morphology for polymer chemistry resulting from "head-to-tail" condensation of the reactants to form a chain. "Multidimensional" oligomers include a hub from which three or more arms extend.

We seek thermally stable oligomers suitable for high temperature advanced composites. Such oligomers generally include a high degree of aromatic groups. The stable aromatic bond energies produce an oligomer with outstanding thermal stability. Acceptable toughness and impact resistance is gained through selection of the linkages within the linear chains or in the arms of aromatic groups radiating in our multidimensional oligomers from the central aromatic hub. These toughening linkages are ethers, esters, and the electronegative ("sulfone") linkages (L) selected from the group consisting of —CO—, —$SO_2$—, —S—, —$(CF_3)_2C$—, or —$(Me)_2C$—, that we earlier discussed. Generally, —CO— and —$SO_2$— groups are preferred for cost, convenience, and performance. The group —S—S— should be avoided, since it is too thermally labile.

We retain processability in our oligomers by keeping them soluble in conventional processing solvents through the inclusion of soluble segments in their backbones. The backbones generally are formed by condensing two monomer reactants $A_e$ and $B_e$ with chain extension quenched with our multiple chemically functional end cap monomers. $A_e$ is an acid monomer reactant and $B_e$ is a base. $A_e$ and $B_e$ produce the characteristic backbone linkage —$\delta_e$— for which we name the oligomer. The linear oligomers have the general formula:

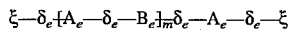

wherein m typically is a small integer between 0 and 20. To achieve solubility, we prefer that at least one of $A_e$ or $B_e$ include a soluble repeating unit of the formula:

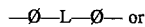 or

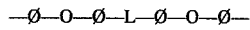

wherein $\emptyset$=phenylene and

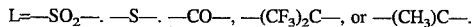

Generally, the $A_e$ and $B_e$ use our phenoxyphenyl sulfone solubility principle. By analogy, we include the same principles in our multidimensional oligomers.

In multidimensional oligomers of all resin types, the organic hub ($\partial$) includes a plurality of rays or spokes radiating from the hub in the nature of a star to provide multidimensional crosslinking through suitable terminal groups with a greater number (i.e. higher density) of crosslinking bonds than linear arrays provide. Usually the hub will have three radiating chains to form a "Y" pattern. In some cases, we use four chains. Including more chains may lead to steric hindrance as the hub is too small to accommodate the radiating chains. We prefer a trisubstituted phenyl hub (i.e., a benzenetriyl) with the chains being symmetrically placed about the hub.

Although the preferred aromatic moieties are aryl groups (such as phenylene, biphenylene, and naphthylene), other aromatic groups can be used, if desired, since the stabilized aromatic bonds will also probably provide the desired thermal stability. For example, we can use azaline (melamine) (i.e.,

)

or pyrimidine (i.e.,

)

groups.

We make prepregs from the oligomers of the present invention by the conventional method of impregnating a suitable fabric or other reinforcement with a mixture of the oligomer and a solvent. We can add suitable coreactants to the solvent when preparing prepregs, especially those having maleic end caps, as taught in our earlier patents.

We can also prepare prepregs for composites, especially for PPS resins, by interleaving layers of fabric with layers of a resin film comprising an oligomer or blend, and then subjecting the resultant stack of interleaved materials to heat and pressure sufficient to "flow" the oligomer into the fabric and to crosslink the oligomer to form the fiber-reinforced composite. According to a further alternative, we can spin the oligomer into fibers, and weave these fibers with fibers of reinforcing material to produce a prepreg. This prepreg is cured in a manner comparable to the method of forming a composite from interleaved oligomer film and fabric layers. Finally, especially for PPS resins, we can use the powder impregnation technology common for prepregging PPS.

We cure the conventional prepregs by conventional vacuum bag autoclave techniques to crosslink the end caps. Temperatures suitable for curing are in the range of 150°–650° F. (65°–345° C.). The resulting product is a cured, thermally stable, solvent-resistant composite. Postcuring to ensure essentially complete addition polymerization through the four-caps likely is desirable if not essential. The composites have stiff, highly crosslinked micelles dispersed in a thermoplastic matrix. The crosslinked oligomer may also be used as an adhesive without curing. Such adhesives may be filled, if desired.

Blended oligomers typically comprise a substantially equimolar amount of the oligomer and a comparable polymer that is incapable of crosslinking with the selected crosslinkable oligomers. These blends merge the desired properties of crosslinking oligomers with those of the noncrosslinking polymer to provide tough, yet processable, resin blends. The comparable polymer is usually synthesized by condensing the same monomer reactants of the crosslinking oligomer and quenching the polymerization with a suitable terminating group. The terminating group lacks the hydrocarbon unsaturation common to the oligomer's end cap monomers. In this way, the comparable polymer has the identical backbone to that of the crosslinkable oligomer but does not have the crosslinkable end caps. Generally the terminating group will be a simple anhydride (such as benzoic anhydride), phenol, or benzoyl acid chloride to quench the polymerization and to achieve a MW for the comparable polymer substantially equal to or initially higher than that of the crosslinkable oligomer.

We can prepare blends by combining the oligomers of the present invention with corresponding linear or multidimensional, monofunctional or difunctional oligomers of our earlier patents or our copending patent applications. We can blend three or more components. We can blend different resins (i.e., advanced composite blends corresponding to those blends described in U.S. patent application Ser. No. 07/619,677 or coreactive oligomer blends corresponding to these blends described, e.g., in U.S. Pat. Nos. 5,115,087 and 5,159,055).

With blends, we can increase the impact resistance of imide composites over the impact resistance of pure imide resin composites without significantly reducing the solvent resistance. A 50-50 molar blend of oligomer and polymer is what we prefer and is formed by dissolving the capped oligomer in a suitable first solvent, dissolving the uncapped polymer in a separate portion of the same solvent or in a second solvent miscible with the first solvent, mixing the two solvent solutions to form a lacquer, and applying the lacquer to fabric in a conventional prepregging process (often called "sweep out").

Although the polymer in the blend often originally has the same length backbone (i.e., MW) as the oligomer, we can adjust the properties of the composite formed from the blend by altering the ratio of MWs for the polymer and oligomer. It is probably nonessential that the oligomer and polymer have identical repeating units, but that the oligomer and polymer merely be compatible in the mixed solution or lacquer prior to sweeping out the blend as a prepreg. Of course, if the polymer and oligomer have identical backbones, compatibility in the blend is more likely to occur.

Solvent resistance may decrease markedly if the comparable polymer is provided in large excess to the crosslinkable oligomer in the blend.

The blends might be semi-interpenetrating networks (i.e., IPNs) of the general type described by Egli et al. "*Semi-Interpenetrating Networks of LARC-TPI*" available from NASA-Langley Research Center or in U.S. Pat. No. 4,695,610.

We prepare prepregs of the oligomers or blends by conventional techniques. While woven fabrics are the typical reinforcement, the fibers can be continuous or discontinuous (in chopped or whisker form) and may be ceramic, organic, carbon (graphite), or glass, as suited for the desired application.

As shorthand, we may use the term "multifunctional" to describe oligomers having four chemically functional groups in each end cap.

Although para isomers are shown for the reactants and the oligomers (and para isomers are preferred), other isomers of the monomer reactants are possible. Meta-isomers may be used to enhance solubility and to achieve melt-flow at lower temperatures, thereby yielding more soluble oligomers with enhanced processing characteristics. The isomers (para- and recta-) may be mixed. Substituents may create steric hindrance problems in synthesizing the oligomers or in crosslinking the oligomers into the final composites, but substituents can be used if these problems can be avoided.

Therefore, each aryl group for the monomer reactants may include substituents for the replaceable hydrogens, the substituents being selected from the group consisting of halogen, alkyl groups having 1–4 carbon atoms, and alkoxy groups having 1–4 carbon atoms. We prefer having no substituents.

Our oligomers and blends are heat-curable resin systems. By the term "heat-curable resin system" we mean a composition containing reactive monomers, oligomers, and/or prepolymers which will cure at a suitably elevated temperature to an infusible solid, and which composition contains not only the aforementioned monomers, oligomers, etc., but also such necessary and optional ingredients such as catalysts, co-monomers, rheology control agents, wetting agents, tackifiers, tougheners, plasticizers, fillers, dyes and pigments, and the like, but devoid of microspheres or other "syntactic" fillers, continuous fiber reinforcement, whether woven, non-woven (random), or unidirectional, and likewise devoid of any carrier scrim material, whatever its nature.

By the term "syntactic foam" we mean a heat-curable resin system which contains an appreciable volume percent of preformed hollow beads or "microspheres." Such foams are of relatively low density, and generally contain from 10 to about 60 weight percent of microspheres, and have a density, upon cure, of from about 0.50 $g/cm^3$ to about 1.1 $g/cm^3$ and preferably have loss tangents at 10 GHz as measured by ASTM D 2520 of 0.008 or less. The microspheres may consist of glass, fused silica, or organic polymer, and range in diameter from 5 to about 200 µm, and have densities of front about 0.1 $g/cm^3$ to about 0.4 $g/cm^3$ to about 0.4 $g/cm^3$.

By the term "matrix resin" we mean a heat-curable resin system which comprises the major part of the continuous phase of the impregnating resin of a continuous fiber-reinforced prepreg or composite. Such impregnating resins may also contain other reinforcing media, such as whiskers, microfibers, short hopped fibers, or microspheres. Such matrix resins are used to impregnate the primary fiber reinforcement at levels of between 10 and 70 weight percent, generally from 30 to 40 weight percent. Both solution and/or melt impregnation techniques may be used to prepare fiber reinforced prepregs containing such matrix resins. The matrix resins may also be used with chopped fibers as the major fiber reinforcement, for example, where pultrusion techniques are involved.

If the linear or multidimensional oligomers include Schiff base or heterocycle linkages (oxazoles, thiazoles, or imidazoles), the composites may be conductive or semiconductive when suitably doped. The dopants are preferably selected from compounds commonly used to dope other polymers, namely, (1) dispersions of alkali metals (for high activity) or (2) strong chemical oxidizers, particularly alkali perchlorates (for lower activity). We do not recommend arsenic compounds and elemental halogens, while active dopants, are too dangerous for general usage.

The dopants apparently react with the oligomers or polymers to form charge transfer complexes. N-type Semiconductors result from doping with alkali metal dispersions. P-type semiconductors result front doping with elemental iodine or perchlorates. We recommend adding the dopant to the oligomer or blend prior to forming the prepreg.

While research into conductive or semiconductive polymers has been active, the resulting compounds (mainly polyacetylenes, polyphenylenes, and polyvinylacetylenes) are unsatisfactory for aerospace applications because the polymers are unstable in air; unstable at high temperatures; brittle after doping; toxic because of the dopants; or intractable. These problems are overcome or significantly reduced with the conductive oligomers of the present invention.

While conventional theory holds that semiconductive polymers should have (1) low ionization potentials, (2) long conjugation lengths, and (3) planar backbones, there is an inherent trade-off between conductivity, toughness, and ease of processing, if these constraints are followed. To overcome the processing and toughness shortcomings common with Schiff base, oxazole, imidazole, or thiazole polymers, the oligomers of the present invention generally include "sulfone" linkages interspersed along the backbone providing a mechanical swivel for the rigid, conductive segments of the arms.

Having described the common features, we next turn to the end cap monomers that characterize the structure and performance of the oligomers of the present invention.

2. The Multiple Chemically Functional End Cap Monomers

End cap monomers of the present invention include organic compounds of the formula:

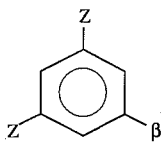  (I)

or

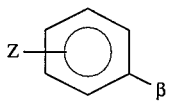  (IA)

wherein ∅=phenylene;

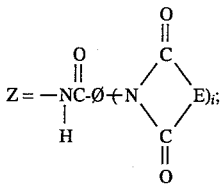

$i = 1$ or $2$;

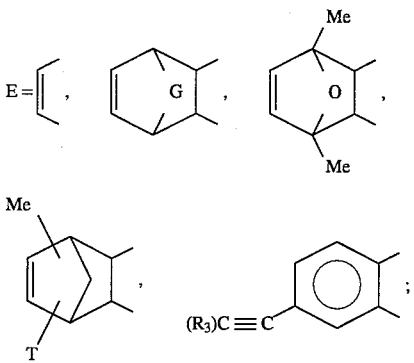

$R_3$=independently, any of lower alkyl, lower alkoxy, aryl, aryloxy, or hydrogen;
G=—CH$_2$—, —S—, —O—, or —(Me)$_2$C—;
T=allyl or methallyl;
Me=methyl;

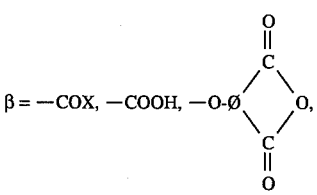

—O-∅-COOH, —O-∅-COX, —X, —O—R$_8$OH,

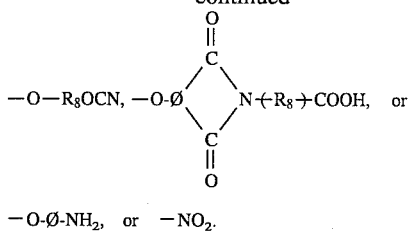

—O-∅-NH$_2$, or —NO$_2$.

X=halogeno, and preferably chlorine;
R=a divalent residue of a diol or nitrophenol; and
R$_8$=the residue of an amino/acid (preferably, phenylene).
Preferably, i=2 so that the monomers have four crosslinking functionalities (i.e., the hydrocarbon unsaturation at the chain end). Other organic unsaturation, however, also can be used. The end capping functionality (E) can also be a cyanate or vinyl selected from:

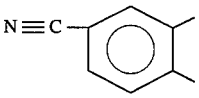 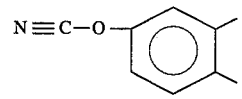

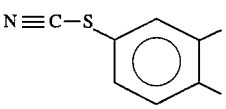 or 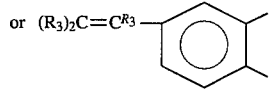

wherein $R_3$=hydrogen, lower alkyl, lower aryl, lower alkoxy, or lower aryloxy.

Ethynyl, trimethylsilylethynyl, phenylethynyl, or benzyl cyclobutane end caps may also be used, if desired. These end caps will probably allow curing at lower temperatures, and will probably produced composites of lower thermal stability.

Preferred end cap monomers for forming oligomers with multiple chemically functional oligomers are phenols having the formula:

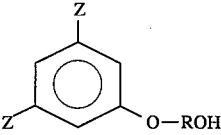  (II)

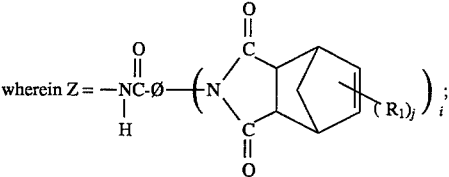

—∅—=phenylene;
ROH=—∅—OH or —∅—L—∅—OH;
R$_1$=any of lower alkyl, lower alkoxy, aryl, substituted alkyl, substituted aryl (including in either case hydroxyl or halo-substituents on replaceable hydrogens), aryloxy, or halogen;
L=—SO$_2$—, —CO—, —S—, —(CF$_3$)$_2$C—, or —(Me)$_2$C—;
i=1 or 2;
j=0, 1, or 2;
G=—CH$_2$—, —S—, —O—, —SO$_2$—, —(Me)CH—, or —(Me)$_2$C—; and
Me=methyl (i.e., —CH$_3$).
Preferably, j=0, so there are no R$_1$ substituents. Also, preferably, i=2, so each phenol monomer has four nadic functionalities. These phenol end cap monomers link to the backbone with an ether or ester linkage. The nadic caps are illustrative of the capping moieties as those skilled in the art will recognize based in our issued patents, copending applications, and the remainder of this specification.

The phenol monomers can be made by several mechanisms. For example, the halide end cap

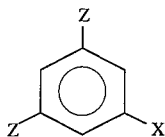

is condensed with the diol HO—Ø—SO$_2$—Ø—OH or HO—Ø—OH to yield the desired cap. The halide end cap is formed by condensing:

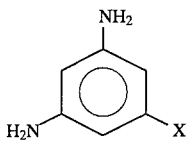

(III)

with:

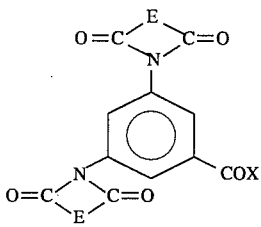

(III)

While a 1,3,5-halodiaminobenzene is shown, and this isomer is preferred, the 1,2,4-halodiaminobenzene isomer might also be used.

The acid or acid halide end cap monomer can be made in a similar way substituting, however, a diaminobenzoic acid for the halodiaminobenzene. Again, we prefer the 1,3,5-isomer, but note that the 2,3-, 2,4-, 2,5-, 3,4-, and 3,5-diaminobenzoic acid isomers are known. The 1,3,5-isomer provides maximum spacing between groups, which likely is important. An extended acid halide monomer can be made by reacting:

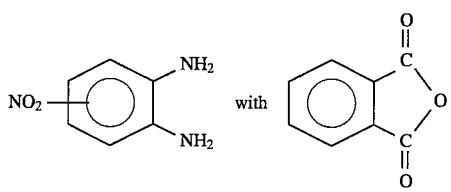

to protect the amines (probably using the 2,4-diaminonitrobenzene isomer), extracting the nitro functionality with HO—Ø—COOH to yield:

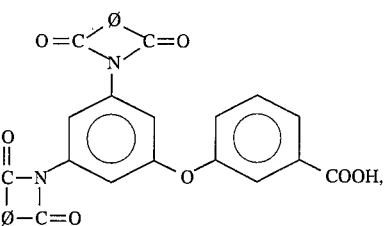

saponifying the imides to recover the amines, recondensing the amines with the acid halide described above, and, finally, converting the carboxylic acid to the acid halide, yielding:

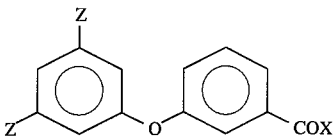

Alternatively, an acid halide end cap monomer of the formula:

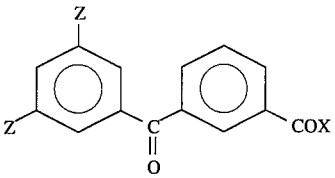

is made by condensing (Z)$_2$—Ø with a dibasic aromatic carboxylic acid in the Friedel-Crafts reaction.

It may also be possible to make an acid halide end cap of the formula:

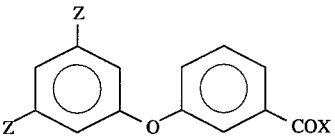

or a corresponding phenol by condensing the halide monomer with HO—Ø—COX in the Ullmann ether synthesis over a Cu catalyst. Here, tile halide monomer should be dripped into the diol, if making tile extended phenol.

For the preparation of imides where an anhydride is an important functionality for the end cap monomer, we extend tile four functional phenol monomer of formula (II) either with nitrophthalic anhydride

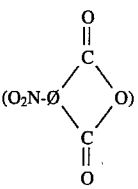

or phthalic anhydride acid chloride (i.e., trimelleitic acid halide anhydride) to form an ether or ester analog having an active anhydride. The analog, then, has the formula:

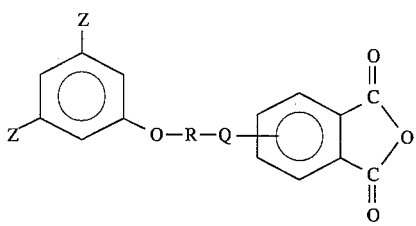

(IV A)

wherein Q=ether or ester. We can make another extended anhydride by condensing:

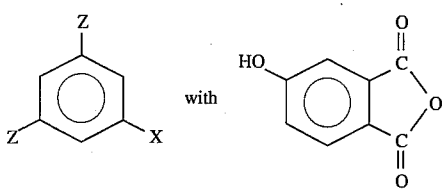

to yield:

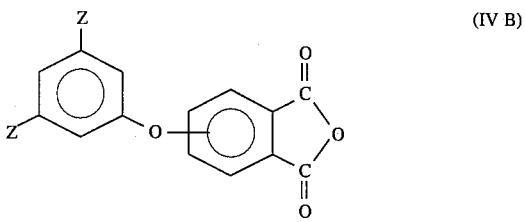

(IV B)

Extended anhydrides link to the backbone with an imide linkage.

For the preparation of heterocycles, esters, or other oligomers, we can prepare another extended acid monomer by condensing nitrobenzoic acid (or the acid halide) with the extend phenol monomer of formula (II) to yield:

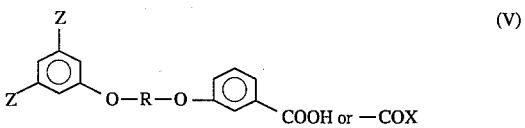

(V)

Alternatively, we can condensed the anhydride of formula (IV A) or (IV B) with an amino/acid, like aminobenzoic acid, to yield:

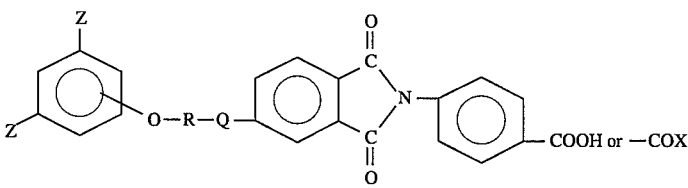

or

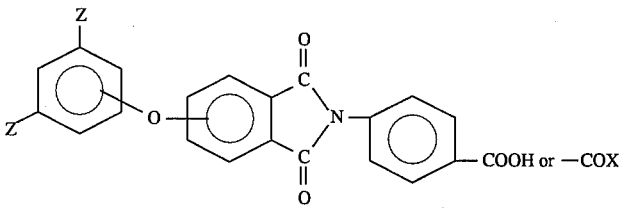

self-condensation of the amino/acid needs to be avoided, so it should be added dropwise to the anhydride. The acids can be readily converted with $SOCl_2$ to their acid halide (—COX) analog. The acid or acid halide end cap monomers link to the backbone with ester, oxazole, or imidazole linkages, for example.

We can prepare amine extended caps by reacting the halide monomer with aminophenol to yield:

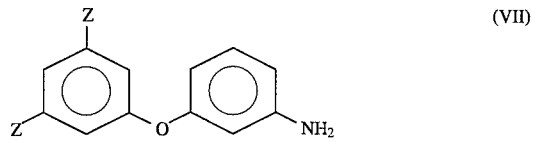

(VII)

or aminobenzoic acid with the extended phenol monomer (taking care to avoid self-condensation of the amino/acid) to yield:

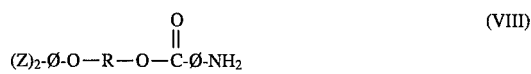

(VIII)

We can prepare the amine end cap monomer by converting a —COX functionality to an amine through the acid amide in the presence of ammonia, as described in U.S. Pat. No. 4,935,523.

The remainder of this specification will usually illustrate only the nadic end cap monomers, but those skilled in the art will understand that any of the other crosslinking functionalities could substitute for the nadic group.

A pyrimidine ring can be substituted for the phenylene ring in formula (I) to form end cap monomers analogous to those described in our U.S. Pat. Nos. 4,980,481 and 5,227,461. The aromatic character of the pyrimidine ring should provide substantially the same benefits as the phenylene ring. The thermo-oxidative stability of the resulting composites, however, might be somewhat less than that achieved for the phenyl end cap monomers. The pyrimidine precursors are described in U.S. Pat. Nos. 3,461,461 and 5,227,461. The compound:

(IX)

permits halo-pyrimidine end cap monomers for use in ether syntheses. These halo-pyrimidine caps have the formula:

(VI)

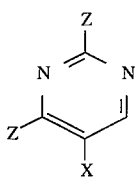 (X)

From these examples of extended monomers, those skilled in the art will recognize the wide range of monomers that might be used to introduce multifunctional capping. Furthermore, if stepwise synthetic pathways are used, the extended caps do not necessarily need to be separately synthesized and recovered (see, e.g., the ether and ester syntheses which follow).

We will next discuss the principal chemical families of resins that we can prepare using the multiple chemically functional ("multifunctional") end cap monomers. These multiple chemically functional oligomers are analogous to the monofunctional and difunctional oligomers described in our issued patents and copending patent applications.

3. Imide Oligomers

We preferably prepare our imide oligomers by condensing suitable diamines and dianhydrides with an extended anhydride end cap monomer of formula (IV A) or (IV B) or an extended amine end cap monomer of formula (VII) or (VIII) in a suitable solvent in an inert atmosphere. The synthesis is comparable to the processes used for forming our analogous difunctional or monofunctional oligomers as described in U.S. Pat. Nos. 4,536,559; 5,011,905; and 5,175,234.

Such polyimide oligomers exhibit a stable shelf life in the prepreg form, even at room temperature, and have acceptable handling and processing characteristics comparable to those of K-III or PMR-15. They also likely display shear/compression/tensile properties comparable to or better than PMR-15, and improved toughness, especially when reinforced with high modulus carbon fibers. The composites are essentially fully imidized, so they are stable, insensitive to environmental conditions, and nonhazardous.

We will discuss linear polyimides first and then their multidimensional counterparts.

a. Linear polyimides

We achieve impact resistance and toughness in aromatic polyimides by including "sulfone" linkages (L) between the predominant imide linkages that characterize the backbone.

The "sulfone" linkages act as joints or swivels between the aryl groups that we use to maximize the thermal stability. Thus, we select "sulfone" diamines and "sulfone" dianhydrides as the preferred reactants in the simultaneous condensation of multiple chemically functional end caps with the diamines and dianhydrides.

Although we do not prefer imide composites that include aliphatic segments when we use our multiple chemically functional end caps, we can make aliphatic polyimides, particularly those which include residues of the dianhydride MCTC. Such aliphatic residues lower the melt temperature and allow the use of lower temperature end caps, such as oxynadic and dimethyloxynadic (DONA). The resulting aliphatic imide oligomers cure at lower temperatures than our aromatic oligomers, which may be an advantage in some applications. Generally we prefer fully aromatic backbones because the goal of multiple chemically functional end caps, particularly four functional caps, is to achieve the highest thermo-oxidative stability.

Sulfone (—$SO_2$—) or the other electronegative linkages (L) between aromatic groups provide improved toughness. Our preferred imides resist chemical stress corrosion, can be thermoformed, and are chemically stable, especially against oxidation.

i. Diamine reactants

Preferred diamines for the synthesis of imide oligomers that include our multiple chemically functional end caps have the formula:

$H_2N$-Ø-O-Ø-$NH_2$ (i.e., ODA), (XI)
$H_2N$-Ø-S-Ø-$NH_2$ (i.e., thiodianiline), or
$H_2N$-Ø-O$\left[$R*—O—R'—O$\right]_t$R*—O-Ø-$NH_2$ wherein R* and R' are aromatic radicals, at least one of R* and R' being a diaryl radical whereto the aryl rings are joined by a "sulfone" linkage (L), and t is an integer from 0 to 27 inclusive. Preferably R* is selected from the group consisting of —Ø—D—Ø wherein D is an electronegative linkage selected from —$SO_2$—, —$(CF_3)_2C$—, or —S— and —Ø— is phenylene. R' is preferably selected from the group consisting of: —Ø—, —Ø—M—Ø—, or —Ø—Ø— wherein M=—$SO_2$—, —S—, —O—, —$(Me)_2C$—, or —$(CF_3)_2C$—.

The diamine, however, may be any of:

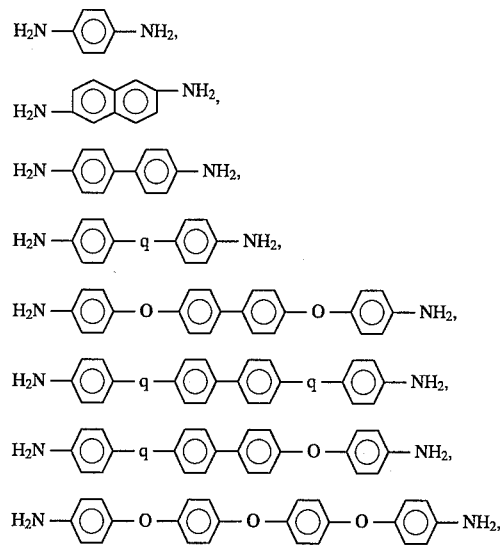

-continued

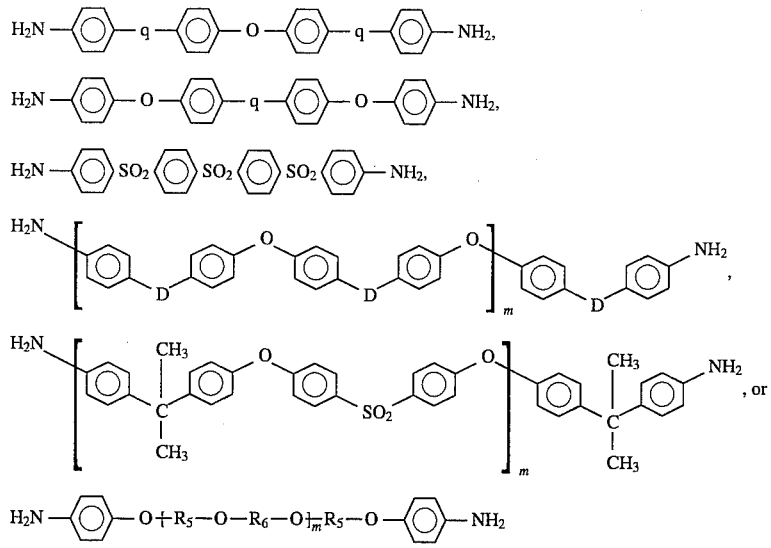

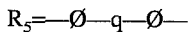

wherein $R_5 = $ —Ø—q—Ø—

$R_6 = $ phenylene, biphenylene, naphthylene, or —Ø—M—Ø— q= —SO$_2$—, —CO—, —S—, or —(CF$_3$)$_2$C—, and preferably —SO$_2$— or —CO—;

m=an integer, generally less than 5, and preferably 0 or 1;

and the other variables are as previously defined.

U.S. Pat. Nos. 4,504,632; 4,058,505; 4,576,857; 4,251,417; and 4,251,418 describe other diamines that we can use. We prefer the aryl or polyaryl ether "sulfone". diamines previously described, since these diamines provide high thermal stability to the resulting oligomers and composites. We can use mixtures of diamines, but we generally use a single diamine in each backbone so that the resulting oligomers have reliably recurrent, predictable structure.

Our most preferred diamines are ODA, thiodianiline, 3,3'-phenoxyphenylsulfone diamine; 4,4'-phenoxphenylsulfone diamine; 4,4'-diaminodiphenylsulfone; 4,4'-diaminodiphenyl ether, and methylene diamine, or mixtures thereof. We often use a 50:50 molar mixture of 3,3'-phenoxyphenylsulfonediamine and 4,4'-diaminodiphenylsulfone (available from Ciba-Geigy Corp. under the trade designation "Eporal"). Higher temperature oligomers within the class of preferred oligomers can be prepared using the shorter chain diamines, particularly 4,4'-diaminodiphenylsulfone. The best results may be achievable by replacing the sulfone linkage —SO$_2$— with a smaller linkage such as —O—, —S—, or —CH$_2$—.

The diamines often contain one or more phenoxyphenyl-sulfone groups, such as:

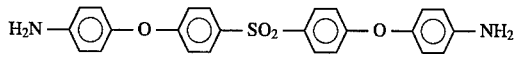

and

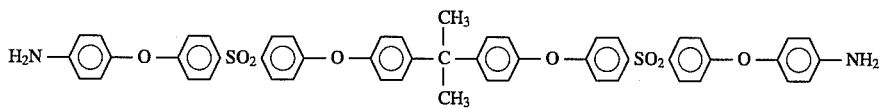

The molecular weights of the preferred aryl diamines described above vary from approximately 500–10,000. We prefer lower molecular weight diamines, because they are more readily available.

When the diamine has the formula (XI), the MW of these diamines vary from approximately 500 to about 2000. Using lower molecular weight diamines enhances the mechanical properties of the polyimide oligomers, each of which preferably has alternating ether "sulfone" segments in the backbones as indicated above. A typical oligomer will include up to about 20 to 40 diamine residues, and, generally, about 5.

We can prepare phenoxyphenyl sulfone diamines useful in this imide synthesis by reacting two moles of aminophenol with (n+1) moles of an aryl radical having terminal, reactive halide functional groups (dihalogens), such as 4,4'-dichlorodiphenyl sulfone, and n moles of a suitable bisphenol (also known as dihydroxy aryl compounds or diols). The bisphenol is preferably selected from the group consisting of:

2,2-bis-(4-hydroxyphenyl)-propane (i.e., bisphenol-A);
bis-(2-hydroxyphenyl)-methane;
bis-(4-hydroxyphenyl)-methane;
1,1-bis-(4-hydroxyphenyl)-ethane;
1,2-bis-(4-hydroxyphenyl)-ethane;
1,1-bis-(3-chloro-4-hydroxyphenyl)-ethane;
1,1-bis-(3,5-dimethyl-4-hydroxyphenyl)-ethane;
2,2-bis-(3-phenyl-4-hydroxyphenyl)-propane;
2,2-bis-(4-hydroxynaphthyl)-propane
2,2-bis-(4-hydroxyphenyl)-pentane;
2,2-bis-(4-hydroxyphenyl)-hexane;

bis-(4-hydroxyphenyl)-phenylmethane;
bis-(4-hydroxyphenyl)-cyclohexylmethane;
1,2-bis-(4-hydroxyphenyl)-1,2-bis-(phenyl)-ethane;
2,2-bis-(4-hydroxyphenyl)-1-phenylpropane;
bis-(3-nitro-4-hydrophenyl)-methane;
bis-(4-hydroxy-2,6-dimethyl-3-methoxyphenyl)-methane;
2,2-bis-(3,5-dichloro-4-hydroxyphenyl)-propane;
2,2-bis-(3-bromo-4-hydroxyphenyl)-propane;

or mixtures thereof, as disclosed in U.S. Pat. No. 3,262,914. Again, bisphenols having aromatic character (i.e., absence of aliphatic segments), such as bisphenol A, are preferred. Other suitable bisphenols (which we also call "diols") include:

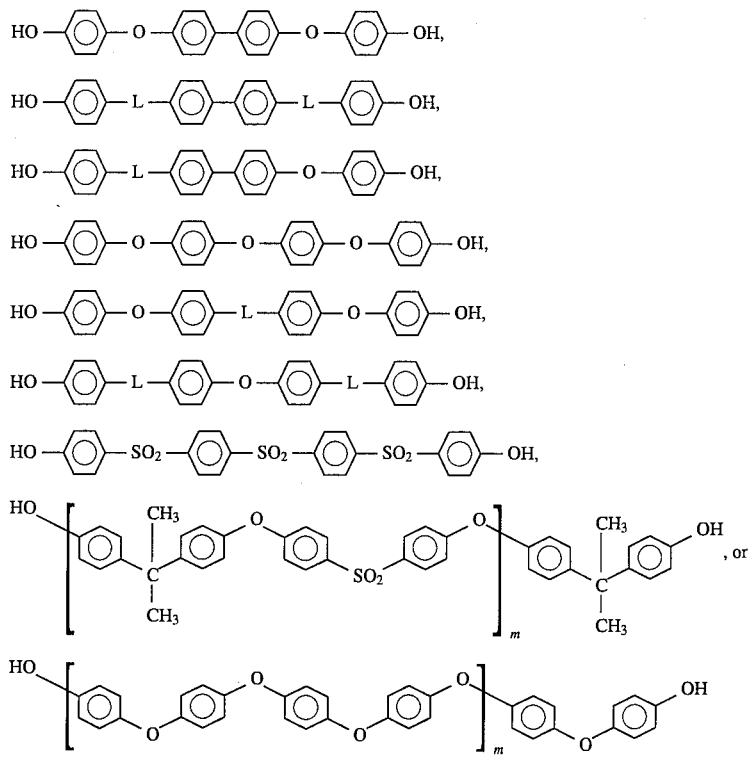

The bisphenol may also be selected from the those described in U.S. Pat. Nos. 4,584,364; 4,661,604; 3,262,914; or 4,611,048.

The dihalogens preferably are selected from the group consisting of:

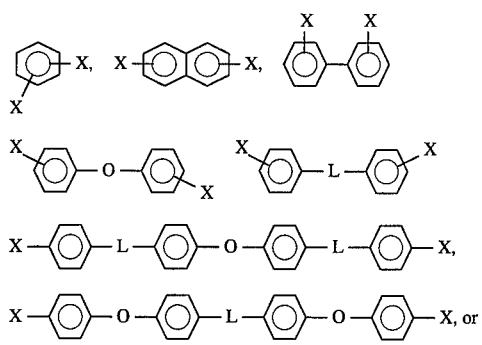

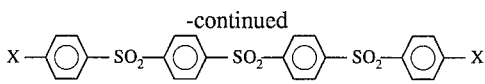

wherein X=halogen, preferably chlorine; and L=—S—, —SO$_2$—, —CO—, —(Me)$_2$C—, and —(CF$_3$)$_2$C—, and preferably —SO$_2$— or —CO—.

The condensation reaction for forming these phenoxyphenyl sulfone diamines creates diamine ethers that ordinarily include intermediate "sulfone" linkages. The condensation generally occurs through a phenate mechanism in the presence of K$_2$CO$_3$ or another base in a DMSO/toluene solvent. The grain size of the K$_2$CO$_3$(s) should fall within the 100–250 ANSI mesh range.

ii. Dianhydride reactants

The dianhydride usually is an aromatic dianhydride selected from the group consisting of:

(a) pyromellitic dianhydride, (b) benzophenonetetracarboxylic dianhydride (BTDA), (c) para- and meta- dianhydrides of the general formula:

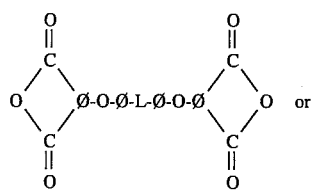

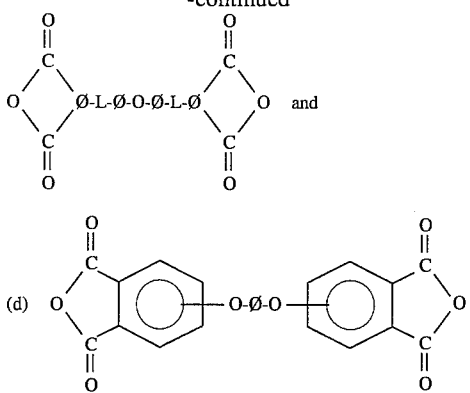

but may be any aromatic or aliphatic dianhydride, such as 5-(2,5-diketotetrahydrofuryl)-3-methyl-cyclohexene-1,2-dicarboxylic anhydride (MCTC) or those disclosed in U.S. Pat. Nos. 4,504,632; 4,577,034; 4,197,397; 4,251,417; 4,251,418; or 4,251,420. We can prepare dianhydrides by condensing 2 moles of an acid halide anhydride (e.g., trimellitic anhydride acid chloride) of the formula:

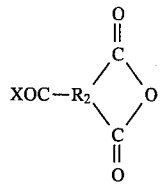

wherein $R_2$ is a $C_{(6-13)}$ trivalent aromatic radical (typically phenylene) with a diamine selected from those previously described. We can use mixtures of dianhydrides, as we do with the EPORAL diamines. We prefer a phenoxyphenyl sulfone dianhydride of the formula:

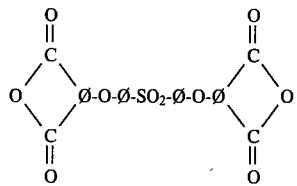

particularly when the diamine is:

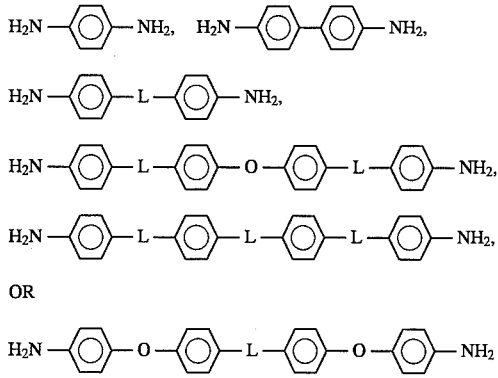

where L is previously defined.

We cure the imide oligomers or prepregs (or those counterparts for the other backbone systems) to form composites in conventional vacuum bag techniques. We also often post-cure these imides (or any multiple chemically functional oligomer) as described in U.S. Pat. No. 5,116,935 to ensure that crosslinking is substantially complete. We can use the imide oligomers (like the counterparts we describe for the other resins backbones) as adhesives, varnishes, films, or coatings.

b. Multidimensional polyimides

We can prepare polyimides having multidimensional morphology by condensing the diamines, dianhydrides, and end cap monomers with a suitable amine hub, such as triaminobenzene. For example, we can react triaminobenzene with the phenoxyphenyl sulfone dianhydride, a phenoxyphenyl sulfone diamine, and either the extended anhydride end cap monomer or an extended amine end cap monomer to produce a multidimensional, crosslinkable polyimide. The resulting multidimensional oligomers should have surprisingly high thermal stabilities upon curing because of the multiple chemically functional end caps.

i. Multidimensional amine hubs

Suitable hubs include aromatic compounds having at least three amine functionalities. Such hubs include phenylene, naphthylene, biphenylene, or azaline amines, (including melamine radicals) or triazine derivatives described in U.S. Pat. No. 4,574,154 of the general formula:

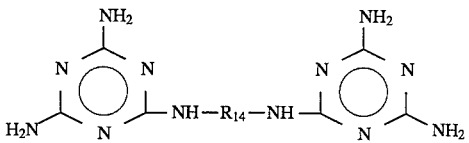

wherein $R_{14}$ is a divalent hydrocarbon residue containing 1–12 carbon atoms (and, preferably, ethylene). We use "azalinyl" or "azaline" to mean triazines represented by the formula:

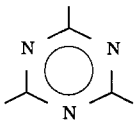

We can form another class of amine hubs by reacting the corresponding halo-hub (such as tribromobenzene) with aminophenol to form triamine compounds represented by the formula: Ø—[O—Ø—NH$_2$]$_3$. We can react these triamine hubs with an anhydride end cap monomer or with suitable dianhydrides, diamines, and an extended anhydride or an amine end cap monomer. We could also use trimellitic anhydride as a reactant in some syntheses.

Another class of suitable amine hubs comprises amines having extended arms. For example, we can react phloroglucinol with p-aminophenol and 4,4'-dibromodiphenylsulfone under an inert atmosphere at an elevated temperature to achieve an amino terminated "star" hub of the general formula:

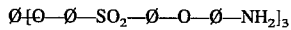

ii. Multidimensional anhydride hubs

In a manner analogous to the extended anhydride end cap monomers, we can prepare additional hubs for these multidimensional polyimides by reacting the corresponding hydroxy-substituted hub (such as phloroglucinol) with nitrophthalic anhydride to form trianhydride hubs represented by the formula:

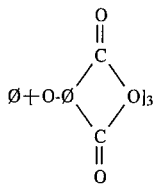

We can react the trianhydride with a diamine and the extended anhydride end cap monomer. Of course, we can

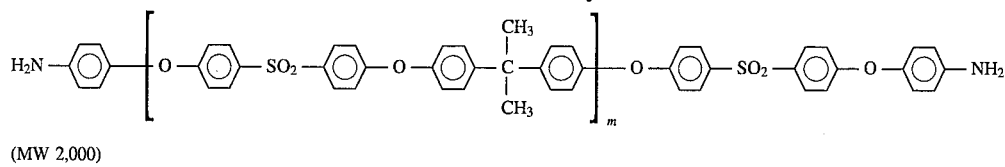

(MW 2,000)

condense the extended anhydride end cap monomer directly with an amine hub to prepare a multidimensional polyimide oligomer or can condense the extended amine end cap monomers directly with the trianhydride.

Similarly, the hub can be an amine or anhydride derivative made from the polyols of U.S. Pat. No. 4,709,008 that we will describe in greater detail later in this specification.

We present the following examples to better illustrate various features of the present invention as it relates to imides.

EXAMPLE 1

Synthesis of a phenoxyphenylsulfone diamine:

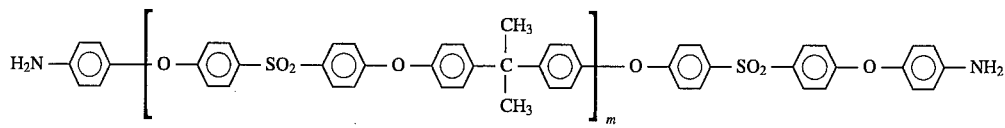

wherein m has an average value greater than 1. (MW 5000)

In a flask fitted with a stirrer, thermometer, Barrett trap condenser, and a nitrogen inlet tube, we mix 8.04 g (0.074 moles) p-aminophenol, 86.97 g (0.38 moles) bisphenol-A, 281.22g dimethylsulfoxide (DMSO), and 167.40 g toluene and stir. After purging with dry nitrogen, add 67.20 g of a 50% solution of sodium hydroxide and raise the temperature to 110°–120° C. Remove the water from the toluene azeotrope, and then the toluene, until the temperature reaches 160° C. Cool the reaction mixture to 110° C., and add 120 g (0.42 moles) 4,4' dichlorodiphenylsulfone as a solid. Reheat the mixture to 160° C. and hold for 2 hours. After cooling to room temperature, filter the mixture to remove sodium chloride, which precipitates, and coagulate the product in a blender from a 2% sodium hydroxide solution containing 1% sodium sulfite. Recover the oligomer from the solution by washing the coagulate with 1% sodium sulfite.

U.S. Pat. Nos. 3,839,287 and 3,988,374 disclose other methods for preparing phenoxyphenylsulfone diamines of this general type.

EXAMPLE 2

Proposed synthesis of four functional polyimide oligomers using the diamine of Example 1, nadic-capped extended anhydride end cap monomers, and BTDA.

Charge a reaction flask fitted with a stirrer, condenser, thermometer, and a dry $N_2$ purge with a 60% slurry of the diamine of Example I in NMP. In an ice bath, gradually add a 10% solution of BDTA and an anhydride end cap monomer in NMP. After stirring for 15 min. in the ice bath, remove the bath and stir for 2 hr. Recover the oligomer by precipitating in water and drying with alcohol (i.e., MeOH).

Adjust the formula weight of the oligomer by adjusting the proportions of reactants and the reaction scheme, as will be known to those of ordinary skill in the art.

EXAMPLE 3

Synthesis of the diamine:

Fit a reaction flask with a stirrer, thermometer, Barrett trap condenser, and $N_2$ inlet tube and charged 10.91 g (0.1 moles) of p-aminophenol, 40.43 g (0.18 moles) bisphenol A, 168.6 g DMSO, and 79.23 g toluene. After purging with nitrogen, add 36.42g of a 50% solution of sodium hydroxide and raise the temperature to 110°–120° C. to remove the water from the toluene azeotrope, and then the toluene until the temperature reaches 160° C. Cool the reaction mixture to 110° C., and add 65.22 g (0.23 moles) 4,4' dichlorodiphenylsulfone as a solid. Heat the mixture to 160° C. and hold for 2 hours. After cooling to room temperature, filter the mixture to remove sodium chloride. Form a coagulate in a blender by adding 2% sodium hydroxide solution containing 1% sodium sulfite. Remove the coagulate and wash it with 1% sodium sulfite.

EXAMPLE 4

Proposed synthesis of polyimide oligomers using the diamine of Example 3, a nadic extended anhydride end cap monomer, and BTDA.

Use the procedure followed in Example 2, except substitute a suitable amount of the diamine of Example 3 for the diamine of Example 1.

EXAMPLE 5

Synthesis of a diamine of Example 1 (MW 10,000).

Use the procedure of Example 1, using 2.18 g (0.02 moles) of p-aminophenol, 49.36 g (0.216 moles) of bisphenol-A, and 64.96 g (0.226 moles) of 4,4'-dichlorodiphenylsulfone.

EXAMPLE 6

Proposed synthesis of four functional polyimide oligomers using the diamine of Example 5, the extended anhydride end cap monomer, and phenoxyphenylsulfone dianhydride.

Follow the procedure in Example 2, substituting the diamine of Example 5, the extended anhydride end cap monomer, and phenoxyphenylsulfone dianhydride as the reactants.

EXAMPLE 7

Proposed preparation of composites front four functional linear polyimides.

The oligomers obtained in any of Examples 2, 4, and 6 can be impregnated on epoxy-sized T300/graphite fabric style (Union Carbide 35 million modulus fiber 24×24 weave) by first obtaining a 10 to 40% solution of resin in NMP or another appropriate aprotic solvent, including DMAC or DMF. The solutions can then be coated onto the dry graphite fabric to form prepregs with 38 wt. % resin. The prepregs can be dried to less than 1 percent volatile content, cut into 6×6-inch pieces, and stacked to obtain a consolidated composite of approximately 0.080 inch. The stacks of prepregs can then be vacuum bagged and consolidated under 100–200 psi in an autoclave heated for a sufficient time [probably for 1–2 hours at 575°–600° F. (300°–315° C.)] to induce cure. If dimethyl oxynadic or oxynadic anhydride capped systems are used, the prepregs likely would be cured for 16 hours at 400° F. (210° C.).

EXAMPLE 8

Proposed preparation of polyimide composites for oligomers having four functional caps.

Prepare graphite fabric prepregs, at 36 percent resin solids, using the resins of Example 2, 4, and 6 by solvent impregnation from a dilute NMP or another aprotic solvent solution. The graphite fabric is spread on a release film of FEP. Sweep the prepregging solution (having approximately 10–40 wt. % oligomer) into the fabric and allow it to dry, repeating on alternating sides, until the desired weight of resin is applied. The prepregs can then be dried 2 hours at 275° F. (135° C.) in an air-circulating oven.

Stack seven pines of each prepreg, double-wrapped in release-coated 2-mil Kapton film, and sealed in a vacuum bag for curing. Place each vacuum bag assembly in an autoclave and heat to about 575°–600° F. (300°–315° C.) at a rate of 1°–2° F./min. (0.5°–1° C./min). Upon reaching 575°–600° F. (300°–315° C.), hold the temperature substantially constant for about 2 hr to complete the cure. To enhance high temperature properties, post-cure for about 4–8 hr at 600°–625° F. (315°–330° C.).

EXAMPLE 9

Anticipated solvent resistance of four functional polyimide composites.

Samples of the cured composites of Example 8 can be machined into 1×0.5 -inch coupons, placed in bottles containing methylene chloride, and observed to determine if ply separation occurs. The composites will likely remain intact, with only slight swelling, after immersion for up to 2 months.

c. Post-curing

In another aspect of the invention, we can improve the thermal stability of the imide composites by post-curing the composites at temperatures of up to approximately 625°–650° F. (315°–330° C.). Post-curing is desirable for all resin types. It promotes complete linking. Such post-curing treatment advantageously raises the dynamic mechanical analysis peak (and β-transition) of the treated composites, presumably by causing full crosslinking of the end cap functionalities. Preferably, we carry out the post-curing treatment of the composites at a temperature of about 625°–650° F. (315°–330° C.) for a period of approximately 2–4 hours, but this period may vary somewhat depending upon the particular composite being treated.

The thermal stabilities achievable with such post-curing treatment are significantly higher than those generally realized without the treatment. For example, for a difunctional polyimide oligomer having a MW of about 15,000 and prepared as previously described by reacting a difunctional imidoaniline end cap, 4,4'-phenoxyphenylsulfone dianhydride, and a 50:50 molar mixture of 3,3'-phenoxyphenylsulfone diamine and 4,4'-diaminodiphenylsulfone, post-curing at a temperature of approximately 625°–650° F. (315°–330° C.) resulted in a DMA transition temperature of about 350° F. (177° C.), some 40°–50° F. (20°–25° C.) higher than without such treatment. We believe there will be a comparable benefit from post-curing four functional oligomers of the present invention.

In carrying out the post-cure treatment, a prepreg is first formed by impregnating a fabric with a polyimide oligomer. The fabric can be any of the types previously described. We heat the prepreg at an elevated temperature (e.g. 450° F. (232° C.)) and under pressure (e.g. 100 psi) for a time sufficient to cure the prepreg and form a composite. We then post-cure the resulting composite at a temperature of approximately 625°–650° F. (315°–330° C.) for a time sufficient to improve the thermal stability. During post-curing, the remaining unreacted crosslinking functionalities reorient and react to produce a nearly fully linked chain.

Post-curing applies to all the resin backbones. It ensures more complete reaction of the capping functionalities. We recommend it for all our multifunctional oligomer systems.

The bisphenol may be in phenate form, or a corresponding sulfhydryl can be used. Of course, can use we mixtures of bisphenols and bisulfhydryls.

Bisphenols of the type described are commercially available. Some may be easily synthesized by reacting a dihalogen intermediate with bis-phenates, such as the reaction of 4,4'-dichlorophenylsulfone with bis(disodium biphenolate). Preferred dihalogens in this circumstance are those we discussed for forming diamines.

d. Multidimensional acid hubs

While acid hubs are not used in the imides, we describe them here while discussing extended hubs. We can convert the triazine derivatives described in U.S. Pat. No. 4,574,154 to acid halides by reacting the amine functionalities with phthalic acid anhydride to form imide linkages and terminal acid functionalities (that we convert to acid halides). We can also use the triazine derivatives of U.S. Pat. No. 4,617,390 (or the acid halides) as the hub for multidimensional heterocycles.

By reacting polyol aromatic hubs, such as phloroglucinol, with nitrobenzoic acid or nitrophthalic acid to form ether linkages and terminal carboxylic acid functionalities, we produce acid hubs. The nitrobenzoic acid products would have three active sites while the nitrophthalic acid products would have six; each having the respective formula:

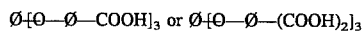

Of course we can use other nitro/acids.

We can react extended triamine hubs of the formula:

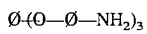

with an acid anhydride (i.e., trimellitic acid anhydride) to form a polycarboxylic acid hub of the formula:

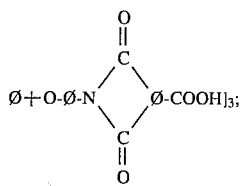

the hub being characterized by an intermediate ether and imide linkage connecting aromatic groups. We can also use thio-analogs in accordance with U.S. Pat. No. 3,933,862.

4. Amideimide Oligomers

Polyamideimides are generally injection-moldable, amorphous, engineering thermoplastics which absorb water (swell) when subjected to humid environments or immersed in water. Typically polyamideimides are described in the following patents: U.S. Pat. Nos. 3,658,938; 4,628,079; 4,599,383; 4,574,144; or 3,988,344. Their thermomechanical integrity and solvent-resistance can be greatly enhanced by capping amideimide backbones with the four functional end cap monomers.

Classical amideimides have the characteristic repeating unit:

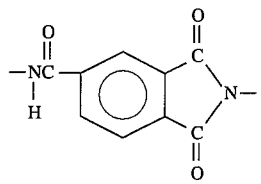

in the backbone, usually obtained by reacting equimolar amounts of trimellitic acid halide anhydride and a diamine to form a polymer of the formula:

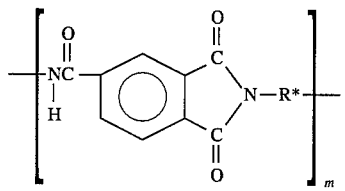

wherein R* is the residue of the diamine and m represents the polymerization factor. While we can make amideimides of this type, and quench them to oligomers by using an extended amine end cap monomer mixed with the diamine and trimellitic acid halide anhydride (see Example 38), we also make more varied amideimide oligomers.

Our oligomers can also be four functional capped homologs of the TORLON amideimides.

a. Linear amideimides

The amideimdes of the present invention generally include linkages of the following general nature along the backbone:

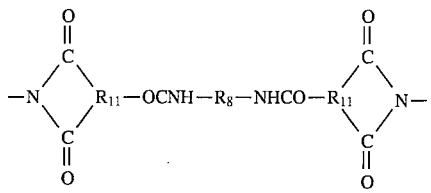

wherein $R_8$=an aromatic, aliphatic, or alicyclic radical, and preferably a phenoxyphenyl sulfone; and $R_{11}$=a trivalent organic radical, typically a $C_{(6-13)}$ aromatic radical such as phenylene.

$R_8$ is the residue of a diamine and, throughout the amidemide chain, can be the same or different depending on whether we use a single diamine or a mixture of diamines. We prepare random or block copolymers. We can prepare an amide-amide-imide-imide linkage, for example, by condensing 2 moles of an acid halide anhydride (e.g., trimellitic anhydride acid halide) of the general formula:

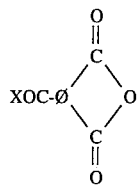

with a diamine of the formula: $H_2N$—$R_8$—$NH_2$ to produce an intermediate dianhydride. The linkage is characterized by a plane of symmetry about the $R_8$ residue. We can use any of the diamines described for the imides.

$R_{11}$ is commonly phenylene, so that the products are classical amideimides.

We can prepare the corresponding amideimide of the general formula:

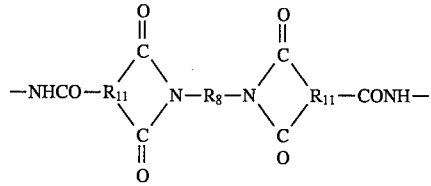

if we use the acid anhydride (e.g., trimellitic acid anhydride):

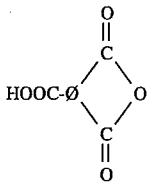

instead of the acid halide anhydride (e.g., trimellitic anhydride acid halide), because the imide forms before the amide. This reaction proceeds through a dicarboxylic acid intermediate.

We can also prepare true amideimides as our U.S. Pat. No. 5,155,206 describes. In the present invention we condense an appropriate four functional end cap monomer with the reactants in place of the imidoaniline or acid halide caps used in our earlier patents.

We can synthesize true amideimides of the present invention by several schemes. To obtain repeating units of the general formula:

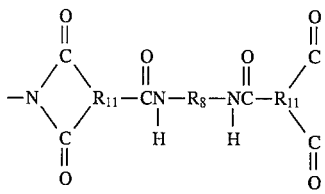

we mix an acid halide anhydride, particularly trimellitic anhydride acid chloride:

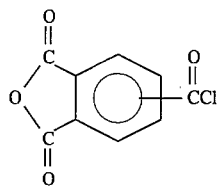

with a diamine from those described for the imides and with an extended amine end cap in the ratio of n:n:2 wherein n=an integer. The acid halide anhydride reacts with the diamine to form an intermediate dianhydride which will condense with the remaining diamine and the amine end cap monomer. The reaction may be carried out in two distinct stages under which the dianhydride is first prepared by mixing substantially equimolar amounts (or excess diamine) of the acid halide anhydride and diamine followed by the addition of a mixture of the diamine and the end cap monomer. Of course, the diamine used to form the dianhydride may differ from that used in the second stage of the reaction, or there can be a mixture of diamines from the outset.

We can synthesize the related amideimide having repeating units of the general formula:

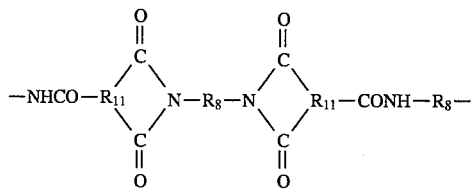

by reacting the acid anhydride with the diamine to form an intermediate dicarboxylic acid, which can then react with more diamine, another diamine, or an amine end cap monomer to complete the oligomer. Again, the reaction can be divided into steps.

The amideimide oligomers will probably improved if the condensation of the dianhydride/dicarboxylic acid with the diamine and end cap monomer is done simultaneously rather than sequentially.

While the oligomers we describe use an amine end cap, we can synthesize corresponding oligomers by using an acid halide end cap or even an anhydride end cap, if the diamine is provided in excess. The reaction mixture generally comprises the anhydride acid halide (—COX) or the acid anhydride (—COOH), the end cap monomer, and the diamine with the synthesis completed in one step.

All reactions should be conducted under an inert atmosphere. Reducing the temperature of the reaction mixture, such as by using an ice bath, can slow the reaction rate and can assist in controlling the oligomeric product.

As suggested in U.S. Pat. No. 4,599,383, the diamine may be in the form of its derivative OCN—R—NCO, if desired.

We can multifunctionally cap any amideimide described in U.S. Pat. Nos. 4,599,383; 3,988,374; 4,628,079; 3,658,938; and 4,574,144 with an appropriate crosslinking end cap monomer, such as the acid halide end cap, to convert the polymers to four functional oligomers of the present invention.

We can use a sequential or homogeneous reaction scheme to condense the reactants with sequential synthesis preferred to avoid side reactions. Generally we condense a dianhydride or diacid halide (depending on whether the acid halide anhydride or simply the acid anhydride is used) diamine, and an extended anhydride end cap monomer of formula (II). That is, we can prepare the dianhydride or diacid halide by the condensation of a diamine with the acid anhydride or acid halide anhydride followed by addition of additional diamine and the end cap to complete the synthesis. Four functional analogs of the amideimides described in our U.S. Pat. Nos. 5,104,967; 5,155,206; 5,216,117; and 5,239,046 can be prepared.

b. Multidimensional amideimides

The multidimensional polyamideimide oligomers include oligomers of the general formula:

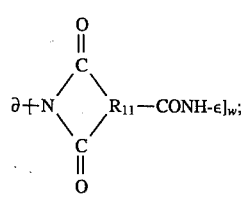

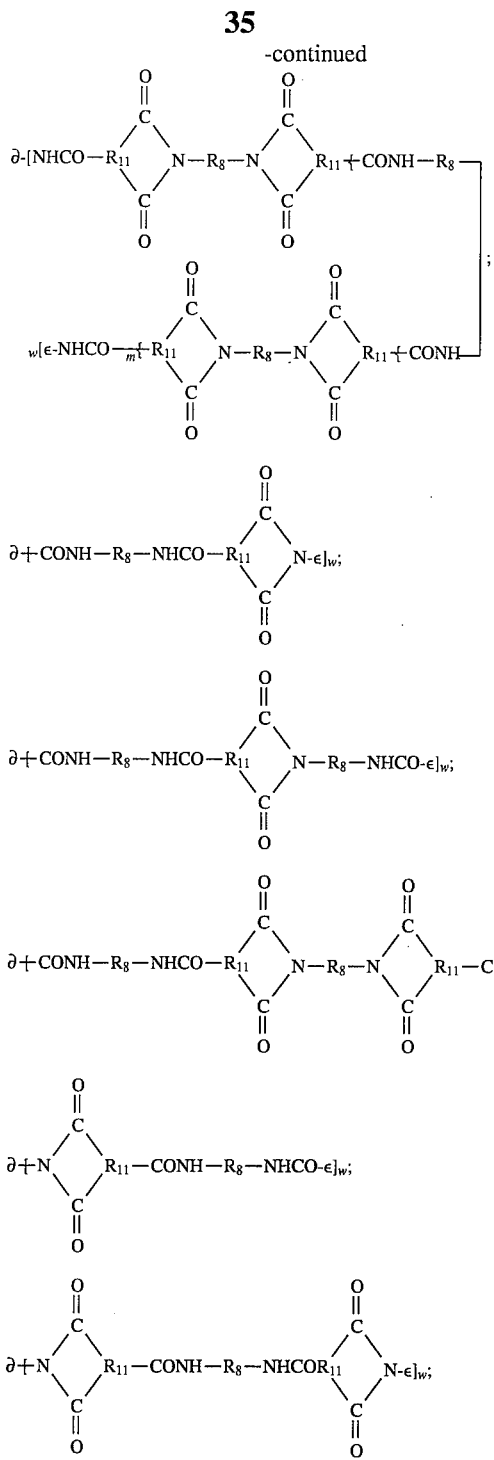

and other four functional, multidimensional amideimide oligomers analogous to the monofunctional and difunctional multidimensional amideimide oligomers our U.S. Pat. Nos. 5,227,461; 5,104,967; or 5,155,206 describe.

Diacid halide reactants

The diacid halide (or dicarboxylic acid [i.e., dibasic acid]; general formula: XOC—$R_9$—COX) may include an aromatic chain segment (i.e., $R_9$) selected from the group consisting of:

(a) phenylene;
(b) naphthylene;
(c) biphenylene;

(d) a polyaryl "sulfone" divalent radical of the general formula:

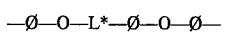

wherein L*=—S—, —O—, —CO—, —SO$_2$—, —(Me$_3$)$_2$C—, or —(CF$_3$)$_2$C—, (e) a divalent radical having conductive linkages, illustrated by Schiff base compounds, selected from the group consisting of:

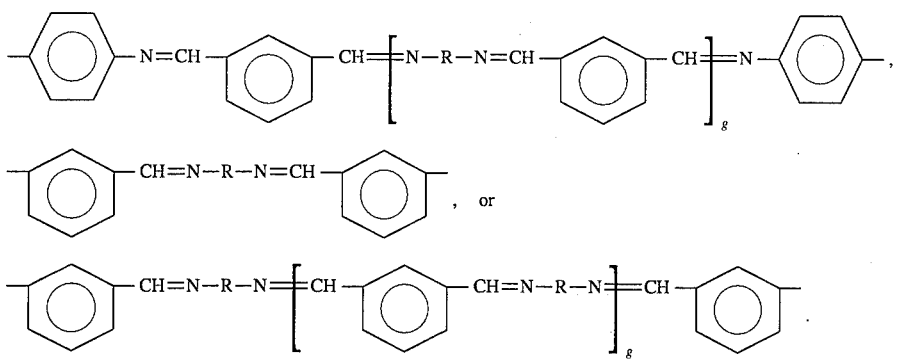

wherein R is selected from the group consisting of: phenylene; biphenylene; naphthylene; or a divalent radical of the general formula: —Ø—W—Ø— wherein W=—SO$_2$— or —CH$_2$—; and g=0-4; or (f) a divalent radical of the general formula:

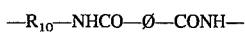

—R$_{10}$—NHCO—Ø—CONH— wherein R$_{10}$=a C$_2$ to C$_{12}$ divalent aliphatic, alicyclic, or aromatic radical, and, preferably, phenylene (as described in U.S. Pat. No. 4,556,697).

The preferred diacid halide is a dibasic carboxylic acid halide of a divalent organic radical selected from the group consisting of:

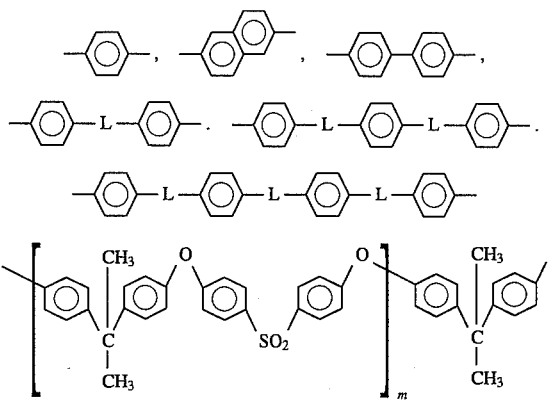

wherein m is an integer, generally from 1–5, and the other variables are as previously defined.

The most preferred acid halides include:

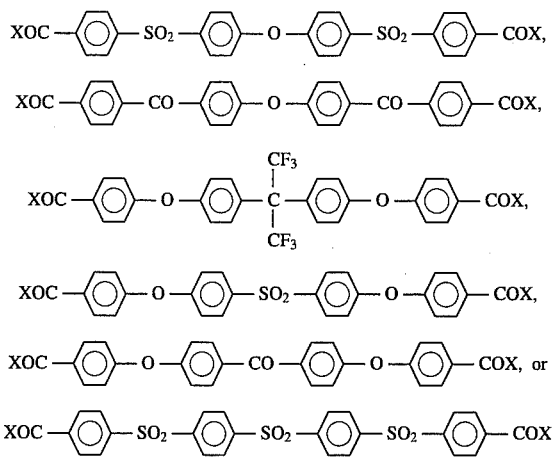

We can prepare Schiff base diacid halides by the condensation of aldehydes and aminobenzoic acid halide (or other amine/acids) in the general reaction scheme:

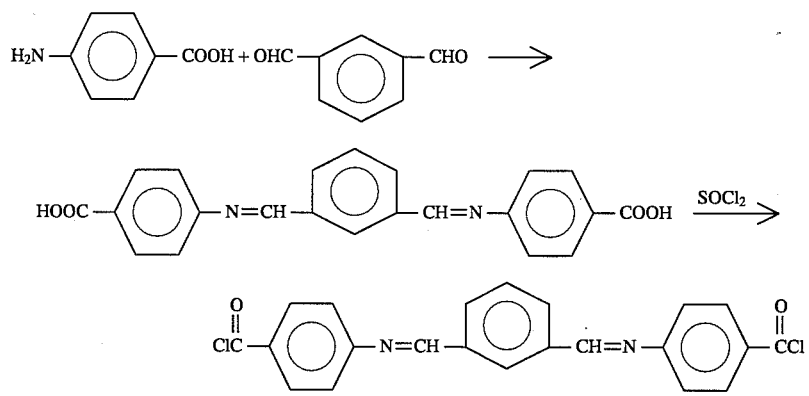

or similar syntheses.

U.S. Pat. No. 4,504,632, discloses other diacid halides that we can use including:
- adipylchloride,
- malonyl chloride,
- succinyl chloride,
- glutaryl chloride,
- pimelic acid dichloride,
- suberic acid dichloride,
- azelaic acid dichloride,
- sebacic acid dichloride,
- dodecandioic acid dichloride,
- phthaloyl chloride,
- isophthaloyl chloride,
- terephthaloyl chloride,
- 1,4-naphthalene dicarboxylic acid dichloride, and
- 4,4'-diphenylether dicarboxylic acid dichloride.

We prefer polyaryl or aryl diacid halides to achieve the highest thermal stabilities in the resulting oligomers and composites. Particularly preferred compounds include intermediate "sulfone" (i.e. electronegative) linkages (i.e., "L") to improve the toughness of the resulting oligomers.

Suitable diacid halides include compounds made by reacting nitrobenzoic acid with a bisphenol (which might also be called a dihydric phenol, dialcohol, or diol). The reaction is the counterpart of that for making diamines. The bisphenol is preferably selected from the group previously described for the imide syntheses. We prefer bisphenols having aromatic character (i.e., absence of aliphatic segments), such as bisphenol-A. While we prefer bisphenol-A (because of cost and availability), we can use the other bisphenols to add rigidity to the oligomer without significantly increasing the average formula weight over bisphenol-A residues, and, therefore, can increase the solvent resistance. Random or block copolymers from using different bisphenols are possible (here as well as with the other backbones).

c. Amideimide sizings

A major problem encountered in improving high temperature mechanical and physical properties of reinforced resin composites occurs because of inadequate transfer of induced matrix stress to the reinforcement. The matrix also helps to prevent the fiber from buckling. Sizing is often applied to the reinforcing fibers to protect the fibers during processing and to enhance bonding at this interface between the fibers and the resin matrix thereby more efficiently transferring the load and stabilizing the fiber. Sizings are essentially very thin films of resin (less than a few wt %) applied to the fibers. To be effective, sizings should be relatively high MW materials that form a relatively uniform coating. Commercially available sizings include epoxy sizings under the trade designations UC309 and UC314 from Amoco, G or W from Hercules, EP03 from Hoechst and high performance sizings under the trade designations L30N, L20N, UC0121 or UC0018 from Amoco. Commercially available sizings are unsatisfactory because they are generally monomers or low MW materials that often only partially coat the fibers and, as a result, minimally improve composite properties. There is a need, therefore, for improved sizings, especially for carbon fibers intended for high performance composites.

We described improved sizings for carbon fibers using an amideimide polymer or a difunctional amideimide oligomer in our U.S. Pat. Nos. 5,155,206 and 5,239,046. We can now prepare analogous four functional amideimide sizings, although they likely would provide little improvement over polymeric amideimide sizings since capping between the matrix and sizing would be disorganized and incomplete at best. The amideimide polymer, a difunctional oligomer, the four functional oligomers of the present invention, or blends of any of these polymers and oligomers might be used. A four functional amideimide sizing is probably best when using a four functional oligomer as the matrix for a sizing, the amideimide should have a MW above 10,000, and, preferably, above 20,000. Actually, the MW should be as high as one can achieve. As for the polymers and difunctional oligomers, a preferred four functional amideimide oligomer is formed by condensing trimellitic anhydride acid chloride with bis(4-aminophenoxyphenyl) sulfone and either an extended amine, an acid chloride, or a phenol end cap monomer.

When the matrix is an oligomer that includes crosslinking functionalities of the nature suggested for the capped sizings of the present invention, it is probably wise that the caps on the oligomer and on the sizings be the same or at least chemically comparable. That is, for example, we prefer to use nadic caps in our oligomers and nadic caps for the amideimide sizing.

We believe that the amideimide sizings provide a high concentration of hydrogen bonding sites to promote coupling between the sizing and the matrix. Both the imide and amide linkages include heteroatoms. The capped materials may actually form chemical (covalent) bonds for even stronger interaction between the sizing and matrix, or the end caps might cause addition polymerization to provide even higher MW sizings on the fiber. We believe higher MW sizings have better properties.

The sizings impart improved elevated temperature mechanical and environmental stability to carbon fiber/oligomer composites in which the matrix resin is selected from imides, amides, amideimides, esters, ethers, sulfones, ether sulfones, heterocycles, carbonates, and almost any other commercial resin including epoxies, PMR-15, K-III, or the like. We use these multifunctional amideimide sizings in the same manner as conventional sizings.

We next provide some examples of proposed syntheses of polyamideimides.

EXAMPLE 10

React a diamine with two moles of trimellitic acid anhydride to form a dicarboxylic acid intermediate by adding the diamine dropwise to the trimellitic acid anhydride. Convert the intermediate to the corresponding diacid chloride in the presence of $SOCl_2$, and then condense the intermediate with the diamine and an extended amine end cap monomer to yield the desired product.

If excess diamine is used, use an acid halide end cap to form the product.

EXAMPLE 11

React a diamine with trimellitic anhydride acid chloride to yield a dianhydride intermediate. Condense the intermediate with an amine end cap monomer and a diamine to yield the desired product.

Typically, this reaction involves mixing, for example, the four nadic-capped acid chloride end cap monomer:

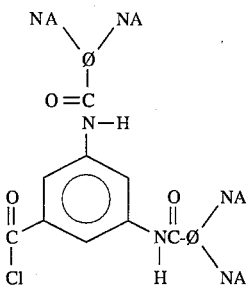

wherein NA is nadic and Ø is phenylene with trimellitic acid chloride anhydride:

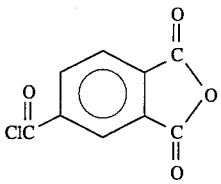

in NMP or another suitable solvent and, then, adding the diamine:

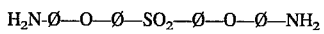

in NMP (i.e., the same solvent). We prepare the diamine by reacting para- or meta-aminophenol with

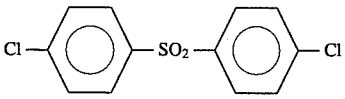

It may be possible to obtain the amideimide in another fashion, involving protecting the amine functionalities in the cap that ultimately form the amide linkages with phthalic anhydride; condensing the protected phthalic imide acid chloride end cap monomer the diamine, and trimellitic acid chloride anhydride; saponifying the resulting product to yield a bis(diamino) oligomer; and completing the capping by condensing a phthalimide acid halide end cap monomer, such as those in U.S. Pat. No. 5,087,701, and, preferably the dinadic acid chloride monomer. Our concern with this scheme is whether the sapionification reaction will also break the imide linkages in the backbone.

EXAMPLE 12

Condense triaminobenzene with a trimellitic acid anhydride or acid chloride and an amine end cap monomer to yield the desired multidimensional product. Any amine hub can be used in place of triaminobenzene.

EXAMPLE 13

React an amine hub with the dicarboxylic acid intermediate of Example 15, a diamine, and an extended amine end cap in the ratio of 1 mole of hub: (w)(m+1) moles of intermediate:(w)(m) moles of diamine: w moles of end cap to prepare the desired multidimensional product.

EXAMPLE 14

React an amine hub with the dianhydride intermediate of Example 11, a diamine, and the extended amine end cap in the ratio of 1 mole hub: (w)(m+1) moles dianhydride: (w)(m) moles diamine:w moles end cap to yield the desired product.

EXAMPLE 15

React an acid or acid halide hub, like cyuranic acid, with a diamine, a dicarboxylic acid intermediate of Example 10, and an acid halide end cap in the ratio of 1 mole hub: (w)(m+1) moles diamine: (w)(m) moles intermediate: w moles cap to yield the desired product.

Example 16

React an amine hub with a dicarboxylic acid intermediate (or dihalide) of Example 10 and the extended amine end cap in the ratio of 1 mole hub: w moles intermediate: w moles cap to yield the desired product.

Example 17

React an amine hub with the dicarboxylic acid intermediate of Example 10, a diamine, and an acid halide end cap in the ratio of 1 mole hub: w moles intermediate: w moles diamine, and w moles cap to form the desired product.

Example 18

React an amine hub with the dianhydride intermediate of Example 10, a diamine, and an acid halide end cap in the ratio of 1 mole hub: (w)(m) moles intermediate: (w)(m) moles diamine: w moles cap to form the desired product.

Example 19

React an amine hub with the dicarboxylic acid intermediate of Example 10, a diamine, and an extended amine end cap in the ratio of 1 mole hub: (w)(m+1) moles intermediate: (w)(m) moles diamine: w moles cap to form the desired product.

Example 20

React an amine hub with trimellitic anhydride acid halide, a diamine, and an acid halide end cap in the ratio of 1 mole hub: w moles trimellitic anhydride acid halide: w moles diamine: w moles cap to form the desired product. Preferably the reaction occurs in two steps with the reaction of the hub and trimellitic anhydride acid halide followed by the addition of an amine end cap.

Example 21

React an amine hub with trimellitic acid anhydride and an extended amine end cap in the ratio of 1 mole hub: w moles trimellitic acid anhydride: w moles cap to form the desired product.

Example 22

React an amine hub with trimellitic acid anhydride, a diamine, and an extended amine end cap in the ratio of 1 mole hub: 2w moles acid anhydride: w moles diamine: w moles cap to yield the desired product. Preferably the cap and half of the acid anhydride are mixed to form an end cap conjugate prior to mixing the reactants to form the oligomer. It also may be wise to mix the remaining acid anhydride with the hub to form an acid hub conjugate prior to adding the diamine and end cap conjugate. In an alternate synthesis we use an anhydride end cap monomer.

Alternatively; make the product by reacting the hub with the dianhydride intermediate of Example 11 and an extended amine end cap.

Example 23

React an amine hub with the dianhydride intermediate of Example 11, a diamine, and either an extended anhydride end cap conjugate formed by reacting an amine end cap with an acid halide anhydride (like trimellitic acid chloride anhydride) or the anhydride end cap monomer in the ratio of 1 mole hub: w moles intermediate: w moles end cap conjugate.

Alternatively, prepare the product by reacting the hub with an acid anhydride followed by reaction with a diamine, the diacid intermediate of Example 10, and an amine end cap. Stepwise addition of the diamine to the extended hub followed by addition of the diacid intermediate and amine end cap will reduce competitive side reactions.

Example 24

React an amine hub with an acid anhydride (like trimellitic acid anhydride) to form an acid hub intermediate. React the intermediate with a diamine, a dicarboxylic acid or acid halide intermediate of Example 10, and an acid halide end cap in the ratio of 1 mole hub intermediate: (w)(m+1) moles diamine: (w)(m) moles dicarboxylic acid intermediate: w moles end cap to yield the desired product.

Alternatively, prepare the product by reacting an amine hub with the dianhydride intermediate of Example 11, a first diamine, an acid anhydride, a second diamine, and an acid halide end cap in a stepwise reaction.

Example 25

React an amine hub with the dianhydride intermediate of Example 11, a diamine, and an extended amine end cap in the ratio of 1 mole hub: 2w moles intermediate: w moles diamine: w moles cap to yield the desired product.

Example 26

React an acid hub with a diamine, an acid anhydride, and an amine end cap in the ratio of 1 mole hub: w moles diamine: w moles acid anhydride: w moles cap to yield the desired product. Preferably the reaction includes the steps of reacting the acid anhydride with the end cap monomer prior to addition of the hub and diamine.

Example 27

React an acid hub with a diamine to form an amine extended hub conjugate. React the conjugate with an acid halide anhydride, a second diamine, and an acid halide end cap to yield the desired product. Preparing an end cap conjugate by reacting the second diamine with the acid halide cap (adding the cap dropwise to the diamine) prior to the addition of the other reactants reduces side or competitive reactions. In this case, for example, the acid hub is added dropwise to the diamine to promote substantially complete addition of the free amino groups with the hub's acid functionalities and to minimize addition of a hub to both ends of the diamine. We take similar precautions in making the other conjugates we describe in these examples.

Example 28

React an acid hub with a diamine, the acid intermediate of Example 10, and an extended amine end cap in the ratio of 1 mole hub: w moles diamine: w moles intermediate: w moles cap. Preferably, the reaction occurs in two stages with the hub being mixed with the diamine to form an amine conjugate to which the acid or acid halide intermediate and cap is added in a simultaneous condensation.

Example 29

React an acid hub with a diamine, the acid intermediate of Example 10, and an extended amine cap in the ratio of 1 mole hub: (w)(m+1) moles diamine: (w)(m) moles intermediate: w moles cap to yield the desire product. The reaction preferably involves the step of preparing the amine conjugate described in Example 33.

Example 30

React two moles of an extended amine end cap with about (m+2) moles of trimellitic acid anhydride, and about (2m+1) moles of bis(4-aminophenoxyphenyl)sulfone:

$$H_2N—\emptyset—SO_2—\emptyset—O—\emptyset—SO_2—\emptyset—NH_2,$$

to yield the desired product. To avoid side or competitive reactions, prepare a dicarboxylic acid intermediate by mixing the acid anhydride and diamine in the ratio of about 2 moles acid anhydride: 1 mole diamine prior to adding the remaining reactants for simultaneous condensation to the oligomer.

Example 31

Follow the method of Example 10 except substitute aniline for the amine cap. The product is a comparable amideimide polymer of similar MW and structure to the oligomer of Example 10 but being incapable of crosslinking because of the lack of crosslinking sites (hydrocarbon unsaturation) in the end caps. The aniline provides MW control and quenches the amideimide condensation.

We can obtain comparable noncrosslinking amideimide polymers using the methods of Examples 11–30 substituting aniline, benzoic acid, or similar compounds to quench the syntheses, as will be understood by those of ordinary skill. In analogous manner, we can make corresponding, noncrosslinking polymers for any oligomer we describe in this specification, and we can use these polymers in blends.

Example 32

Mix solutions of the amideimide oligomer of Example 10 and the amideimide polymer made in accordance with Example 31 to prepare a blend that either can be swept out into fiber reinforcement to form a prepreg of an amideimide blend or that can be dried to recover the blend. The blend generally includes substantially equimolar amounts of the oligomer and polymer, although the ratio can be varied to control the properties of the blend.

Example 33

Dissolve an extended amine end cap and bis(4-aminophenoxyphenyl) sulfone in N,N'-dimethylacetamide (DMAC). Cool the solution to −10° C. under nitrogen. While stirring, add trimellitic anhydride acid chloride dropwise and hold the temperature below 0° C. one hour. Next add triethylamine (TEA) dropwise and stir 30 minutes. Add DMAC and stir 3 more hours. Finally, add pyridine and acetic anhydride. Stir the viscous mixture 3 hours. Filter off the hydrochloride salt and precipitate the product in a blender with water. Filter, wash the precipitate the product with distilled water and then dry.

Alternatively, the imidization reaction can be induced thermally by heating the mixture to about 300°–350° F. (150°–175° C.) for several hours followed by precipitating the product in water and washing with MeOH.

Example 34

A proposed linear advanced composite blend.

Make an amideimide oligomer in accordance with Example 10.

Make a relative high MW polyether polymer by condensing a diol of the general formula:

$$HO—\emptyset—O—\emptyset—O—\emptyset—O—\emptyset—OH$$

with Cl—∅—Cl and phenol or chlorobenzene (to quench the polymerization) under an inert atmosphere in the same solvent as used with the amideimide oligomer or another solvent miscible with that of the amideimide oligomer.

Mix the two solutions to form a lacquer or varnish of an advanced composite blend. Prepreg the lacquer or dry it prior to curing the blend to an advanced amideimide/ether composite. This advanced composite blend could be mixed with a $Z^*_k$—B—$Z^*_k$ oligomer to form a coreactive oligomer blend, which would, then, be prepregged and cured. "$Z^*$" is a cyclobutane, amine, phenol, or thioether.

For additional discussion of advanced composite blends, see section 14. Section 15 discusses coreactive oligomer blends in more detail.

Example 35

A proposed multidimensional advanced composite blend.

Prepare a multidimensional, polyether sulfone polymer by reacting phloroglucinol with Cl—Ø—Cl and HO—Ø—O—Ø—SO$_2$—Ø—O—Ø—OH. Quench the polymerization with either chlorobenzene or phenol. The condensation occurs in a suitable solvent under an inert atmosphere. The product is not recovered from the solvent.

Prepare a multidimensional, ester oligomer in the same solvent as used for the polymer or in another miscible solvent by condensing cyuranic acid chloride with a phenol end cap. The oligomer product is not recovered, but the reaction mixture is mixed with the polyether polymer product and a phenoxyphenyl sulfone diamine (i.e., Z—B—Z, such as bis(4-aminophenoxyphenyl) sulfone) to form a multidimensional advanced composite blend of coreactive oligomers that can be prepregged or dried prior to curing the ester oligomer to form a multidimensional, polyester/polyethersulfone, advanced composite.

Generally, in coreactive oligomer blends, the resins are selected to tailor the physical properties of the resulting block cepolymer composites. Such blends with multiple chemically functional oligomers are counterparts to the coreactive oligomer blends U.S. Pat. Nos. 5,115,087 and 5,159,055 describe. For example, we can achieve stiffening for a composite made from ethersulfone oligomer of the present invention by adding a benzoxazole oligomer as a coreactant. Those skilled in the art will recognize the benefits to be gained through coreactive oligomer blends. The ethersulfone toughens the relatively stiff and rigid heterocycle oligomers, which is particularly important for the preparation of films.

To prepare ethers, the phenol or halide end cap is mixed with suitable diols and dihalogens or with suitable dinitrohydrocarbons and diols. To prepare esters, the phenol end cap or acid halide end cap is mixed with suitable diols and diacids, both as will be explained in greater detail later in this specification.

5. Etherimides

The polyetherimides and polysulfoneimides of the present invention are analogous to the oligomers described in U.S. Pat. Nos. 4,851,495 and 4,981,922 and have the general formula:

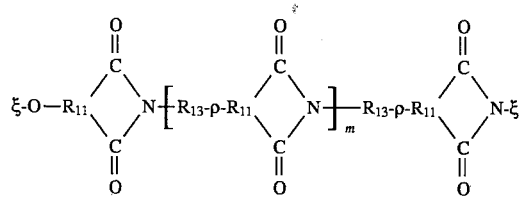

wherein p=—O— or —S—;
ξ=the residue of an end cap;
R$_{11}$=a trivalent C$_{(6-13)}$ aromatic organic radical;
R$_{13}$=a divalent C$_{(6-30)}$ aromatic organic radical; and
m=a small integer (the "polymerization factor") typically from 1–5.

We prepare the polyetherimide oligomers by several reaction schemes. One method for synthesizing the polyetherimides involves the simultaneous condensation of about 2m+2 moles of nitrophthalic anhydride with about m+1 moles of diamine, about m moles of a diol, and the extended amine end cap or the extended phenol end cap in a suitable solvent under an inert atmosphere. The diol may actually be in the form of a phenate.

In this reaction, the diamines (which preferably have aromatic ethersulfone backbones) react with the anhydride of the nitrophthalic anhydride to form dinitro intermediates and the diol reacts with the nitro-functionality to form an ether linkage as described in our U.S. Pat. Nos. 4,851,495 and 4,981,922. The end caps quench the polymerization.

Another method comprises the simultaneous condensation of:

and

in the ratio of XII:XIII:XIV:XV =1:1:m:m, wherein v=halo- or nitro-. The product has the general formula previously described. The reaction conditions are generally comparable to those described in U.S. Pat. Nos. 3,847,869 and 4,107,147.

Alternatively, we prepare the polyetherimides by reacting a polyetherimide polymer made by the self-condensation of a phthalimide salt of the formula:

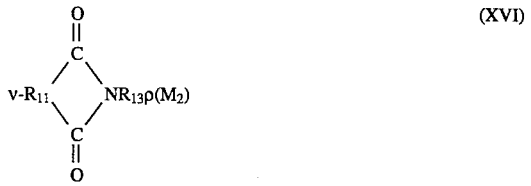

wherein M$_2$ is an alkali metal ion or ammonium salt or hydrogen with quenching crosslinking end cap moieties of the formula:

and a halogeno cap of the formula:

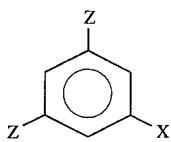

wherein Z is an end cap and X is a halogen.

The self-condensation proceeds as described in U.S. Pat. No. 4,297,474 in a dipolar aprotic solvent. We introduce the end cap moieties either during the self-condensation to quench the polymerization or following completion of the polymerization and recovery of the polyetherimide polymer from methanol (i.e., post-polymerization capping).

Another etherimide synthesis comprises the simultaneous condensation of about 2m+2 moles of nitrophthalic anhydride with about m+1 moles of diol, m moles of diamine, and 2 moles of the extended amine end cap in a suitable solvent under an inert atmosphere.

In any of the syntheses, we can replace the diol by a comparable disulfhydryl. We can use mixtures of diols and disulfhydryls, of course, but we prefer pure diols.

We can synthesize the oligomers in a homogeneous reaction scheme wherein all the reactants are mixed at one time (and this scheme is preferred), or in a stepwise reaction. We can mix the diamine and diols, for example, followed by addition of the nitrophthalic anhydride to initiate the polymerization and thereafter addition of the end caps to quench it. Those skilled in the art will recognize the different methods that might be used. To the extent possible, we minimize undesirable competitive reactions by controlling the reaction steps (i.e., addition of reactants) and the reaction conditions.

Although we can use any diol (i.e., bisphenol) previously described, for etherimides, we prefer a diol selected from the those described in U.S. Pat. Nos. 4,584,364; 3,262,914; or 4,611,048 or a polyaryl diol selected from the group consisting of:

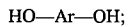

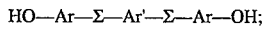

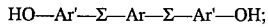

wherein $\Sigma = -CH_2-$, $-(Me)_2C-$, $-(CF_3)_2C-$, $-O-$, $-S-$, $-SO_2-$ or $-CO-$;

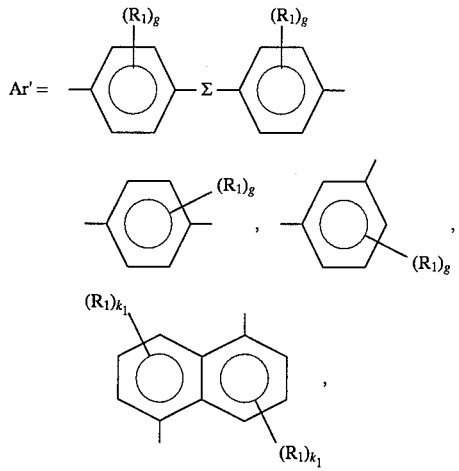

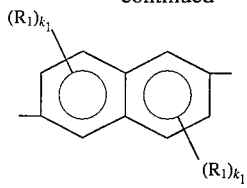

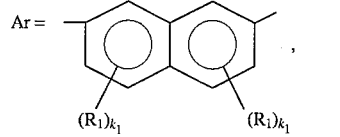

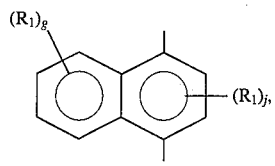

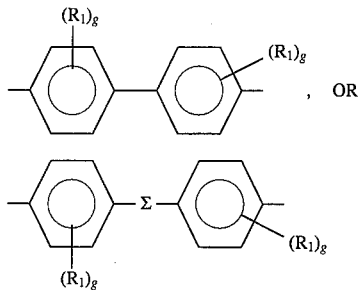

$R_1$=lower alkyl, lower alkoxy, aryl, aryloxy, substituted alkyl, substituted aryl, halogen, or mixtures thereof;

$g=0-4$;

$k_1=0-3$; and $j=0$, 1, or 2.

The preferred diols include hydroquinone; bisphenol-A; p,p'-biphenol; 4,4'-dihydroxydiphenylsulfide; 4,4'-dihydroxydiphenylether; 4,4'-dihydroxydiphenylisopropane; or 4,4'-dihydroxydiphenylhexafluoropropane. We prefer to use a single diol rather than mixtures of diols. Actually, for the reactants in any of our syntheses, we prefer to use a pure compound rather than a mixture. We often seek the highest purity available for the selected reactant because we seek to make the highest MWs we can synthesize.

We prefer bisphenol-A as the diol because of cost and availability. The other diols can be used, however, to add rigidity to the oligomer and can increase the solvent resistance. Random or a block copolymers are possible by using mixed diols as the reactant, but we do not prefer them.

In the coreactive oligomer blends (Section 15), we can use these diols as the $Z^*_k$—B—$Z^*_k$ oligomers wherein k=1.

Suitable diamines include those diamines described with reference to the imide synthesis or elsewhere in this specification.

In at least one synthesis of the etherimides, a compound of the formula:

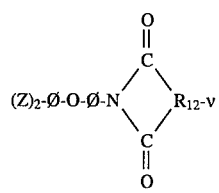

(XVIII)

is an intermediate or reactant (i.e., it is a halogeno end cap). We form this intermediate by reacting the corresponding extended amine end cap with halo- or nitrophthalic anhydrides described in U.S. Pat. Nos. 4,297,474 and 3,847,869, which also are incorporated by reference.

We synthesize multidimensional etherimides by reacting the anhydride hub with compounds of formulae (XII) through (XV), previously described. Those skilled in the art will recognize other mechanisms to make multidimensional etherimide oligomers based on the mechanisms we illustrated for the imides and amideimides.

Our etherimide oligomers can be four functional capped homologs of the ULTEM or KAPTON etherimides that are commercially available.

6. Polysulfoneimides

We can prepare polysulfoneimide oligomers corresponding to the etherimides and analogous to those described and claimed in U.S. patent application Ser. No. 07/241,997 by reacting about m+1 moles of a dianhydride with about m moles of a diamine and about 2 moles of an extended amine end cap. The resulting oligomer has the general formula:

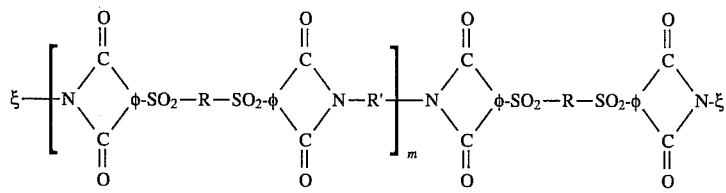

wherein R and R' are divalent aromatic organic radicals having from 2–20 carbon atoms. R and R' may include halogenated aromatic $C_{(6-20)}$ hydrocarbon derivatives; alkylene radicals and cycloalkylene radicals having from 2–20 carbon atoms; $C_{(2-8)}$ alkylene terminated polydiorganosiloxanes; and radicals of the formula:

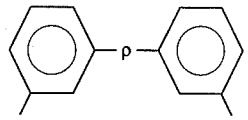

wherein p=—CO—, —SO$_2$, —O—, —S—; or $C_{(1-5)}$ alkane, and preferably, —CH$_2$— so that the sulfoneimide remains aromatic. Comparable polymers, usable in blends of the sulfonamides, are described in U.S. Pat. No. 4,107,147, which we incorporate by reference. U.S. Pat. No. 3,933,862 describes other aromatic dithio dianhydrides.

7. Polyamides

We prepare linear or multidimensional polyamides (i.e., arylates or nylons) by condensing dicarboxylic acid halides (i.e., a diacid or a dibasic acid) with aliamines in the presence of an acid halide end cap or extended amine end cap. These polyamides are analogous to the polyamide oligomers U.S. Pat. Nos. 4,876,326; 5,109,105; 4,847,333 describe.

We prepare multidimensional amides by condensing a nitro, amine, or acid halide hub with suitable diamines, diacid halides, and the extended amine end cap or the acid halide end cap to form oligomers of the general formulae:

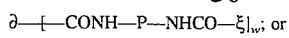

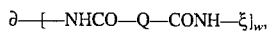

wherein P=a residue of a diamine, Q=a residue of a diacid halide, and ∂, ξ and w were previously defined.

Examples of proposed amide syntheses follow.

Example 36

Prepare a multidimensional amide oligomer by reacting:

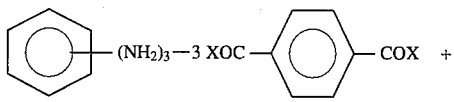

-continued

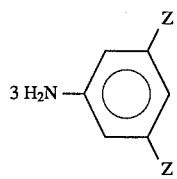

under an inert atmosphere to yield:

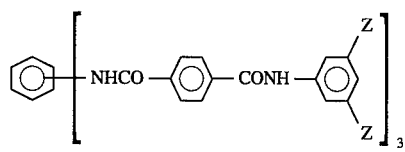

Example 37

Prepare another multidimensional amide oligomer by reacting:

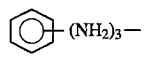

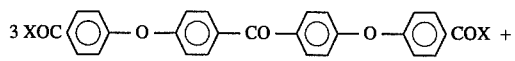

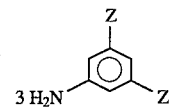

under an inert atmosphere to yield:

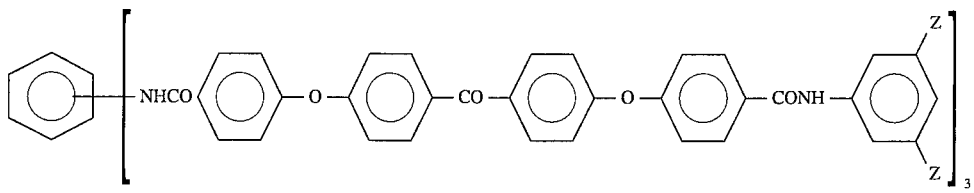

Example 38
Prepare a multidimensional amide oligomer by reacting:

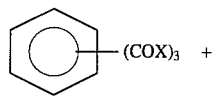

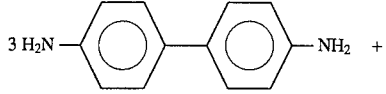

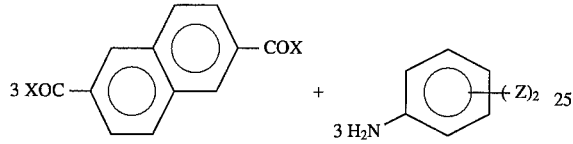

(or simply the acid hub, a diamine, and an acid halide end cap monomer) under an inert atmosphere to yield:

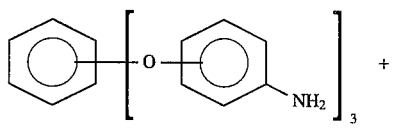

Competitive side reactions between the reactants in Example 38 will likely hinder the yield of this product and will make isolation of the product difficult. We enhance yield by adding the reactants serially, which might impair the physical properties of the resulting oligomers or composites made from the oligomers.

Example 39
Use a etheramine hub to make a multidimensional amide oligomer by reacting:

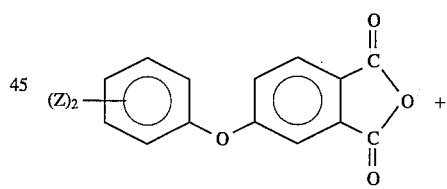

-continued

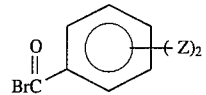

under an inert atmosphere to yield:

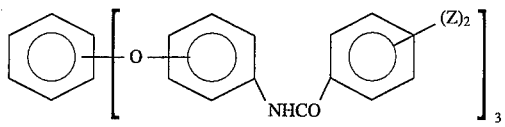

Example 40
Prepare a multidimensional amide using an extended anhydride end cap by reacting:

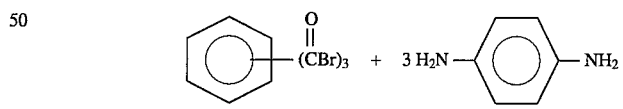

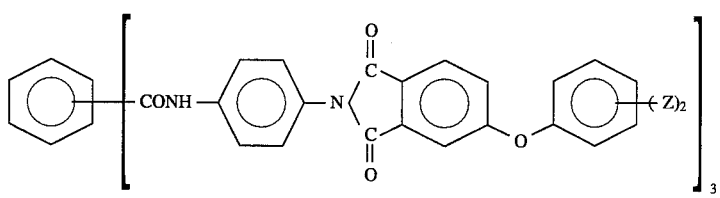

under an inert atmosphere to yield:

Example 41

React melamine with an extended anhydride end cap to yield:

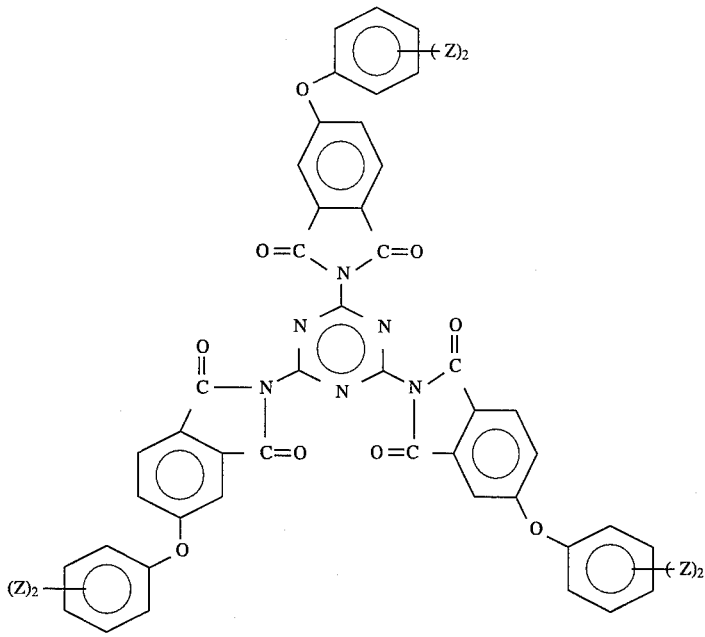

Example 42

Prepare another multidimensional amide oligomer by reacting about 1 mole of cyuranic acid halide with about 3 moles of phenylenediamine and about 3 moles of the extended anhydride end cap to yield:

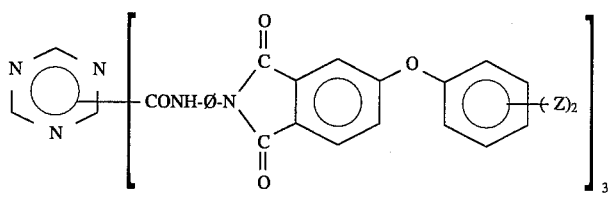

We expect better yield of the fully substituted hub by reacting the anhydride with aminobenzoic acid and converting the free carboxylic acid functionality to an amine followed by condensation of the resulting extended amine with the acid halide hub.

8. Polyesters

We prepare polyesters by condensing the previously described diacid halides and diols. The linear oligomers are four functional analogs of those compounds described in U.S. patent application Ser. No. 07/137,493. We make multidimensional polyesters using phenol or acid hubs (particularly cyuranic acid) with suitable diols and diacid halides. These multidimensional polyester oligomers are analogs of those compounds described in U.S. patent application Ser. No. 07/167,656 and 07/176,518 or in U.S. Pat. Nos. 5,175,233 and 5,210,213. We prefer to use a thallium catalyst when making multidimensional polyesters to ensure complete addition on the hub.

Commercial polyesters, when combined with well-known diluents, such as styrene, do not exhibit satisfactory thermal and oxidative resistance to be useful for aircraft or aerospace applications. Polyarylesters (i.e., arylates) are often unsatisfactory. These resins often are semicrystalline, making them insoluble in laminating solvents, intractable in fusion, and subject to shrinking or warping during composite fabrication. Those polyarylesters that are soluble in conventional laminating solvents often remain soluble in these same solvents in composite form, thereby limiting their usefulness in aerospace structural composites. The high concentration of ester groups contributes to resin strength and tenacity, but also makes the resin susceptible to the damaging effects of water absorption. High moisture absorption by commercial polyesters can lead to distortion of the composite when it is loaded at elevated temperature, We prepare high performance, aerospace, polyester advanced composites, however, using crosslinkable, end capped polyester imide ether sulfone oligomers that have an acceptable combination of solvent resistance, toughness, impact resistance, strength, processability, formability, and thermal resistance, By including Schiff base (—CH=N—), imidazole, thiazole, or oxazole linkages in the oligomer chain, the linear, advanced composites can have semiconductive or conductive properties when appropriately doped, Preferred linear polyethers or polyesters have the general formula:

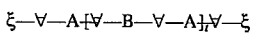

wherein ξ=a crosslinkable end cap to improve the solvent resistance of the cured oligomer in the advanced composite; and A and B=linear residues of respective diacid halides and diols;

∀=ether or ester; and t=0–27 (i.e., it is the "polymerization factor").

Generally, A and B are linear aromatic moieties having one or more aromatic rings, such as phenylene, biphenylene, naphthylene, or compounds of the general formula:

—Ø—λ—Ø— wherein λ is any of —CO—; —O—; —S—; —SO$_2$—; —(CH$_3$)$_2$C—; —(CF$_3$)$_2$C—; —CH=N—; oxazole, imidazole, or thiazole. For most applications, the linking groups will be selected from —SO$_2$—, —S—, —O—, —CO—, —(CH$_3$)$_2$C—, and —(CF$_3$)$_2$C—. The oligomer usually is a polyester imide ether sulfone.

A or B preferably have the general formula:

—Ø—Ω—Ø—Ψ—Ø—Ω—Ø— wherein Ω=—O—, —SO$_2$—, or —S—, provided that Ω=—SO$_2$— only if Ψ=—SO$_2$—;

Ψ=—CO— or —SO$_2$—; and

Ø=phenylene.

We usually prepare these polyester oligomers by reacting:

2 moles of a crosslinkable end cap acid halide;

n moles of an aromatic diacid halide or of a difunctional chain including a plurality of aryl rings linked with at least one linkage selected from the group consisting of —SO$_2$—, —O—, —S—, —CO—, the chain having an acid halide functionality on each end; and n+1 moles of an aromatic bisphenol (i.e., a diol having terminal —OH functionalities or by reacting:

2 moles of a crosslinkable phenol end cap;

n+1 moles of an aromatic diacid halide or of a difunctional chain including a plurality of aryl rings linked with at least one linkage selected from the group consisting of —SO$_2$—, —O—, —S—, —CO—, —(CH$_3$)$_2$C—, —(CF$_3$)$_2$C—, or mixtures thereof throughout the chain, the chain having an acid halide functionality on each end; and n moles of an aromatic bisphenol.

We have previously described the suitable diacid and diol reactants.

Because the aromatic polyester resins synthesized in accordance with this invention have appreciable molecular weight between the reactive groups, even in thermoset formulations, the oligomers will retain sufficient plasticity to be processable during fabrication prior to crosslinking of the end caps to thermoset composites. If possible, we synthesize thermoplastic formulations with even higher molecular weights. The polyesters preferably have MWs between about 5000–40,000, and, more preferably, between about 15,000–25,000.

We make a particularly preferred polyester oligomer of the present invention by condensing a diacid halide with an excess of a diol to form an extended diol having intermediate ester linkages. This extended diol is then reacted with excess 4,4'-dichlorodiphenylsulfone to yield a second intermediate dihalogen. The dihalogen can be condensed with a phenol end cap or the caps can be added in two steps by reacting the dihalogen with (H$_2$N)$_2$—Ø—OH followed by reacting the tetra-amine intermediate (i.e., bis(2,4-diaminophenyl)ether) with an acid halide end cap from our U.S. Pat. No. 5,087,701. We prefer nadic caps. This stepwise reaction is illustrated then, as follows:

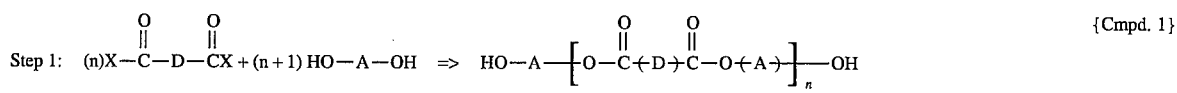 {Cmpd. 1}

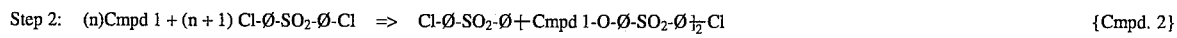 {Cmpd. 2}

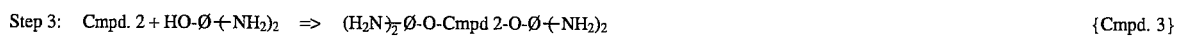 {Cmpd. 3}

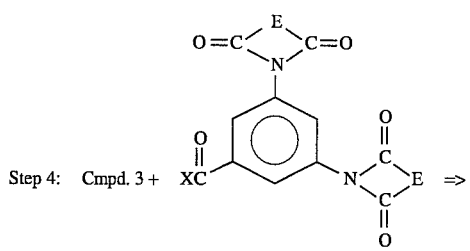

-continued

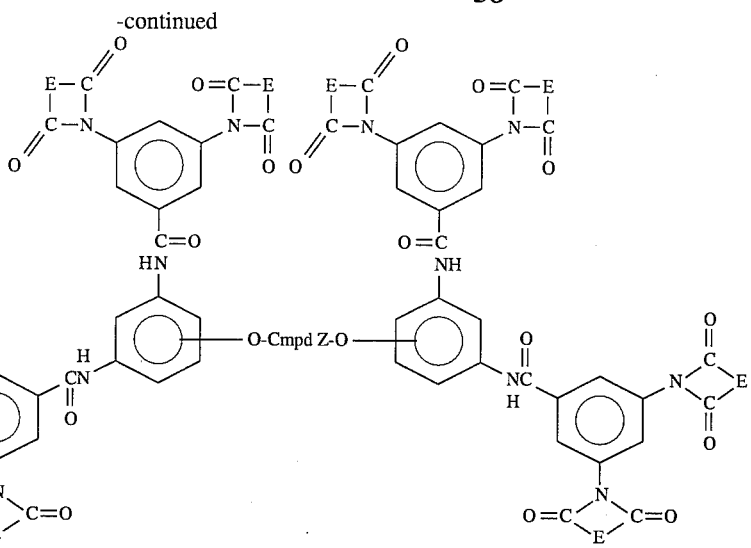

wherein E = 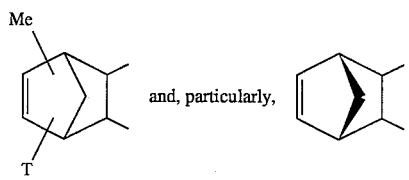

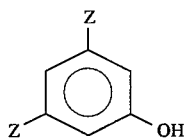 and, particularly,

In this sequential or step-wise synthesis, the caps effectively become:

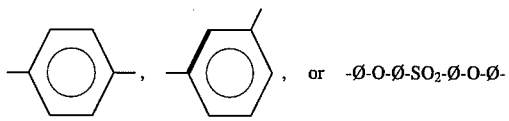

when the acid halide caps condense with the free terminal amines on the extended ether/ester backbone (i.e., Cmpd. 3). Similar stepwise syntheses are available for reaction sequences that can produce terminal acid halides (—COX), phenols (—OH), or halides (—X), as will be understood from this single example. Preferably, steps 2 and 3 are done simultaneously by combining the diol of step 1 with the dihalogen and diaminophenol in a single reaction flask.

Although illustrated in four steps, isolation and transfer between steps is unnecessary until the product forms. An acid acceptor is added incrementally at each step along with the sequential monomer reactant. The product is isolated by precipitation in water with water washing thereafter. The product is a phenoxy phenyl sulfone alternating diester. Preferred diacid halides have D as

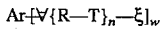

The preferred diols are those where A is

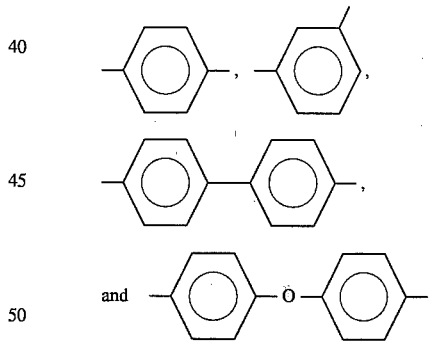

We can achieve glass transition temperatures of about 950° F. (510° C.), although we can easily tailor the properties of the resulting oligomers within broad ranges.

Preferred multidimensional ether or ester oligomers have a central, aromatic hub and three, radiating, ether or ester chains, as shown in the general formula:

$$Ar \text{---} [\forall \{R \text{---} T\}_n \text{---} \xi]_w$$

wherein $\forall$ = ether or ester;
$w = 3$ or $4$;

$T = \text{---} O \text{---}$, if $\forall = \text{---} O \text{---}$,

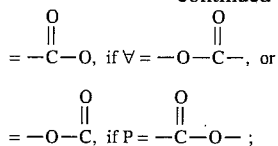

R = a linear hydrocarbon radical, generally including ether and electronegative ("sulfone") linkages selected from the group consisting of —$SO_2$—, —S—, —$(CH_3)_2C$—, —CO—, and —$(CF_3)_2C$—, and generally being a radical selected from the group consisting of:

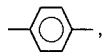

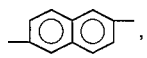

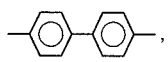

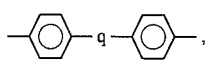

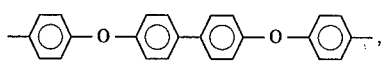

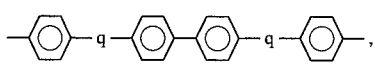

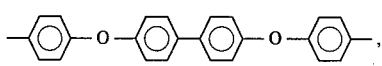

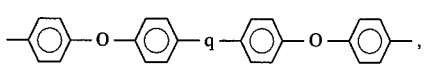

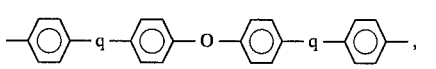

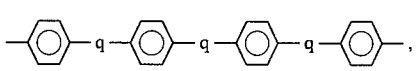

and

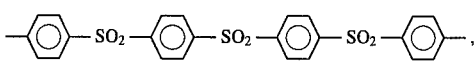

n = an integer such that the average molecular weight of —R—T— is up to about 3000 (and preferably 0 or 1);
q = —CO—, —$SO_2$—, —$(CF_3)_2C$—, —$(CH_3)_2C$—, or —S—; and
ξ = is a residue of multiple chemically functional acid halide end cap or phenol end cap monomer;

We prepare multidimensional ether or ester oligomers of this type by reacting substantially stoichiometric amounts of a multi-substituted hub, such as trihydroxybenzene (i.e., phloroglucinol), with chain-extending monomers and crosslinking end cap monomers. Suitable chain-extending monomers include dicarboxylic acid halides, dinitro compounds, diols (i.e., dihydric phenols, bisphenols, or dialcohols), or dihalogens, in the same manner as making linear ethers or esters.

Multidimensional polyol hubs

The hub may be a polyol such as phloroglucinol or those tris(hydroxyphenyl)alkanes described in U.S. Pat. No. 4,709,008 of the general formula:

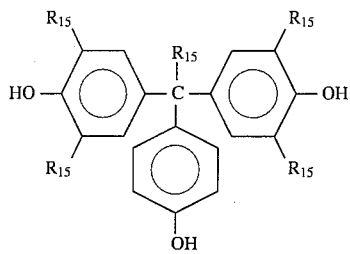

wherein $R_{15}$ is hydrogen or methyl and can be the same or different. These polyols are made by reacting, for example, 4-hydroxybenzaldehyde or 4-hydroxyacetophenone with an excess of phenol under acid conditions (as disclosed in U.S. Pat. Nos. 4,709,008; 3,579,542; and 4,394,469). We generally react the polyols with nitrophthalic anhydride, nitreaniline, nitrobenzoic acid, or a diacid halide to form the actual reactants (i.e., amines or acid halides) that are suitable as heterocycle hubs, as will be understood by those of ordinary skill.

We can use the extended acid hub:

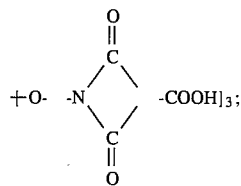

that we described earlier. This hub is characterized by an intermediate ether and imide linkage connecting aromatic groups. Thio-analogs are also contemplated, in accordance with U.S. Pat. No. 3,933,862. Other acid or polyol hubs are equally suitable.

Generally the ratio of reactants is about 1 mole of the hub to at least 3 moles of end cap to at least 3 moles of polyaryl arms. The arms usually include phenoxyphenyl sulfone, phenoxyphenyl ether, or phenyl sulfone moieties to supply the desired impact resistance and toughness to the resulting advanced composite (through "sulfone" swivels) without loss of the desired thermal stability.

A second synthetic mechanism for making the multidimensional ether oligomers involves the reaction of a halogenated or polynitro aromatic hub with suitable amounts of diols and an extended acid halide end cap monomer. Again, the reactants are mixed together and are generally reacted at elevated temperatures under an inert atmosphere. Generally for either mechanism, the reactants are dissolved in a suitable solvent such as benzene, toluene, xylene, DMAC, or mixtures and are refluxed to promote the reaction. We sometimes add TEA to catalyze the reaction.

We also can make suitable oligomers by directly reacting polyol hubs (such as phloroglucinol) or halogenated aromatic hubs directly with end cap groups having the corresponding halide, acid halide, or alcohol (phenol) reactive functionality.

Schiff base diols are prepared by the condensation of aldehydes and amines under the general reaction schemes:

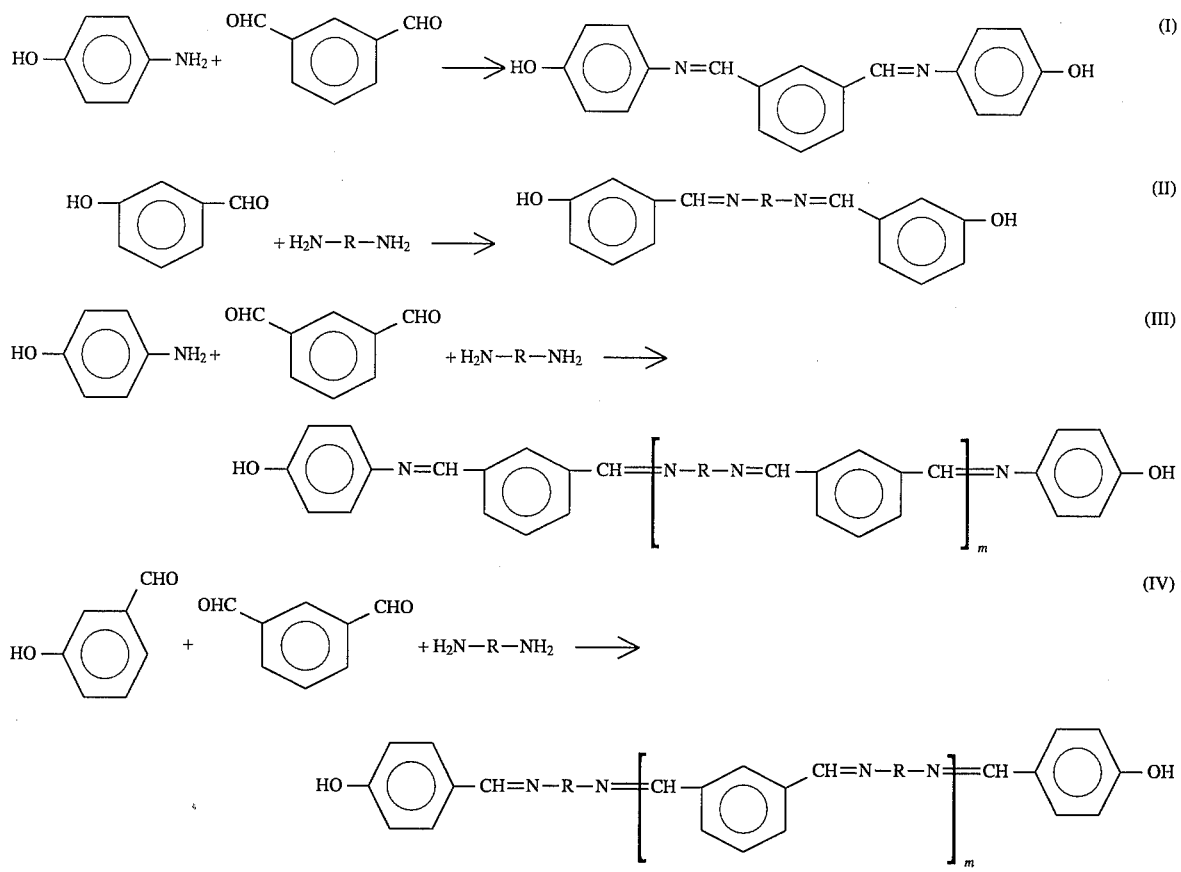

We prepare suitable dinitro compounds by reacting nitrophthalic anhydride (as described in U.S. Pat. Nos. 4,297,474 and 3,847,869) with a diamine. In this case, suitable diamines include those described previously.

We prefer arms in the multidimensional oligomers that are short chains having formula weights below about 1500 per arm, and, preferably, about 500 per arm. Solubility of the oligomers becomes an increasing problem as the length of the backbones (arms) increases. Therefore, we prefer shorter backbones, so long as the resulting oligomers remain processable. That is, the backbones should be long enough to keep the oligomers soluble during the reaction sequence.

We also can make noncrosslinking ether or ester linear or multidimensional polymers for blends by the same synthetic methods as the oligomers with the substitution of a quenching cap for the crosslinking end cap. For example, phenol benzoic acid, or nitrebenzene can be used to quench (and control MW).

The following are examples of proposed ester syntheses.

Example 43

Prepare an ester star oligomer by dissolving phloroglucinol dihydrate in a solution of $H_2O$ and a solvent containing 27% xylene and 73% DMAC. In a Barrett trap under a bubbling $N_2$ atmosphere, reflux the mixture to strip off the $H_2O$ and, then, the xylene. After the stripping step, cool the resulting DMAC solution slowly to about 0° C. before adding triethylamine (TEA) (30% excess) while stirring the solution. After 10 min. of stirring, add an acid halide end cap monomer, and rinse the product with DMAC. Continue stirring for 2 hours, before recovering a product by adding a suitable amount of HCl.

Example 44

Prepare another ester star oligomer by dissolving phloroglucinol dihydrate in a xylene/DMAC mixture having about 740 g xylene and 2000 g DMAC. Reflux the mixture in a Barrett trap under a $N_2$ atmosphere to strip $H_2O$, which the reaction generates. Upon heating to about 160° C., strip the xylene from the mixture. Cool the DMAC solution to ambient, and add a phenol end cap monomer and TEA. Stir the resulting mixture in an ice bath while adding the acid chloride of bis-(4,4'-carboxyphenoxyphenylsulfone) is slowly. After the addition, continue stirring for 2 hr. The product is soluble in the reaction mixture, but coagulates in $H_2O$ to a powder. Wash the powder with deionized water to remove residual chloride.

We have found that, when reacting, for example, phloroglucinol with an acid chloride end cap in DMAC and TEA that the resulting product is a mixture of di- and trio substituted multidimensional ester oligomers. The condensation is difficult to drive to completion (i.e., replacement of all the —OH groups) to yield the desired product. We improve the yield of fully reacted multidimensional ester, however, by replacing the TEA with thallium ethoxide ($Tl-OC_2H_5$). While thallium ethoxide is preferred, it is possible that any lower alkoxy or aryloxy substituent on the metal will be active as a catalyst. That is, methoxy, propoxy, isopropoxy, n-butoxy, phenoxy, or the like may also display catalytic activity.

Since the multidimensional polyester oligomers that we synthesize are often used without isolation of products (so we have complex mixtures in the prepreg), we believe that the new product made using a thallium catalyst, richer in the truly multidimensional ester product, will yield better composites than we achieved with the mixture of fully and partially reacted hubs that results when using TEA as a catalyst. In effect, the product is a blend of a linear and a multidimensional oligomer when the reaction is incomplete.

The method of using a thallium catalyst is equally applicable when using an acid halide hub such as cyuranic acid chloride with an extended phenol end cap monomer.

We believe that $Tl—OC_2H_5$ will produce a higher yield of the tri-substituted hub. If the hub has more than three reactive hydroxyl or acid halide functionalities, the thallium ethoxide catalyst will promote more complete reaction (or substitution) than TEA.

9. Polyethers

We prepare polyethers or ethersulfones by condensing dinitro compounds or dihalogens and diols or by other conventional ether syntheses using a phenol end cap monomer or a halogeno end cap monomer.

We can use any previously described dihalogen.

We can prepare dinitro compounds by reacting nitrophthalic anhydride with the diamines, as we previously described. Of course, we can prepare dihalogens in the same way by replacing the nitrophthalic anhydride with halophthalic anhydride. We can condense nitroaniline, nitrobenzoic acid, or nitrophenol with dianhydrides, diacid halides, diamines, diols, or dihalogens to prepare other dinitro compounds that include amide, imide, ether, or ester linkages between the terminal phenyl radicals and the precursor backbones. The synthesis of the dinitro compounds or dihalogens can occur prior to mixing the other reactants with these compounds or the steps can be combined in suitable circumstances to directly react all the precursors into the oligomers. For example, we can prepare a polyarylether oligomer by simultaneously condensing a mixture of the phenol end cap, nitrophthalic anhydride, phenylene diamine, and HO—Ø—O—Ø—O—Ø—O—Ø—OH.

We can prepare a multidimensional ether by the simultaneous condensation of phloroglucinol with a dihalogen and a phenol end cap monomer. Those of ordinary skill will recognize the range of possible multidimensional polyether oligomers from this simple example.

We can also synthesize multidimensional oligomers of the formula:

$$Ar\text{-}[O—\emptyset—CO—\emptyset—O—\xi]_w \quad \text{(XIX) and}$$

$$Ar\text{-}[O—\emptyset—CO—R_{16}—CO—\emptyset—O—\xi]_w \quad \text{(XX)}$$

with an Ullmann aromatic ether synthesis followed by a Friedel-Crafts reaction, as will be further explained.

Here, $R_{16}$ is

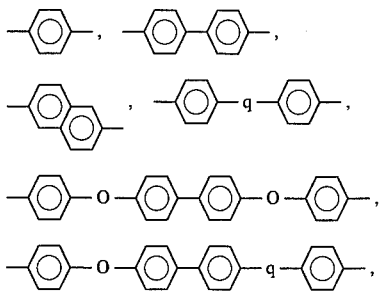

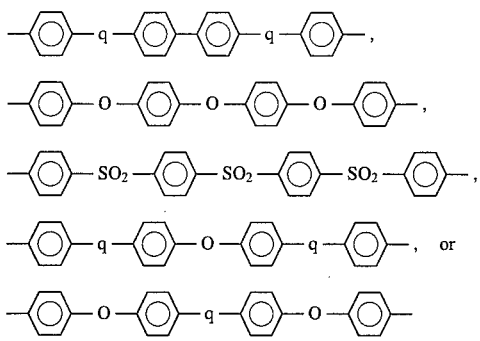

$q=$ —SO—, —CO—, —S—, or —$(CF_3)_2C$—, and preferably —$SO_2$—, or —CO—.

To form the oligomers for formula (XIX), preferably a halosubstituted hub is reacted with phenol in DMAC with a base (NaOtt) over a Cu Ullmann catalyst to produce an ether "star" with active hydrogens para- to the ether linkages. End caps terminated with acid halide functionalities can react with these active aryl groups in a Friedel-Crafts reaction to yield the desired product. For example, we react 1 mole of trichlorobenzene with about 3 moles of phenol in the Ullmann ether reaction to yield an intermediate of the general formula: $\emptyset\text{-}[O—\emptyset]_3$ which we, then, react with about 3 moles of the extended acid halide end cap to produce the final, crosslinkable, ether/carbonyl oligomer.

Similarly, to form the oligomers of formula (XIX), the hub is extended preferably by reacting a halo- substituted hub with phenol in the Ullmann ether synthesis to yield the ether intermediate of the $\emptyset\text{-}[O—\emptyset]_3$ compounds. This intermediate is mixed with the appropriate stoichiometric amounts of a diacid halide of the formula $XOC—R_{16}—COX$ and an end cap of the formula $(Z)_2—\emptyset$ [formula (XX)] in the Friedel-Crafts reaction to yield the desired, chain-extended ether/carbonyl star and star-burst oligomers. We prepare end caps of this type by reacting 2 moles of Z—COOH or its acid halide with $\emptyset\text{-}(NH_2)_2$.

We can use coreactants with the ether or ethersulfone oligomers or coreactive oligomer blends that include these oligomers, including p-phenylenediamine; 4,4'-methylenedianiline; benzidine; lower alkyldiamines; or compounds of the general formula:

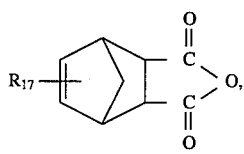

-continued

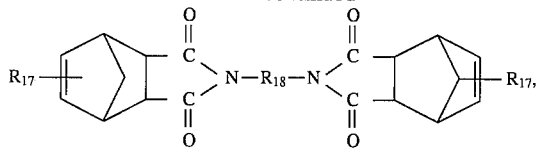

or

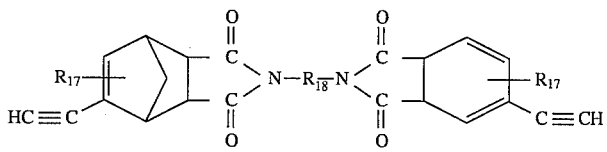

wherein $R_{17}$=hydrogen, lower alkyl, or aryl; and $R_{18}$=lower alkyl (having about 2–6 carbon atoms) or aryl. Coreactants of this same general type are also probably usable with the amideimides or etherimides.

Example 45

Prepare an ether star oligomer by charging DMAC, xylene, $K_2CO_3$, and a multiple chemically functional phenol end cap to a reaction flask fitted with a stirrer, condenser, thermometer, and $N_2$ purge. Add phloroglucinol dihydrate and reflux the mixture until all $H_2O$ in the flask is expelled and no additional $H_2O$ is generated. After cooling the resulting intermediate mixture, add about 3.0 moles of 4,4'-dichlorodiphenylsulfone and reheat the flask to about 150° C. to strip the xylene from the solution. Continue refluxing for 16 hours at about 150° C. Upon removal of all the xylene, heat the flask to about 160°–164° C. for 2 more hours. After cooling, recover the product by adding $H_2O$ to induce coagulation while mixing the solution in a Waring blender. Wash the coagulate thoroughly with deionized water until the residual chloride is removed.

10. Polyaryl sulfide oligomers (PPS)

We can also prepare multiple chemically functional oligomers of the present invention for PPS backbones. These four functional oligomers are analogs of the reactive PPS oligomers we described in U.S. patent application Ser. No. 07/639,051.

A brief description of the state of the art for PPS resins is an appropriate introduction.

Edmonds U.S. Pat. No. 3,354,129 describes the preparation of poly(arylene sulfide) polymers by the reaction of an alkali metal sulfide with a polyhalo-substituted aromatic (preferably dihaloaromatic) compound wherein the halogen atoms are attached to ring carbon atoms in a polar organic compound at elevated temperature. A copper compound, such as cuprous and cupric sulfides, or halides, may be present to aid in the formation of the polymer. Molecular weight of the polymer is increased by heat treatment, either in the absence of oxygen or with an oxidizing agent. Molecular weight is increased due to crosslinking, lengthening of the polymer chain, or both.

Campbell U.S. Pat. No. 3,919,177 discloses the preparation of p-phenylene sulfide polymers by reacting p-dihalobenzene, a suitable source of sulfur, an alkali metal carboxylate, and a preferably liquid organic amide. Both of the alkali metal carboxylate and the organic amide components serve as polymerization aids. The alkali metal carboxylate may typically be lithium acetate, lithium propionate, sodium acetate, potassium acetate, or the like. The organic amide may typically be formamide, acetamide, N-methylformamide, or N-methyl-2-pyrrolidone (NMP). A variety of sulfur sources can be used, including alkali metal sulfides, thiosulfates, thiourea, thioamides, elemental sulfur, carbon disulfide, carbon oxysulfide, thiocarbonates, thiocarbonates, mercaptans, mercaptides, organic sulfides, and phosphorus pentasulfide.

Crouch et al. U.S. Pat. No. 4,038,261 describes a process for the preparation of poly(arylene sulfide)s by contacting p-dihalobenzene, a polyhalo aromatic compound having greater than two halogen substituents, an alkali metal sulfide, lithium carboxylate or LiCl, NMP, and an alkali metal hydroxide. The use of a polyhalo compound results in the formation of a branched chain polymer of reduced melt flow that can be spun into fibers. The alkali metal sulfide can be charged to the reaction in hydrated form or as an aqueous mixture with an alkali metal hydroxide.

Gaughan U.S. Pat. No. 4,716,212 describes the preparation of poly(arylene sulfide ketone)s by reaction of a polyhalobenzophenone such as 4,4'-dichlorobenzophenone and a mixture of sodium hydrosulfide and sodium hydroxide.

Satake et al. U.S. Pat. Nos. 4,895,892 and 4,895,924 both disclose melt stable poly(arylene thioether ketone)s. The '892 patent describes blends of an arylene thioether ketone polymer with a thermoplastic resin such as poly(arylene thioether)s, aromatic polyether ketones, polyamides, polyamideimides, polyesters, polyether sulfones, polyether imides, poly(phenelyene ether)s, polycarbonates, polyacetals, fluoropolymers, polyolefins, polystryrene, polymethyl methacrylate, ABS, and elastomers such as fluororubbers, silicone rubbers, polyisobutylenes, hydrogenated SBR, polyamide elastomers and polyester elastomers. U.S. Pat. No. 4,895,924 patent discloses the preparation of poly(arylene thioetherketone) fibers by melt spinning of polymers and blends of the type disclosed in U.S. Pat. No. 4,895,892.

Blackwell U.S. Pat. No. 4,703,081 describes a ternary polymer alloy comprising a poly(arylene sulfide), a poly(amideimide) and a poly(aryl sulfone). The poly(arylene sulfide)is prepared, for example, by reaction of p-dichlorobenzene and sodium sulfide in NMP. Various other di- and trihalo aromatics are mentioned as monomers for use in the preparation of the poly(arylene sulfide)s.

Johnson et at. U.S. Pat. No. 4,690,972 describes the preparation of poly(arylene sulfide) compositions by incorporating additives which affect the crystalline morphology, followed by heating and cooling steps. Among the preferred arylene sulfides are poly(phenylene sulfide) and poly(phenylene sulfide ketone). The additive is preferably a poly(arylene ether ketone) such as 1,4-oxyphenoxy-p,p'-benzophenone Leland et al. U.S. Pat. No. 4,680,326 describes poly(arylene sulfide) compositions having a combination of good cracking resistance and electrical insulation resistance. The compositions include a reinforcing material, polyethylene, and an organosilane.

Skinner U.S. Pat. No. 4,806,407 describes blends of p-phenylene sulfide polymers and melt extrudable polymers such as non-halogenated polymers and copolymers of olefins, halogenated homopolymers (polyvinylidene fluoride, polyvinyl chloride, polychlorotrifluoroethylene, and the like), ethylene/acrylic copolymers (e.g., "Surlyn"), and both aromatic and aliphatic polyamides.

We incorporate these PPS patents by reference.

The present invention provides oligomers useful in the preparation of poly(arylene sulfide) [PPS] polymers having favorable thermomechanical and thermooxidative properties, having other advantageous performance properties, and having favorable processing characteristics in the preparation of such composites. The composites have high solvent resistance, moisture resistance, toughness, and impact resistance.

We react (n) equivalents of a dihaloaromatic compound, (n+1) equivalents of a sulfur compound that is reactive with the dihaloaromatic compounds to form thioethers, and 2 equivalents of the halogeno (i.e., halide) end cap monomer to obtain an oligomer corresponding to the formula:

where:

Ar and $Ar_1$ are arylene;

$\mu$ is an integer such that the oligomer has about molecular weight of between about 500 and about 40,000;

$\xi$ is a residue of a halogeno end cap monomer, and the other variables are as previously defined.

We prepare composites from the oligomers in the form of films, coatings, moldings, fibers, and other structures useful in engineering applications. We expect that PPS composites produced from these oligomers will exhibit exceptional toughness and impact resistance for PPS.

When used for preparation of various forms of polymer products, the oligomers of the invention exhibit especially favorable processing characteristics. Their melt and plastic flow properties are especially advantageous for the preparation of moldings and composites without the necessity of solvents. Because the oligomers crosslink by an addition of "step growth" mechanism, curing of moldings or composites can be conducted without significant outgassing of solvents or condensation products, thereby yielding polymer products of exceptional structural and dimensional integrity. Adhesives comprising the oligomers of the invention, and the polymeric products obtained by curing thereof, we can prepare without outgassing of either reaction products or solvents.

The oligomers are crosslinkable by addition or step growth reaction of the unsaturated moieties of the end caps analogous to the PPS oligomers of 07/639,051. In this respect they differ from the polymers of U.S. Pat. No. 3,354,129, which are crosslinked through functional groups provided in the linear backbone, and from the polymers of U.S. Pat. No. 4,038,261, in which linear chains are branched and crosslinked by incorporation of a minor proportion of trihaloaromatic compound in a polymerization mixture comprising p-dihalobenzene and sulfur compound.

We can prepare oligomers of the present invention in both linear and multidimensional form. We prepare the linear oligomers by reacting n equivalents of a dihaloaromatic compound (i.e., a dihalogen), n+1 equivalents of a sulfur compound that is reactive with the dihalo-aromatic compounds to form thioethers, and 2 equivalents of halogeno end cap monomer. Crosslinking of the oligomer may subsequently take place under curing conditions. The multidimensional oligomers, of course, use an appropriate hub.

Generally, the sulfur compound used in the preparation of the oligomer is characterized by its reactivity with halo organic compounds to produce thioethers. Preferably, the sulfur compound comprises an alkali metal sulfide, an alkali metal sulfohydride, or an alkali metal bisulfide. Among the various other sulfur compounds which may optionally be used in the reaction are alkali metal thiosulfates, thioamides, elemental sulfur, carbon disulfide, carbon oxysulfide, thiocarbonates, thiocarbonates, mercaptans, mercaptides, organic sulfides and phosphorus pentasulfide. If the sulfur compound used is other than an alkali metal sulfide or bisulfide, we include a base in the reaction charge. If the sulfur compound is an alkali metal bisulfide, the use of a base is not strictly necessary, but we prefer to include it. If the sulfur compound is an alkali metal sulfide, a base is unnecessary.

For the PPS synthesis, preferred dihalogens include:
1,2-dichlorobenzene
1,3-dichlorobenzene
1,4-dichlorobenzene
2,5-dichlorotoluene
1,4-dibromobenzene
1,4-diodobenzene
1,4-difluorobenzene
2,5-dibromoaniline
1,4-di-n-butyl-2,5-dichlorobenzene
1,4-di-n-nonyl-2,6-dibromobenzene
2,5-dichlorobenzamide
1-acetamido-2,4-dibromoanphthalene
4,4'-dichlorobiphenyl
p-chlorobromobenzene
p,p'-dichlorodiphenylether
o,p'-dibromodiphenylamine
4,4'-dichlorobenzophenone and
4,4'-dichlorodiphenylsulfone.

We could use any dihalogen we described earlier.

Preparation of the oligomer is preferably carried out in the presence of a polymerization aid such as a liquid organic amide, a carboxylic acid salt, or both. In the preparation of conventional poly(arylene sulfide) polymers, such aids are effective in increasing the average MW of the polymerization product. In the process of the invention, such polymerization aids are effective in controlling and limiting the molecular weight distribution within a narrow range of variability.

Conditions for carrying out the reaction to form the oligomer are essentially the same as those described in U.S. Pat. Nos. 3,354,129 and 3,919,177. The reaction may be carried out, for example, by contacting the dihalogen, the sulfur compound, and the end cap monomer in a polar solvent at a temperature of from about 125° to about 450° C., preferably front about 175° to about 350° C. The amount of polar solvent may vary over a wide range, typically front about 100 to about 2500 ml per mole of the sulfur compound.

Alkali metal carboxylates that may be employed in the reaction generally correspond to the formula:

where $R_{20}$ is a hydrocarbyl radical selected from alkyl, cycloalkyl, and aryl and combinations thereof such as alkylaryl, alkylcycloalkyl, cycloalkylalkyl, arylalkyl, arylcycloalkyl, alkylarylakyl and alkylcycloalkylalkyl, the hydrocarbyl radical having 1 to about 20 carbon atoms, and $M_3$ is an alkali metal selected from the group consisting of lithium, sodium, potassium, rubidium and cesium. Preferably, $R_{20}$ is an alkyl radical having 1 to about 6 carbon atoms or a phenylene radical. Most preferably, it is phenylene. $M_3$ is lithium or sodium, most preferably lithium. If desired, employ the alkali metal carboxylate as a hydrate or as a solution or dispersion in water.

Examples of some alkali metal carboxylates that we might use in the process include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, lithium cyclohexanecarboxylate, cesium cyclododecanecarboxylate, sodium 3-methlcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and the like, or mixtures thereof.

The organic amides used in the method of this invention should be substantially liquid at the reaction temperatures and pressures. Examples of some suitable amides are N,N-dimethylformamide, N,N-dipropylbutyramide, N-methyl-ξ-caprolactam, hexamethyl-phosphoramide, tetramethylurea, and the like, or mixtures thereof.

When we use alkali metal carboxylates and organic amides for control of the oligomer formation reaction, we carry out the reaction at about 235° C. and about 450° C., preferably about 240° C. to about 350° C. When the alkali metal carboxylate is a sodium, potassium, rubidium, or cesium salt of an aromatic carboxylic acid, i.e., an acid in which the carboxyl group is attached directly to an aromatic nucleus, the temperature should be within the range of from about 255° C. to about 450° C., preferably from about 260° C. to about 350° C. The reaction time is within the range of from about 10 minutes to about 3 days and preferably about 1 hour to about 8 hours. Preferably, we use about 0.5 to about 2 moles metal carboxylate compound per mole of the dihaloaromatic compound. When we use NMP as the organic amide component of the reactor charge, we use it in substantially equal molar proportion with the dihalogen compound.

We use the PPS oligomers in melt or solution form for the preparation of films, moldings, and composites. Curing at a temperature in the range of between about 480° and about 640° F. (250° to 340° C.) causes step growth reaction between the unsaturated moieties of the end groups, resulting in the formation of high molecular weigh polymers having superior thermal and mechanical properties and solvent resistance. We initiate the curing reaction either thermally or chemically. Where the oligomer has a relatively high molecular weight, for example, greater than 10,000, preferably about 15,000 to 25,000, the polymer produced on curing is thermoformable. Where the molecular weight is below 10,000, especially in the range of between about 1000 and about 6000, the cured resin is likely a thermoset material, which we seek to avoid.

We prepare multidimensional PPS oligomers by reacting w(n) equivalents of a dihalogen, w(n+1) equivalents of a sulfur compound that is reactive with dihalogen to form thioethers, one equivalent of a polyhalo hub having w halogen substituents, and w equivalents of a halogeno end cap monomer.

In the preparation of either linear or multidimensional PPS oligomers, it is generally preferred that the dihalogen comprises a dihalobenzene such as, for example, p-dichlorobenzene or m-dichlorobenzene, and the sulfur compound be an alkali metal sulfide such as sodium sulfide, which can be prepared in situ by reaction of an alkali metal hydrosulfide and a base. An advantageous method for the preparation of arylene sulfide oligomers from an alkali metal hydrosulfide is described in U.S. Pat. No. 4,716,212.

We can make blends suitable for composites, for example, by mixing a PPS oligomer of the invention with a macromolecular or oligomeric polymer that is essentially incapable of crosslinking with the crosslinkable oligomer. Such blends merge the desired properties of crosslinking oligomers and non-crosslinking polymers to provide tough, yet processable, resin blends. We can use a variety of macromolecular or oligomeric polymers, most typically a poly(arylene sulfide) prepared by reaction of a dihalogen with a sulfur compound of the type used in the preparation of the oligomer, the reaction being quenched with a suitable non-crosslinking terminal group. Generally, we would prepare such poly(arylene sulfide)s by the methods described in U.S. Pat. Nos. 3,354,129, 3919,177, and 4,038,261. Most preferably, we would prepare the non-crosslinking polymer and crosslinkable oligomer from the same dihaloaromatic and sulfone compound, thus enhancing compatibility between oligomer and polymer. The quenching agent is typically a monohaloaromatic compound such as chlorobenzene.

The blends also encompass the advanced composites blends of poly(arylene sulfide) oligomers blended with poly(amide imide)s and poly(aryl sulfone)s analogous to the blends described in U.S. Pat. No. 4,703,081. Blends may also comprise the various polymers used in the blends described in U.S. Pat. No. 4,595,892.

The melt flow characteristics of PPS oligomers are such that PPS may be used in melt rather than solution form in various applications, including the preparation of composites. In this regard, PPS is similar to the heterocycle liquid crystals.

For maximum mechanical properties of coatings or composites prepared from PPS oligomers or blends, we prefer that the halogeno substituents of the dihalogen have a predominantly p-orientation. For processability, however, the most favorable results are generally provided by use of the m-isomer, so processing and final properties compete, forcing a trade when designing the formulation. The m-isomer may also be preferable for adhesives. In certain instances, it may be advantageous to provide a blend of m- and p-isomers having a mix of properties tailored to the particular application of the cured oligomer.

The end cap monomer can be

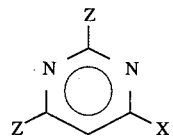

(i.e., a pyrimidine cap) when making these PPS oligomers or their related polyethers.

The following examples illustrate the invention with respect to PPS oligomers.

Example 46

Place hydrated $Na_2S$ in N-methylpyrrolidone (NMP) in a glass reaction flask and heat to 160° C. while the flask is flushed with nitrogen for a time sufficient to dehydrate the $Na_2S$. Add p-dichlorobenzene (88.2 g) and a halogeno end cap monomer to the dehydrated solution, and the resulting mixture is sealed in a glass tube. The mixture contained in the tube is heated at 230° C. for 45 hours, then at 225° C. for 20 hours, and then at 260° C. for 24 hours. A product precipitating from the reaction mixture comprises a four functional PPS oligomer.

Example 47

Prepare a multidimensional PPS oligomer by reaction of Na$_2$S, p-dichlorobenzene, 1,3,5-trichlorobenzene, and a halogeno end cap monomer. The preparation procedure is substantially as described in Example 51, except that the trichlorobenzene is added together with the p-dichlorobenzene and the end cap.

11. Carbonates

We prepare multiple chemically functional carbonate oligomers by reacting a diol (sometimes also referred to as a dihydric phenol), a carbonyl halide, and a phenol end cap in a manner similar to the reaction described in U.S. Pat. No. 4,814,421, which is incorporated by reference. While we can use any diol, we prefer diols having the formula:

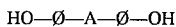

HO—Ø—A—Ø—OH wherein A is (i) a divalent hydrocarbon radical containing 1–15 carbons, (ii) a halogen substituted divalent hydrocarbon radical containing 1–15 carbons, or (iii) divalent groups such as —S—, —SS—, —SO$_T$—, —SO—, —O—, or —CO—.

We prefer the aromatic diols, especially the diol: HO—Ø—SO$_2$—Ø—OH.

The carbonyl halide is a carbonate precursor and commonly is phosgene, but the reaction can also use a diarylcarbonate or a bishaloformate of a dihydric phenol or of a glycol.

The reaction proceeds by interfacial polymerization as described in U.S. Pat. Nos. 3,028,365; 3,334,154; 3,275,601; 3,915,926; 3,030,331; 3,169,121; 3,027,814; and 4,188,314, which are incorporated by reference. Generally the phenol reactants are dissolved or dispersed in aqueous caustic, adding the mixture to a water immiscible solvent, and contacting the reactants thereafter with the carbonate precursor in the presence of a catalyst and under controlled pH conditions.

The catalyst is usually a tertiary amine (like TEA), quaternary phosphonium compounds, or quarternary ammonium compounds.

The water immiscible solvents include methylene chloride, 1,1-dichloroethane, chlorobenzene, toluene, or the like.

The reaction can also be used to make mono- and difunctional polycarbonate oligomers by substituting an imidophenol end cap monomer from our U.S. Pat. Nos. 4,980,481; 4,661,604; 4,739,030; and 5,227,461 for the four functional phenol end cap monomer. The difunctional imidophenol end cap monomers have the general formula:

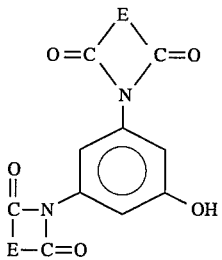

where E is an unsaturated hydrocarbon as previously defined.

We can prepare arylate/carbonate copolymers by the reaction of phosgene with diacid halides in the solvent phase with a diol like bisphenol-A in the solute phase using 3,5-di(nadicylimino)benzoyl chloride or the extended acid halide end cap monomer, and can prepare multidimensional carbonates using a suitable polyhydric hub like phloroglucinol. Multidimensional arylate/carbonates, of course, can use an acid or acid halide hub, like cyuranic acid. Those skilled in the art will recognize the mechanisms which are analogous to those for our other Linear and multidimensional oligomers.

Step wise condensation similar to the four-step process described for the esters will also lead to carbonates. Here, a long-chain four functional amine having intermediate, characteristic carbonate linkages is formed by condensing the diol with a carbonyl halide and

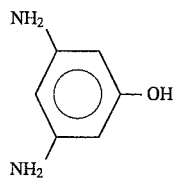

followed by reaction of the four terminal amines (i.e., two at each end of the chain in the carbonate compound):

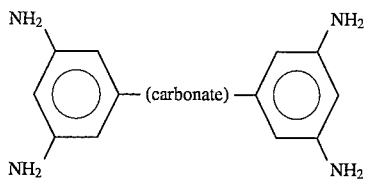

With an acid halide end cap monomer (see, e.g., U.S. Pat. No. 5,087,701) to yield the Z links of the characteristic four functional end caps.

12. Polyesteramides

The linear oligomers are characterized by having a pair of alternating ester linkages

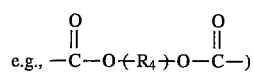

e.g., —C—O—(R$_4$)—O—C— followed by a pair of alternating amide linkages

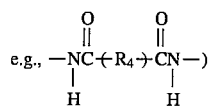

e.g., —NC—(R$_4$)—CN—
         |          |
         H          H as generally illustrated for polymeric homologs in U.S. Pat. No. 4,709,004 or by having sequential amide/ester linkages. The preferred esteramides are prepared by condensing an amino/phenol compound (like aminophenol; preferably, 4-[2-p-hydroxyphenyl)isopropyl]-4'-amino diphenyl ether) or other amino/phenols described in U.S. Pat. No. 4,709,004 with a diacid halide, especially terephthaloyl chloride, and four functional add halide end cap monomer following generally the process of Imai et al. in J. Polymer Sci., 1981, 19, pp. 3285–91 which is discussed in U.S. Pat. No. 4,709,004 (both of which are incorporated by reference). We alter the Imai process by using the end cap monomer to quench the reaction and to provide an oligomeric product. In the preferred synthesis, the oligomer is likely to include a mixture of the following recurring units:

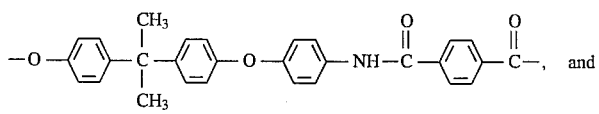

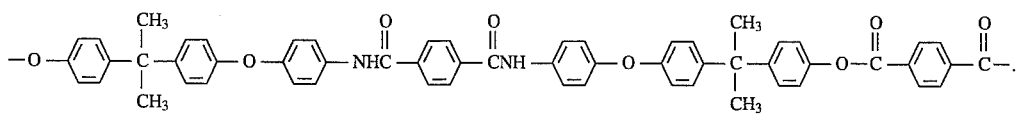

as the diacid halide reacts in a head-to-tail sequence or head/head-tail/tail sequence.

Multidimensional esteramides condense a polybasic acid, polyol, or polyamine hub with a suitable end cap monomer or with arm extenders, like the amino/phenol compounds, amino/acid compounds, diacid halides, and diamines, as appropriate and as previously described for the other resin systems.

13. Cyanates and Cyanate Esters

We can also apply the technique of multiple chemically functional oligomer to the cyanate resin system. Typical resins in the cyanate family are described in U.S. Pat. No. 5,134,421, which we incorporate by reference. Cyanate resins are characterized by the reactive functionality —OCN, but we use the term to include the thio cyanate cousins —SCN as well. Cyanate resins are prepared by reacting diols or polyols (in the case of multidimensional morphology) with a cyanogen halide, especially cyanogen chloride or bromide. The synthesis is well known and is described in U.S. Pat. Nos. 3,448,079; 3,553,244; and 3,740,348, for example; each of which is also incorporated by reference. The cyanate functionality self-polymerizes to form cyanate esters either with or without a suitable catalyst (such as tin octoate).

Therefore, to prepare linear cyanate oligomers of the present invention, diols are converted to dycanate (i.e., $N{\equiv}C{-}O{-}R_4{-}O{-}C{\equiv}N$ where $R_4$ is the residue of an organic diol) in the presence of cyanogen halide and the phenol end cap monomers of formula (II) are also connected to the corresponding cyanate using the same reaction. Then, the chain terminating cyanate end cap is mixed with the cyanate to control the self-polymerization which yields a cyanate ester having four crosslinking sites at each end. The multidimensional synthesis is analogous but involves a polyol hub converted to the cyanate, mixed with the dicyanate and cyanate end cap monomer, and polymerized.

Suitable catalysts for the cyanate resin systems of the subject invention are well known to those skilled in the art, and include the various transition metal carboxylates and naphthenates, for example zinc octoate, tin octoate, dibutyltindilaurate, cobalt naphthenate, and the like; tertiary amines such as benzyldimethylamine and N-methylmorpholine; imidazoles such as 2-methylimidazole; acetylacetonates such as iron (III) acetylacetonate; organic peroxides such as dicumylperoxide and benzoylperoxide; free radical generators such as azobisisobutyronitrile; organophoshines and organophosphonium salts such as hexyldiphenylphosphine, triphenylphosphine, trioctylphosphine, ethyltriphenylphosphonium iodide and ethyltriphenylphosphonium bromide; and metal complexes such as copper bis[8-hydroxyquinolate]. Combinations of these and other catalysts may also be used.

Any diol we previously described can be converted to the cyanate analog and used in this synthesis. For high MWs, however, we prefer to use a soluble dicyanate, especially:

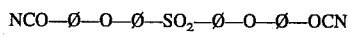

Similarly, any polyol hub we previously described can be converted to the corresponding polycyanate analog to serve as the hub (a) in the synthesis of multidimensional cyanate ester oligomers.

The thiocyanates exhibit essentially the same chemistry.

14. Advanced Composite Blends

Advanced composite blends comprise at least one crosslinking oligomer and at least one polymer wherein the backbones of the oligomer(s) and polymer(s) are from different chemical families. Such blends present promise for tailoring the mechanical properties of composites while retaining ease of processing. At their simplest, the composites are mixed chemical blends of a linear or multidimensional crosslinking oligomer of one chemical family, such as a imide, and a linear or multidimensional polymer, unable to crosslink, from a different chemical family, such as ethersulfone. Generally the polymer has a MW that is initially higher than that of the oligomer, but the formula weight of the oligomeric portion of the blend will increase appreciably during curing through addition (i.e. homo-) polymerization between the crosslinking functionalities. The ratio of oligomer(s) to polymer(s) can be varied to achieve the desired combination of physical properties. Usually the ratio is such that the addition polymer (i.e., composite) formed during curing of the oligomer constitutes no more than about 50 mol % of the total.

While two component blends are preferred, the blends can be more complex mixtures of oligomers or polymers with or without coreactants. The blends may even include coreactive oligomers as will be explained (i.e., diamines, diols, or

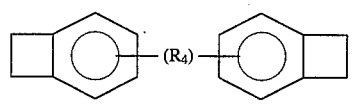

resins). We can also form blends of these multiple chemically functional oligomers with corresponding monofunctional or difunctional oligomers from our earlier patents and patent applications.

The oligomer is preferably selected from imidesulfone; ethersulfone; cyanate ester; carbonate; amide; esteramide; imide; ether; ester; estersulfone; etherimide; or amideimide. That is, any of the oligomers we have described.

In advanced composite blends oligomers or coreactive oligomer blends are further blended with a noncrosslinking polymer having a backbone from a different chemical family. The polymer can be from any one of the families described for the oligomers, but the oligomeric and polymeric backbones must be different to form what we elect to call an advanced composite (i.e. mixed chemical) blend. The resulting blend may yield IPN or semi-IPN morphology in the consolidated resin (composite) state.

Preferably the polymer's MW initially is greater than that of the oligomer, because the MW of the oligomer in the cured composite will increase through addition polymerization. The cured composite from an advanced composite blend will have a blend of two, "long" molecules, and will not suffer from a broad distribution of MWs or a mismatch of MW that reduces the physical properties obtainable in some prior art blends, such as those Kwiatkowski suggested in U.S. Pat. No. 3,658,939.

Preferred oligomer/polymer combinations in the advanced composite blends of this invention include: amideimide/imide; imide/amide; ester/amide; ester/imide; and ester/esteramide.

Advanced composite blends allow tailoring of the properties of high performance composites. They allow averaging of the properties of resins from different families to provide composites that do not have as severe shortcomings as the pure compounds. The resulting composites have a blending or averaging of physical properties, which makes them candidates for particularly harsh conditions.

Although the concept of advanced composite blends is probably best suited to linear morphology, the advanced composite blends of the present invention also include multidimensional oligomers and polymers. We prefer linear morphology because the resulting composites have mixtures of polymers of relatively large and roughly equivalent MW. The individual polymers are similar in structure. We have found it difficult in many circumstances to process multidimensional oligomers that have appreciable MW, so the properties of composites made from multidimensional advanced composite blends might suffer because of diversity of MW. Furthermore, the addition polymerization reaction for multidimensional oligomers results in formation of a complex, 3-dimensional network of crosslinked oligomers that is difficult or impossible to match with the multidimensional polymers, because these polymers simply have extended chains or short chains. That is, upon curing, the multidimensional oligomers crosslink to chemically interconnect the arms or chains through the end caps, thereby forming a network of interconnected hubs with intermediate connecting chains. The connecting chains have moderate MW, although the oligomer can add appreciable MW upon curing. In contrast, the polymer (which does not crosslink) simply has a hub with arms of moderate MW. While, for linear morphology, the disadvantages of blended composites that have a wide diversity of average MW polymers as constituents can be overcome by curing relatively low MW oligomers into relatively high MW cured polymers that are roughly equivalent to the polymer constituents, the polymers in the multidimensional morphology are likely to have average MW lower than the oligomeric component. Therefore, we believe we can achieve the best results for the present invention with systems having linear morphology where it is easier to achieve MW harmony in the composite.

Although we have yet to verify our theory experimentally, it may be possible and desirable to synthesize the polymeric component of the multidimensional advanced composite blend when curing the oligomer, and, in that way, forming relatively comparable oligomeric and polymeric networks. To achieve this effect, we would mix, for example, a multidimensional oligomer with comparable polymeric precursors, such as triamines and tricarboxylic acid halides. Upon curing, the precursors would condense to form amide linkages to form bridges between hubs in a manner comparable to the oligomeric connecting chains.

The potential problem of structural mismatch and the proposed solution for achieving comparable MW in multidimensional advanced composite blends likely also applies to coreactive oligomer blends to some degree so that homopolymerization and addition polymerization compounds remain comparable.

To overcome the problem of different MW between the oligomer and polymer in the composite, we theorize that it may be possible to prepare a blend that includes the oligomer and polymeric precursors. For example, we can mix a polyether oligomer of the general formula:

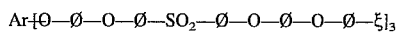

wherein ξ is the residue of a four functional end cap monomer with polyamide polymeric precursors of the general formula:

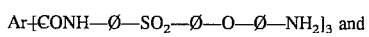

so that, upon curing, the oligomer crosslinks and the polymeric precursors condense through the amine and acid to form a polyamide polymer. This approach may be best suited for the lower curing oligomers. The product may include addition polymers and block copolymers of the oligomer and one or both of the polymeric precursors. A Michaels addition might occur between the oligomer and amine multidimensional polymer, which would be undesirable.

The oligomers may be formed by the attachment of arms to the hub followed by chain extension and chain termination. For example, phloroglucinol may be mixed with p-aminophenol and 4,4'-dibromodiphenylsulfone and reacted under an inert atmosphere at an elevated temperature to achieve an amino-terminated "star" of the general formula:

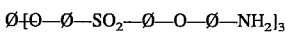

that can be reacted with suitable diacid halides, dianhydrides, and end caps to yield an amide, amideimide, imide, or other oligomer. By substituting 2,4-diaminophenol for aminophenol, an ethersulfone compound of the formula:

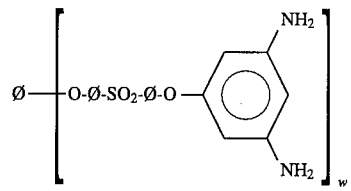

can be prepared. When reacted with an acid halide end cap monomer to produce Z end groups the product is a multiple chemically functional ether sulfone multidimensional oligomer. Extended amides, imides, etc. could also be prepared resulting in multidimensional oligomers with a high density of crosslinking functionalities.

As we have discussed, the oligomers can be synthesized in a homogeneous reaction scheme wherein all the reactants are mixed at one time, or in a stepwise reaction scheme wherein (1) the radiating chains are affixed to the hub and the product of the first reaction is subsequently reacted with the end cap groups or (2) extended end cap compounds are formed and condensed with the hub. Homogeneous reaction is preferred, resulting undoubtedly in a mixture of oligomers because of the complexity of the reactions. The products of the processes (even without distillation or isolation of individual species) are preferred oligomer mixtures which can be used without further separation to form the desired advanced composites.

We can synthesize linear or multidimensional oligomers from a mixture of four or more reactants thereby forming extended chains. Adding components to the reaction liquor, however, adds complexity to the reaction and to its control. Undesirable competitive reactions may result or complex mixtures of macromolecules having widely different properties may form, because the mixed chain extenders and chain terminators compete with one another.

The hub may also be a polyol such as those described in U.S. Pat. No. 4,709,008. These polyols are made by reacting, for example, 4-hydroxybenzaldehyde or 4-hydroxyacetophenone with an excess of phenol under acid conditions (as disclosed in U.S. Pat. Nos. 4,709,008; 3,579,542; and 4,394,469). The polyols may also be reacted with nitrophthalic anhydride, nitroaniline, nitrophenol, or nitrobenzoic acid to form other compounds suitable as hubs as will be understood by those of ordinary skill.

In synthesizing the polymers, we use quenching compounds to regulate the polymerization (i.e., MW) of the comparable polymer, so that, especially for linear systems, the polymer has a MW initially substantially greater than the crosslinkable oligomer. For thermal stability, we prefer an aromatic quenching compound, such as aniline, phenol, or benzoic acid chloride. We generally make the noncrosslinking polymer by the same synthetic method as the oligomer with the substitution of a quenching cap for the crosslinking end cap. Of course, we may adjust the relative proportion of the reactants to maximize the MW.

While the best advanced composite blends are probably those where the individual oligomers and polymers in the blend are of modest MW and those in which the oligomer and polymer are initially in equimolar proportions, we can prepare other compositions, as will be recognized by those of ordinary skill in the art. Solvent resistance of the cured composite may decrease markedly if the polymer is provided in large excess to the oligomer in the blend.

The advanced composite blends may include multiple oligomers or multiple polymers, such as a mixture of an amideimide oligomer, an amide oligomer, and an imide polymer or a mixture of an amideimide oligomer, an amideimide polymer, and an imide polymer (i.e. blended amideimide further blended with imide). When we use polyimide oligomers, the advanced composite blend can include a coreactant, such as p-phenylenediamine, benzidine, or 4,4'-methylenedianiline. Ethersulfone oligomers can include these imide coreactants or anhydride or anhydride-derivative coreactants, as described in U.S. Pat. No. 4,414,269. We can use other combinations of oligomers, polymers, and coreactants, as will be recognized by those of ordinary skill in the art.

As discussed above, the oligomeric component of the advanced composite blend may itself be a blend of the oligomer and a compatible polymer from the same chemical family, further blended with the compatible polymer from the different family. The advanced composite blends generally include only one oligomeric component unless coreactive oligomers are used.

Advanced composite blends are illustrated as follows.

Example 48

Proposed linear amideimide/ether advanced composite blend.

The polyamideimide oligomer of Example 10 is dissolved in a suitable solvent. Make a relative high average formula weight polyether polymer condensing the diol:

HO—Ø—O—Ø—O—Ø—O—Ø—OH 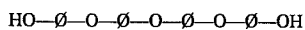

with Cl—Ø—Cl and phenol (to quench the polymerization) under an inert atmosphere in the same solvent as used with the polyamideimide oligomer or another miscible solvent.

Mix the two solutions to form a lacquer of the advanced composite blend. Prepreg or dry the lacquer prior to curing to an advanced amideimide/ether composite.

Example 49

Proposed multidimensional ether sulfone/ester advanced composite blend.

Prepare a multidimensional, polyether sulfone polymer by reacting phloroglucinol with Cl—Ø—Cl and HO—Ø—O—Ø—SO$_2$—Ø—O—Ø—OH, quenching the polymerization with either Ø—Cl or phenol to yield a polymeric product. The condensation occurs in a suitable solvent under an inert atmosphere. Do not recover the product from the solvent.

Prepare a multidimensional, polyester oligomer in the same solvent as used for the polymer or in another miscible solvent by condensing cyuranic acid chloride with a phenol end cap. Do not recover the product, but mix the oligomeric reaction mixture with the polymer product to form a varnish of a multidimensional advanced composite blend. Prepregg or dry the varnish prior to curing to form a multidimensional, polyester/polyethersulfone, advanced composite.

15. Coreactive oligomer blends

Block copolymers are promising for tailoring the mechanical properties of composites while retaining ease of processing. The present invention also comprises blends of two or more coreactive oligomers analogous to those blends described in U.S. Pat. No. 5,159,055. The oligomers are terminated with mutually interreacting caps that allow formation of the block copolymer(s) upon curing. We can increase stiffness in this way in an otherwise flexible oligomer, although the four crosslinks themselves increase stiffness. For example, we can achieve stiffening for a composite made from an ethersulfone oligomer by adding an imide oligomer as a coreactant. Those skilled in the art will recognize the benefits to be gained through coreactive oligomer blends. Generally, at least one of the oligomers in the coreactive oligomer blend will include four crosslinking functionalities at each end of the backbone.

We generally prepare block copolymers formed from the coreactive oligomer blends by blending an oligomer of the general formula:

wherein $R_4$=a divalent hydrocarbon radical, as we have described; and

ξ=a four functional hydrocarbon residue of an end cap monomer used to form the oligomer with a coreactive oligomer of the general formula:

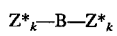

wherein k=1, 2, or 4;

B=a hydrocarbon backbone that is from the same or a different chemical family as $R_4$;

Z*=a hydrocarbon residue including a segment selected from the group consisting of:

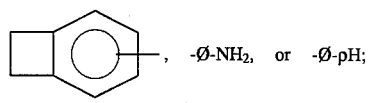

p=—O— or —S—; and

—Ø—=is phenylene.

Preferably we select the oligomeric backbones from the group consisting of imidesulfones, ethersulfones, carbonates, esteramides, amides, ethers, esters, estersulfones, imides, etherimides, amideimides, cyanate esters, and, more preferably, the ethers, esters, sulfones, or imides. Generally, the hydrocarbons are entirely aromatic with phenylene radicals between the linkages that characterize the backbones. The oligomers can be linear or multidimensional in their morphology. The components of these coreactive blends should have overlapping melt and curing ranges so that the crosslinking functionalities are activated at substantially the same time, so that flow of the blend occurs simultaneously, and so that, for heterocydes, the chain-extension occurs in the melt where the products are soluble. Matching the melt and curing ranges requires a selection of the chemistries for the coreactive blend components, but achieving the match is readily within the skill of the ordinary artisan.

The coreactive oligomer blends can comprise essentially any ratio of the coreactive oligomers. Changing the ratio of ingredients, of course, changes the physical properties in the final composites. Curing the coreactive oligomers involves mutual (interlinking) polymerization and addition polymerization. Therefore, we generally use equimolar mixtures of the ingredients (i.e., the ξ and Z* components) in the blends.

The individual oligomers should initially have relatively low MW (preferably no more than and, generally, around 10,000) and, accordingly, should remain relatively easy to process until the curing reaction when extended chain and block copolymers form to produce the composite. A complex mixture of at least three types of addition polymer form upon curing.

The coreactive oligomer blends can also include non-crosslinking polymers, as desired, to provide the desired properties in the composites. That is, the coreactive blend may include the two crosslinking oligomers and a non-crosslinking compatible polymer, thereby forming a blend with three or more resin components.

We can prepare oligomers of the general formula $\xi—R_4—\xi$ or $Z^*_k—V—Z^*_k$ by reacting suitable end cap monomers with the monomer reactants that are commonly used to form the desired backbones. For example, we prepare an imidesulfone as we have already described by reacting a sulfone diamine with a dianhydride. We prepare ethersulfones by reacting a suitable dialcohol (i.e. diol, bisphenol, or dihydric phenol) with a dihalogen as described in U.S. Pat. No. 4,414,269. Similarly, the end cap monomers for the $Z^*_k—B—Z^*_k$ oligomers generally are selected from the group consisting of aminophenol, aminobenzoic acid halide, $H_2N—\emptyset—SH$, $\emptyset—W$, or the like, wherein $W=—OH$, $—NH_2$, or $—COX$. The $Z^*_k—B—Z^*_k$ oligomers include any diamines, diols, or disulfhydryls we have previously described. In this circumstance, k=1.

Upon curing, the oligomers homopolymerize (i.e. addition polymerize) by crosslinking and form block copolymers through the Michaels addition reaction between the hydrocarbon unsaturation of one oligomer and the amine, hydroxyl, or sulfhydryl group of the other. The reaction of the hydrocarbon unsaturation of one oligomer with the functionality of the other follows the mechanism described in U.S. Pat. No. 4,719,283 to form a cyclohexane linkage by bridging across the double bond. With the acetylene (triple) unsaturation, a cyclohexene ring results.

The Michaels addition reaction is illustrated as follows:

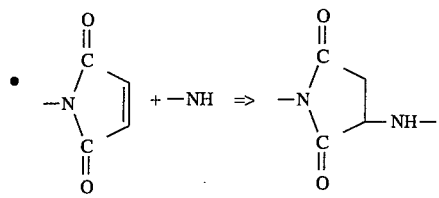

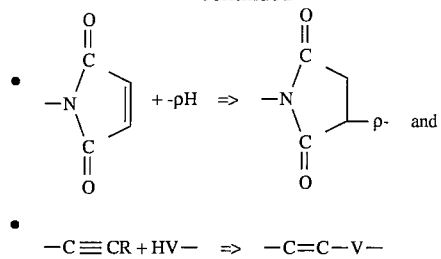

wherein $V=—NH—$, $—O—$, or $—S—$. For the other end caps, we believe a reverse Diels-Alder decomposition reaction (induced by heating the oligomers) results in the formation of a reactive maleic moiety and the off-gassing of a cyclopentadiene. The methylene bridge decomposes to the maleic compound at about 625°–670° F. (330°–355° C.) while the $—O—$ bridge decomposes at the lower temperature of about 450° F. (230° C.).

The reactive group might also be $—CNO$ instead of the amine, but we do not recommend use of these dicyanates.

While we have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples are given to illustrate the invention and not intended to limit it. Accordingly, limit the claims only as necessary in view of the pertinent prior art.

We claim:

1. A multiple chemically functional, crosslinking end cap monomer suitable for making processable oligomers that cure to form advanced composites with thermomechanical and thermo-oxidative stability, comprising:

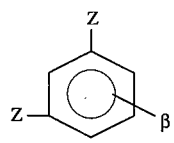

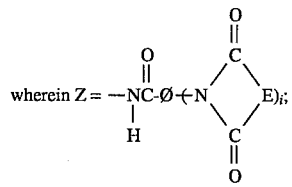

i=1 or 2;

—∅=phenylene;

E=an unsaturated organic radical selected from the group consisting of:

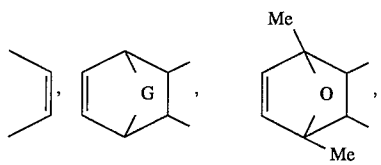

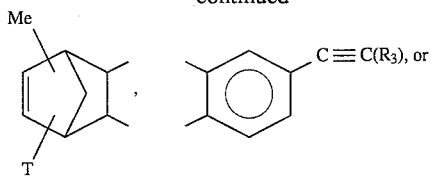

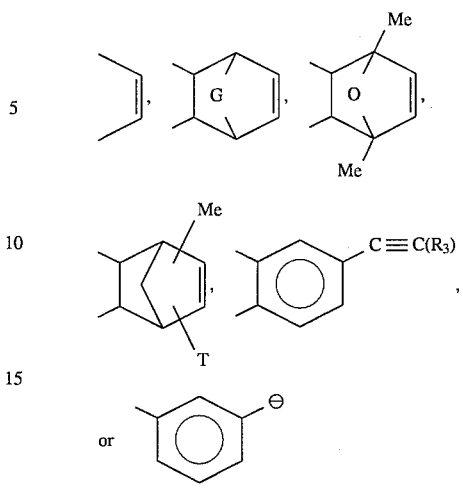

Me=methyl;
G=—CH₂—, —SO₂—, —CO—, —S—, —O—, —C(HR₃)—, or —C(R₃)₂—;
R₃ independently any of hydrogen, lower alkyl, lower alkoxy, aryl, or aryloxy;
β=an organic radical selected from the group consisting of:

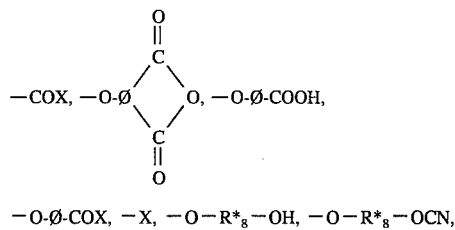

—O-ø-COX, —X, —O—R*₈—OH, —O—R*₈—OCN,

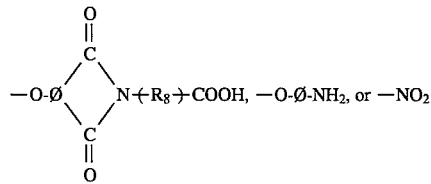

Θ=—C≡N, —O—C≡N, —S—C≡N, or —CR₃=C(R₃)₂;
X=halogen;
T=allyl or methallyl; and
R₈ & R*₈=a divalent organic aromatic radical,
provided that Θ is not —C≡N, —OCN, or —SCN, when β is —O—R*₈—OCN.

2. A multiple chemically functional cyanate ester oligomer comprising the condensation product of a cyanate end cap monomer of the formula:

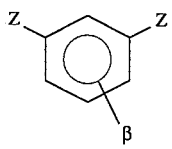

wherein β is —OCN;

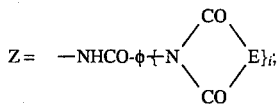

E=a crosslinking functionality which is an unsaturated organic radical selected front the group consisting of:

Me=methyl
G=—CH₂—, —SO_T, —CO—, —S—, —O—, —C(HR)—, or —C(R)₂—;
R₃=hydrogen, lower alkyl, lower alkoxy, aryl, or aryloxy; and
Θ=—CR₃=C(R₃)₂;
X=halogen;
T=allyl or methallyl; and
R*₈=a divalent organic aromatic radical,
and a dicyanate of the formula:

NCO—R₄—OCN wherein R₄=a divalent organic radical and, optionally, a polycyanate hub of the formula:

∂-(OCN)_w wherein ∂=an organic hub and
w=3 or 4
to yield a linear or multidimensional cyanate ester oligomer having one, two, or four crosslinking functionalities at the terminus of each cyanate ester chain.

3. The monomer of claim 1 wherein i=2.
4. The monomer of claim 1 wherein E=

5. The monomer of claim 4 wherein G=—CH₂—.
6. The monomer of claim 1 wherein β=—COX.
7. The monomer of claim 5 wherein β=—COX.
8. The monomer of claim 1 wherein β=—O—φ—NH₂.
9. The monomer of claim 1 wherein β=—O—R₈*—OH.
10. The monomer of claim 6 wherein i=2.
11. The monomer of claim 8 wherein i=2.
12. The monomer of claim 9 wherein i=2.
13. The monomer of claim 1 wherein β=—O— —R₈*—OCN.

* * * * *